(12) United States Patent
Noh et al.

(10) Patent No.: US 11,924,788 B2
(45) Date of Patent: *Mar. 5, 2024

(54) PHYSICAL CHANNEL AND METHOD FOR TRANSMITTING AND RECEIVING SIGNALS IN WIRELESS COMMUNICATION SYSTEM, AND APPARATUS USING THE SAME

(71) Applicant: WILUS INSTITUTE OF STANDARDS AND TECHNOLOGY INC., Gyeonggi-do (KR)

(72) Inventors: Minseok Noh, Seoul (KR); Kyungjun Choi, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,005

(22) Filed: Nov. 25, 2022

(65) Prior Publication Data

US 2023/0090685 A1 Mar. 23, 2023

Related U.S. Application Data

(63) Continuation of application No. 17/262,160, filed as application No. PCT/KR2019/010241 on Aug. 12, 2019, now Pat. No. 11,606,764.

(30) Foreign Application Priority Data

Aug. 10, 2018 (KR) .......... 10-2018-0093884
Aug. 11, 2018 (KR) .......... 10-2018-0094096
Jan. 7, 2019 (KR) .......... 10-2019-0001993

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04L 27/26025* (2021.01); *H04W 8/005* (2013.01); *H04W 56/006* (2013.01)

(58) Field of Classification Search
CPC . H04W 56/001; H04W 56/006; H04W 56/00; H04W 8/005; H04W 48/16;
(Continued)

(56) References Cited

U.S. PATENT DOCUMENTS

2017/0134148 A1 5/2017 Lli et al.
2017/0201898 A1 7/2017 Park et al.
(Continued)

FOREIGN PATENT DOCUMENTS

JP 2017-175674 9/2017
KR 10-2016-0132320 11/2016
(Continued)

OTHER PUBLICATIONS

International Search Report for PCT/KR2019/010241 dagted Nov. 25, 2019 and its English translation from WIPO (now published as WO 2020/032781).
(Continued)

*Primary Examiner* — Candal Elpenord
(74) *Attorney, Agent, or Firm* — Ladas & Parry, LLP

(57) ABSTRACT

A base station in a wireless communication system is disclosed. Each base station in the wireless communication comprises: a communication module; and a processor. When the processor attempts to transmit a synchronization signal and PBCH block (SSB) at a SSB transmission candidate position in a discovery reference signal (DRS) transmission window, and fails to transmit an SSB at a first SSB transmission candidate location in a first DRS transmission window, the processor is configured to attempt to transmit the SSB at a second SSB transmission candidate position
(Continued)

that is later than the first SSB transmission candidate position in the first DRS transmission window. The DRS transmission window is a time interval in which the base station can transmit the SSB. The SSB transmission candidate position indicates a time point at which the base station can start SSB transmission within the DRS transmission window.

6 Claims, 43 Drawing Sheets

(51) Int. Cl.
  *H04L 27/26* (2006.01)
  *H04W 8/00* (2009.01)
(58) Field of Classification Search
  CPC ............ H04W 74/0891; H04L 5/0051; H04L 5/0048; H04L 5/0053; H04L 5/0092; H04L 27/260258; H04L 27/2602; H04L 27/26025; H04J 11/0069
  USPC ................................................. 370/329–330
  See application file for complete search history.

(56) References Cited

U.S. PATENT DOCUMENTS

| | | | |
|---|---|---|---|
| 2018/0084432 | A1 | 3/2018 | Kwak et al. |
| 2018/0220360 | A1 | 8/2018 | Sheng et al. |
| 2019/0208549 | A1* | 7/2019 | Zhang ............... H04W 74/0833 |
| 2020/0053670 | A1 | 2/2020 | Jung et al. |
| 2020/0053781 | A1 | 2/2020 | Pan et al. |
| 2020/0280940 | A1 | 9/2020 | Kim et al. |
| 2020/0413356 | A1 | 12/2020 | Wang et al. |
| 2021/0235456 | A1* | 7/2021 | Xu ........................ H04W 72/53 |
| 2021/0297966 | A1 | 9/2021 | Noh et al. |
| 2021/0345154 | A1 | 11/2021 | Si et al. |

FOREIGN PATENT DOCUMENTS

| | | |
|---|---|---|
| KR | 10-2017-0039170 | 4/2017 |
| KR | 10-2017-0093842 | 8/2017 |
| KR | 10-2018-0024019 | 3/2018 |
| KR | 10-2018-0064455 | 6/2018 |
| KR | 10-2018-0081060 | 7/2018 |
| WO | 2017/083542 | 5/2017 |

OTHER PUBLICATIONS

Written Opinion of the International Searching Authority for PCT/KR2019/010241 dated Nov. 25, 2019 and its English translation by Google Translate (now published as WO 2020/032781).
Ericsson: "On the Introduction of a Discovery Reference Signal". R1-1802777. 3GPP TSG RAN WG1 Meeting #92, Athens, Greece. Mar. 2, 2018. pp. 1-3 and the drawings.
Notice of Allowance dated Apr. 21, 2021 for Korean Patent Application No. 10-2020-7026682 and its English translation provided by Applicant's foreign counsel.
Office Action dated Feb. 22, 2021 for Korean Patent Application No. 10-2020-7026682 and its English translation provided by Applicant's foreign counsel.
Extended European Search Report dated Mar. 15, 2022 for European Patent Application No. 19848047.7.
International Preliminary Report on Patentability (Chapter I) for PCT/KR2019/010241 dated Feb. 16, 2021 and its English translation from WIPO (now published as WO 2020/032781).
ZTE, Sanechips: "Considerations on RS/channel design and measurement on NR-U", 3GPP TSGRAN WG1 Meeting #92bis, R1-1803951, Sanya, China, Apr. 16-20, 2018, pp. 1-10.
Nokia, Nokia Shanghai Bell: "On DL Signals and Channels for NR-U", 3GPP TSG RAN WG1 Meeting #93, R1-1806106, Busan, Korea, May 21-25, 2018, pp. 1-8.
LG Electronics: "Initial access and mobility for NR unlicensed operation", 3GPP TSG RAN WG1 Meeting #93, R1-1806646, Busan, Korea, May 21-25, 2018, pp. 1-5.
Convida Wireless: "Design Considerations for SSB in NR-U", 3GPP TSG-RAN WG1 Meeting #93, R1-1807225, Busan, Korea, May 21-25, 2018, pp. 1-3.
Spreadtrum Communications: "Discussion on SS/PBCH block in NR-U operation", 3GPP TSG RAN WG1 Meeting #93, R1-1806410, Busan, Korea, May 21-25, 2018, pp. 1-6.
WILUS Inc.: "Discussion on initial access for NR-U operation", 3GPP TSG RAN WG1 Meeting #95, R1-1813535, Spokane, USA, Nov. 12-16, 2018, pp. 1-4.
WILUS Inc.: "Discussion on initial access and mobility for NR-U operation", 3GPP TSG RAN WG1 Meeting #94, R1-1809326, Gothenburg, Sweden, Aug. 20-24, 2018, pp. 1-4.
WILUS Inc.: "On initial access and mobility for NR-U operation", 3GPP TSG RAN WG1 Meeting #94bis, R1-1811454, Chengdu, China, Oct. 8-12, 2018, pp. 1-4.
Office Action dated Aug. 19, 2022 for Korean Patent Application No. 10-2021-7034998 and its English translation provided by Applicant's foreign counsel.
Office Action dated Jul. 19, 2022 for Chinese Patent Application No. 201980053040.3 and its English translation provided by Applicant's foreign counsel.
Office Action dated Oct. 20, 2022 for Indian Patent Application No. 202127002496.
Notice of Allowance for U.S. Appl. No. 17/262,160 dated Aug. 18, 2022 (now published as US 2021/0297966).
Office Action for U.S. Appl. No. 17/262,160 dated Apr. 28, 2022 (now published as US 2021/0297966).
Office Action dated May 29, 2023 for Japanese Patent Application No. 2021-506989 and its English translation provided by Applicant's foreign counsel.
Qualcomm Incorporated: "DL signals and channels for NR-U", 3GPP TSG RAN WG1 Meeting #93, R1-1807387, Busan, Korea, May 25, 2018, pp. 1-12.
Vivo: "Discussion on physical layer channel design in NR unlicensed spectrum", 3GPP TSG RAN WGl Meeting #92bis, R1-1803856, Sanya, China, Apr. 20, 2018, pp. 1-6.
WILUS Inc.: "Enhancement to initial access procedure for NR-unlicensed", 3GPP TSG RAN WG1 #97, R1-1907382, Reno. USA, May 17, 2019, pp. 1-7.
Office Action dated Feb. 25, 2023 for Korean Patent Application No. 10-2021-7034998 and its English translation provided by Applicant's foreign counsel.
Office Action dated Mar. 31, 2023 for European Patent Application No. 19 848 047.7.
Office Action dated Apr. 27, 2023 for U.S. Appl. No. 17/994,008.
Office Action dated Aug. 28, 2023 for Korean Patent Application No. 10-2021-7034998 and its English translation provided by Applicant's foreign counsel.
Office Action dated Oct. 16, 2023 for U.S. Appl. No. 17/994,008.
Notice of Allowance dated Oct. 31, 2023 for Vietnamese Patent Application No. 1-2021-01261 and its English translation provided by Applicant's foreign counsel.
Office Action dated Oct. 30, 2023 for Japanese Patent Application No. 2021-506989 and its English translation provided by Applicant's foreign counsel.
Office Action dated Dec. 22, 2023 for Korean Patent Application No. 10-2021-7034998 and its English translation provided by Applicant's foreign counsel.

* cited by examiner (a)

PHYSICAL CHANNEL AND METHOD FOR TRANSMITTING AND RECEIVING SIGNALS IN WIRELESS COMMUNICATION SYSTEM, AND APPARATUS USING THE SAME

CROSS-REFERENCE TO RELATED APPLICATIONS

The present application is a continuation of U.S. patent application Ser. No. 17/262,160 filed on Jan. 21, 2021, which is the U.S. National Phase of PCT Application No. PCT/KR2019/010241 filed on Aug. 12, 2019, which claims the priority to Korean Patent Application No. 10-2018-0093884 filed on Aug. 10, 2018, Korean Patent Application No. 10-2018-0094096 filed on Aug. 11, 2018 and Korean Patent Application No. 10-2019-0001993 filed on Jan. 7, 2019, the entire contents of which are incorporated herein by reference.

TECHNICAL FIELD

The present invention relates to a wireless communication system. Specifically, the present invention relates to a method of transmitting and receiving physical channels and signals in a wireless communication system, and an apparatus using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a method of using an unlicensed frequency spectrum or an unlicensed frequency band (e.g., 2.4 GHz band, 5 GHz band or higher band, or the like) for providing cellular communication services is being discussed as a solution to the problem of lack of spectrum.

Unlike in licensed bands in which telecommunications carriers secure exclusive use rights through procedures such as auctions, in unlicensed bands, multiple communication devices may be used simultaneously without restrictions on the condition that only a certain level of adjacent band protection regulations are observed. For this reason, when an unlicensed band is used for cellular communication service, it is difficult to guarantee the communication quality to the level provided in the licensed band, and it is likely that interference with existing wireless communication devices (e.g., wireless LAN devices) using the unlicensed band occurs.

In order to use LTE and NR technologies in unlicensed bands, research on coexistence with existing devices for unlicensed bands and efficient sharing of wireless channels with other wireless communication devices is to be conducted in advance. That is, it is required to develop a robust coexistence mechanism (RCM) such that devices using LTE and NR technologies in the unlicensed band do not affect the existing devices for unlicensed bands.

DISCLOSURE

Technical Problem

An embodiment of the present invention is to provide a method for efficiently transmitting and receiving physical channels and signals in a wireless communication system, and an apparatus therefor. In addition, an embodiment of the present invention is to provide a method for transmitting and receiving physical channels and signals of a wireless communication system, and an apparatus using the same.

Technical Solution

According to an embodiment of the present invention, a base station in a wireless communication system in a wireless communication system includes: a communication module; and a processor configured to control the communication module. The processor is configured to attempt to transmit a synchronization signal and PBCH block (SSB) in SSB transmission candidate locations in a discovery reference signal (DRS) transmission window, and when SSB transmission fails in a first SSB transmission candidate location in a first DRS transmission window, attempt to transmit the SSB in a second SSB transmission candidate location, which is later than the first SSB transmission candidate location in the first DRS transmission window. The DRS transmission window may be a time interval in which the base station is able to transmit the SSB. The SSB transmission candidate location may indicate a time point at which the base station is able to start SSB transmission within the DRS transmission window.

The base station may be configured to transmit an SSB set including a plurality of SSBs within a predetermined DRS transmission window. Each of a plurality of SSB transmission candidate locations included in the DRS transmission window may be mapped to one SSB among the plurality of SSBs. In this case, when the base station succeeds in channel access before the first SSB transmission candidate location, the processor may be configured to transmit the SSB mapped to each of the at least one SSB transmission candidate location in each of the at least one SSB transmission candidate location in the DRS transmission window from the first SSB transmission candidate location. The maximum number of SSBs capable of being transmitted by the base station in the first DRS transmission window may be limited.

A mapping relationship between the SSB transmission candidate locations and the SSBs in the second DRS transmission window may be different from a mapping relationship between the SSB transmission candidate locations and the SSBs in the first DRS transmission window. In this case, the second DRS transmission window may be a DRS transmission window immediately after the first DRS transmission window in periodicity.

Indexes of the SSBs mapped to the respective SSB transmission candidate locations in the second DRS transmission window may be obtained by cyclically wrapping around indexes of the SSBs mapped to the respective SSB transmission candidate locations in the first DRS transmission window, and a unique index may be assigned to each of the plurality of SSBs in the SSB set.

Indexes of the SSBs mapped to the respective SSB transmission candidate locations in the second DRS transmission window may be obtained by assigning indexes of the SSBs mapped to the respective SSB transmission candidate locations in the first DRS transmission window in reverse order. In this case, a unique index may be assigned to each of the plurality of SSBs in the SSB set.

Duration of the DRS transmission window may have a fixed value. The DRS transmission window may be configured for the UE so as to repeat in a specific periodicity.

The subcarrier spacing used for the SSB transmission may be one of 15 kHz, 30 kHz, or 60 kHz. In this case, the processor may be configured to consecutively transmit a plurality of SSBs in time.

A value of the subcarrier spacing used for the SSB transmission may be one of 15 kHz, 30 kHz, or 60 kHz. In this case, the processor may be configured to terminate the SSB transmission before at least one orthogonal frequency division multiplexing (OFDM) symbol from the boundary between a slot in which the SSB transmission is performed and a slot subsequent to the slot in which the SSB transmission is performed.

The processor may be configured to perform channel access in units of n candidate locations, where "n" is a positive integer. "n" may be 1.

According to an embodiment of the present invention, a user equipment in a wireless communication system includes: a communication module; and a processor configured to control the communication module. The processor may be configured to attempt to receive a synchronization signal and PBCH block (SSB) in SSB transmission candidate locations in a discovery reference signal (DRS) transmission window, and when SSB reception fails in a first SSB transmission candidate location in a first DRS transmission window, attempt to receive the SSB in a second SSB transmission candidate location, which is later than the first SSB transmission candidate location in the first DRS transmission window. The DRS transmission window is a time interval in which the base station is able to transmit the SSB. The SSB transmission candidate location indicates a time point at which the user equipment is able to start SSB reception within the DRS transmission window.

After starting reception of SSB transmission from the first SSB transmission candidate location and completing the reception of the SSB transmission, the processor may be configured not to attempt to receive the same SSB in the first DRS transmission window.

The user equipment may be configured to receive an SSB set including a plurality of SSBs within the DRS transmission window. Each of a plurality of SSB transmission candidate locations included in the DRS transmission window may be mapped to one SSB among the plurality of SSBs. The processor may be configured to receive the SSB mapped to each of the at least one SSB transmission candidate location in each of the at least one SSB transmission candidate location in the first DRS transmission window from the first SSB transmission candidate location.

A mapping relationship between the SSB transmission candidate locations and the SSBs in the second DRS transmission window may be different from a mapping relationship between the SSB transmission candidate locations and the SSBs in the first DRS transmission window. The second DRS transmission window may be a DRS transmission window immediately after the first DRS transmission window in periodicity.

Indexes of the SSBs mapped to the respective SSB transmission candidate locations in the second DRS transmission window may be obtained by cyclically wrapping around indexes of the SSBs mapped to the respective SSB transmission candidate locations in the first DRS transmission window. In this case, a unique index may be assigned to each of the plurality of SSBs in the SSB set.

Indexes of the SSBs mapped to the respective SSB transmission candidate locations in the second DRS transmission window may be obtained by assigning indexes of the SSBs mapped to the respective SSB transmission candidate locations in the first DRS transmission window in reverse order. A unique index may be assigned to each of the plurality of SSBs in the SSB set.

Duration of the DRS transmission window may have a fixed value. In addition, the DRS transmission window may be configured for the UE so as to repeat in a specific periodicity.

A value of the subcarrier spacing used for the SSB transmission may be one of 15 kHz, 30 kHz, or 60 kHz. In this case, the processor may be configured to consecutively transmit a plurality of SSBs in time.

The subcarrier spacing used for the SSB transmission may be one of 15 kHz, 30 kHz, or 60 kHz. In this case, the processor may be configured to terminate the SSB transmission before at least one orthogonal frequency division multiplexing (OFDM) symbol from the boundary between a slot in which the SSB transmission is performed and a slot subsequent to the slot in which the SSB transmission is performed.

Advantageous Effects

An embodiment of the present invention provides a method for efficiently transmitting and receiving physical channels and signals in a wireless communication system, and an apparatus using the same.

The effects obtainable in the present invention are not limited to the above-mentioned effects, and other effects that are not mentioned above may be clearly understood by those of ordinary skill in the art from the following description

DESCRIPTION OF DRAWINGS

FIG. 19 shows the locations of OFDM symbols occupied by SSBs in a plurality of slots of a licensed band in an NR system according to an embodiment of the present invention.

FIG. 21 shows the locations of OFDM symbols in which SSBs are transmitted within a time interval of 1 ms in the case where a subcarrier spacing of 60 KHz is used and the maximum number of SSBs is 3 according to an embodiment of the present invention.

FIG. 22 shows the locations of OFDM symbols in which SSBs are transmitted within a time interval of 1 ms in the case where a subcarrier spacing of 60 KHz is used and the maximum number of SSBs is 4 according to an embodiment of the present invention.

FIG. 23 shows the locations of OFDM symbols in which SSBs are transmitted within a time interval of 1 ms in the case where a subcarrier spacing of 60 KHz is used and the maximum number of SSBs is 6 according to an embodiment of the present invention.

FIG. 24 shows the locations of OFDM symbols in which SSBs are transmitted within a time interval of 1 ms in the case where a subcarrier spacing of 60 KHz is used for SSB transmission and the maximum number of SSBs is 8 according to an embodiment of the present invention.

MODE FOR CARRYING OUT THE INVENTION

Figure 1:
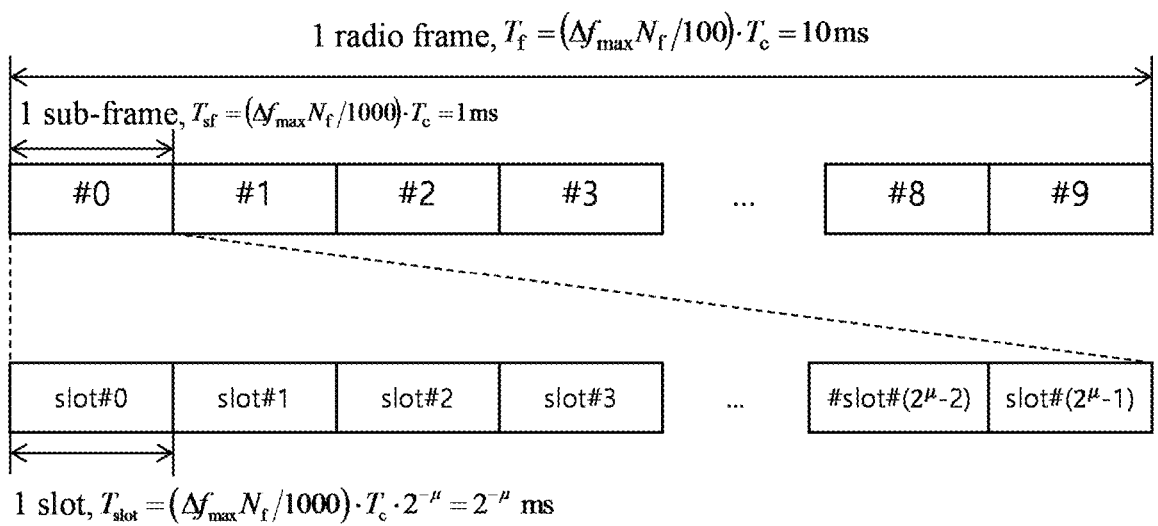
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max}N_f/100$) *$T_c$). In addition, the wireless frame includes 10 subframes (SFs) having equal sizes. Herein, $\Delta f_{max}$=480*$10^3$ Hz, $N_f$=4096, $T_c$=1/($\Delta f_{ref}$*$N_{f,ref}$), $\Delta f_{ref}$=15*$10^3$ Hz, and $N_{f,ref}$=2048. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is 15*$2^\mu$ kHz, and $\mu$ can have a value of $\mu$=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu$−1 may be respectively allocated to $2^\mu$ slots within one wireless frame. In addition, numbers from 0 to 10*$2^\mu$−1 may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
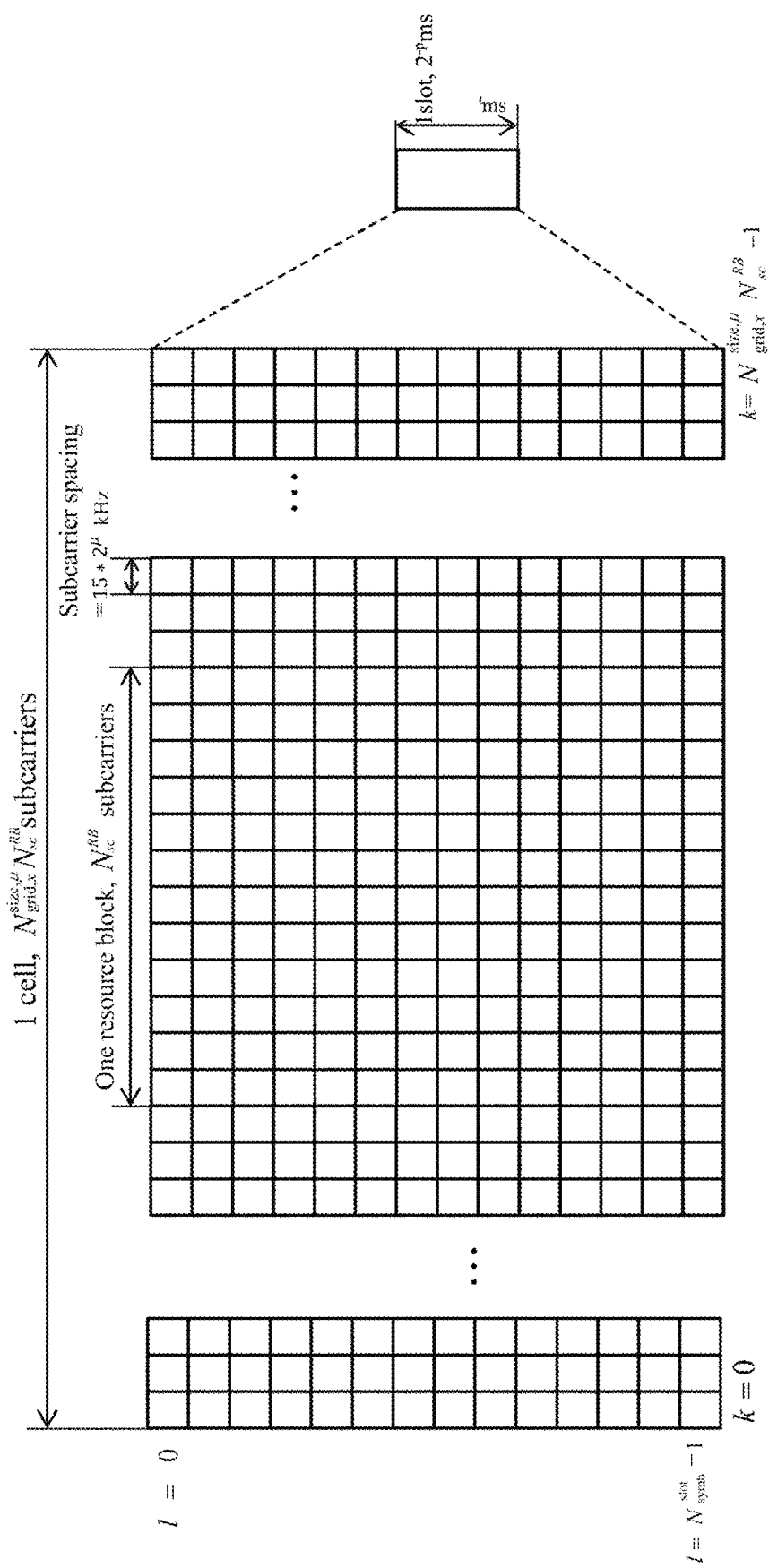
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}$*$N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}$=12. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}$*$N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}$*$N^{RB}_{sc}$ resource elements. Each resource element in the resource grid can be uniquely defined by a pair of indexes (k, l) in one slot. k may be an index assigned from 0 to $N^{size,\mu}_{grid,x}$*$N^{RB}_{sc}$−1 in the frequency domain, and l may be an index assigned from 0 to $N^{slot}_{symb}$−1 in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC IDLE mode), the UE may perform a random access procedure on the base station (steps S103 to S106). First, the UE can transmit a preamble through a physical random access channel (PRACH) (step S103) and receive a response message for the preamble from the base station through the PDCCH and the corresponding PDSCH (step S104). When

TABLE 1

| index | \multicolumn{14}{c|}{Symbol number in a slot} | index | \multicolumn{14}{c|}{Symbol number in a slot} |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | X | X | X | X | U | U |
| 6 | D | D | D | D | D | D | D | D | D | X | X | X | X | X | 34 | D | X | U | U | U | U | U | U | U | U | U | U | U | U |
| 7 | D | D | D | D | D | D | D | D | X | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | U | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | X | X | X | X | X | X | U |
| 16 | D | X | X | X | X | X | X | X | X | X | X | X | X | X | 44 | D | D | D | D | D | X | X | X | X | X | X | X | U | U |
| 17 | D | D | X | X | X | X | X | X | X | X | X | X | X | X | 45 | D | D | D | D | D | X | X | U | U | U | U | U | U | U |
| 18 | D | D | D | X | X | X | X | X | X | X | X | X | X | X | 46 | D | D | D | D | X | U | D | D | D | D | D | X | U | U |
| 19 | D | X | X | X | X | X | X | X | X | X | X | X | X | U | 47 | D | D | X | U | U | U | U | D | D | X | U | U | U | U |
| 20 | D | D | X | X | X | X | X | X | X | X | X | X | X | U | 48 | D | X | U | U | U | U | U | D | X | U | U | U | U | U |
| 21 | D | D | D | X | X | X | X | X | X | X | X | X | X | U | 49 | D | D | D | X | X | U | D | D | D | X | X | U | U | U |
| 22 | D | X | X | X | X | X | X | X | X | X | X | X | U | U | 50 | D | X | X | U | U | U | D | X | X | U | U | U | U | U |
| 23 | D | D | X | X | X | X | X | X | X | X | X | X | U | U | 51 | D | X | U | U | U | U | D | X | U | U | U | U | U | U |
| 24 | D | D | D | X | X | X | X | X | X | X | X | X | U | U | 52 | D | X | X | X | X | U | D | X | X | X | X | U | U | U |
| 25 | D | X | X | X | X | X | X | X | X | X | X | U | U | U | 53 | D | X | X | X | U | D | D | X | X | X | U | U | U | U |
| 26 | D | D | X | X | X | X | X | X | X | X | X | U | U | U | 54 | X | X | X | X | X | X | D | D | D | D | D | D | D | D |
| 27 | D | D | D | X | X | X | X | X | X | X | X | U | U | U | 55 | D | D | X | X | X | U | U | U | D | D | D | D | D | D |
| 56-255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
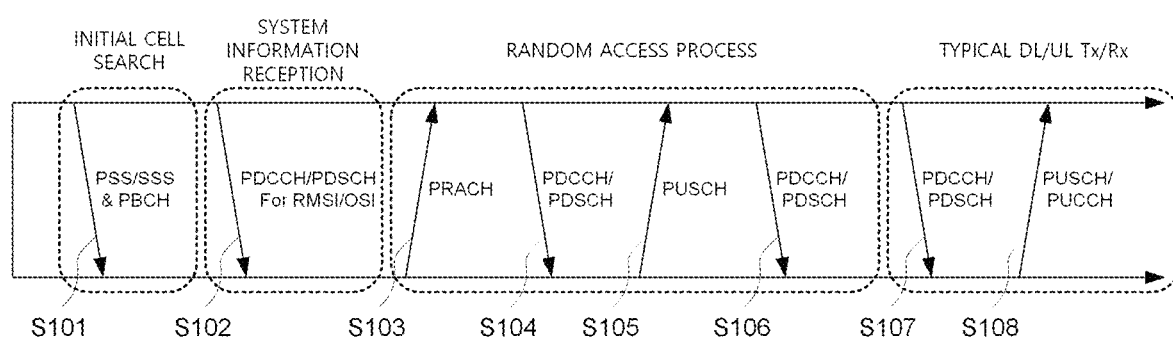
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (step S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (step S102). Herein, a valid random access response message is received by the UE, the UE transmits data including the identifier of the UE and the like to the base station through a physical uplink shared channel (PUSCH) indicated by the UL grant transmitted through the PDCCH from the base station (step S105). Next, the UE waits for reception of the PDCCH as an indication of the base station for collision resolution. If the UE successfully receives the PDCCH through the identifier of the UE (step S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (step S107) and transmits a physical uplink shared channel (PUSCH)/physical uplink control channel (PUCCH) (step S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
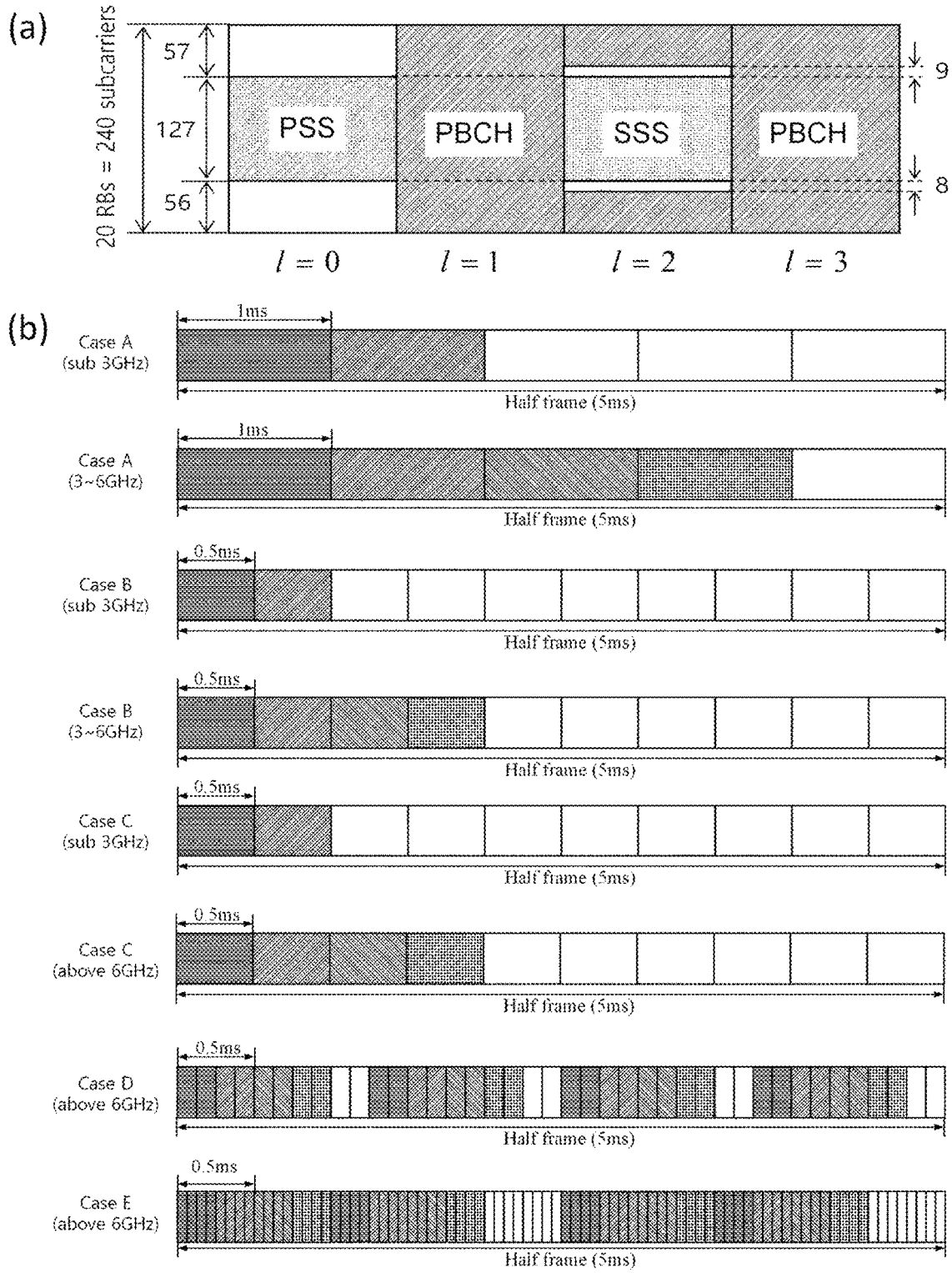
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(a), a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |

TABLE 2-continued

| Channel or signal | OFDM symbol number l relative to the start of an SS/PBCH block | Subcarrier number k relative to the start of an SS/PBCH block |
|---|---|---|
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N^{(2)}_{ID}) \mod 127$$

$$0 \leq n \leq 127$$

Here, $x(i+7)=(x(i+4)+x(i)) \mod 2$ and is given as $$[x(6)\ x(5)\ x(4)\ x(3)\ x(2)\ x(1)\ x(0)]=[1\ 1\ 0\ 1\ 1\ 0]$$

Further, the sequence $d_{SSS}(n)$ of the SSS is as follows.

$$d_{SSS}(n) = [1 - 2x_0((n+m_0) \mod 127)][1 - 2x_1((n+m_1) \mod 127)]$$

$$m_0 = 15\left\lfloor \frac{N^{(1)}_{ID}}{112} \right\rfloor + 5N^{(2)}_{ID}$$

$$m_1 = N^{(1)}_{ID} \mod 112$$

$$0 \leq n < 127$$

Here, $x_0(i+7)=(x_0(i+4)+x_0(i)) \mod 2$ $x_1(i+7)=(x_1(i+1)+x_1(i)) \mod 2$ and is given as $$[x_0(6)\ x_0(5)\ x_0(4)\ x_0(3)\ x_0(2)\ x_0(1)\ x_0(0)]=[0\ 0\ 0\ 0\ 0\ 0\ 1]$$

$$[x_1(6)\ x_1(5)\ x_1(4)\ x_1(3)\ x_1(2)\ x_1(1)\ x_1(0)]=[0\ 0\ 0\ 0\ 0\ 0\ 1]$$

A radio frame with a 10 ms length may be divided into two half frames with a 5 ms length. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
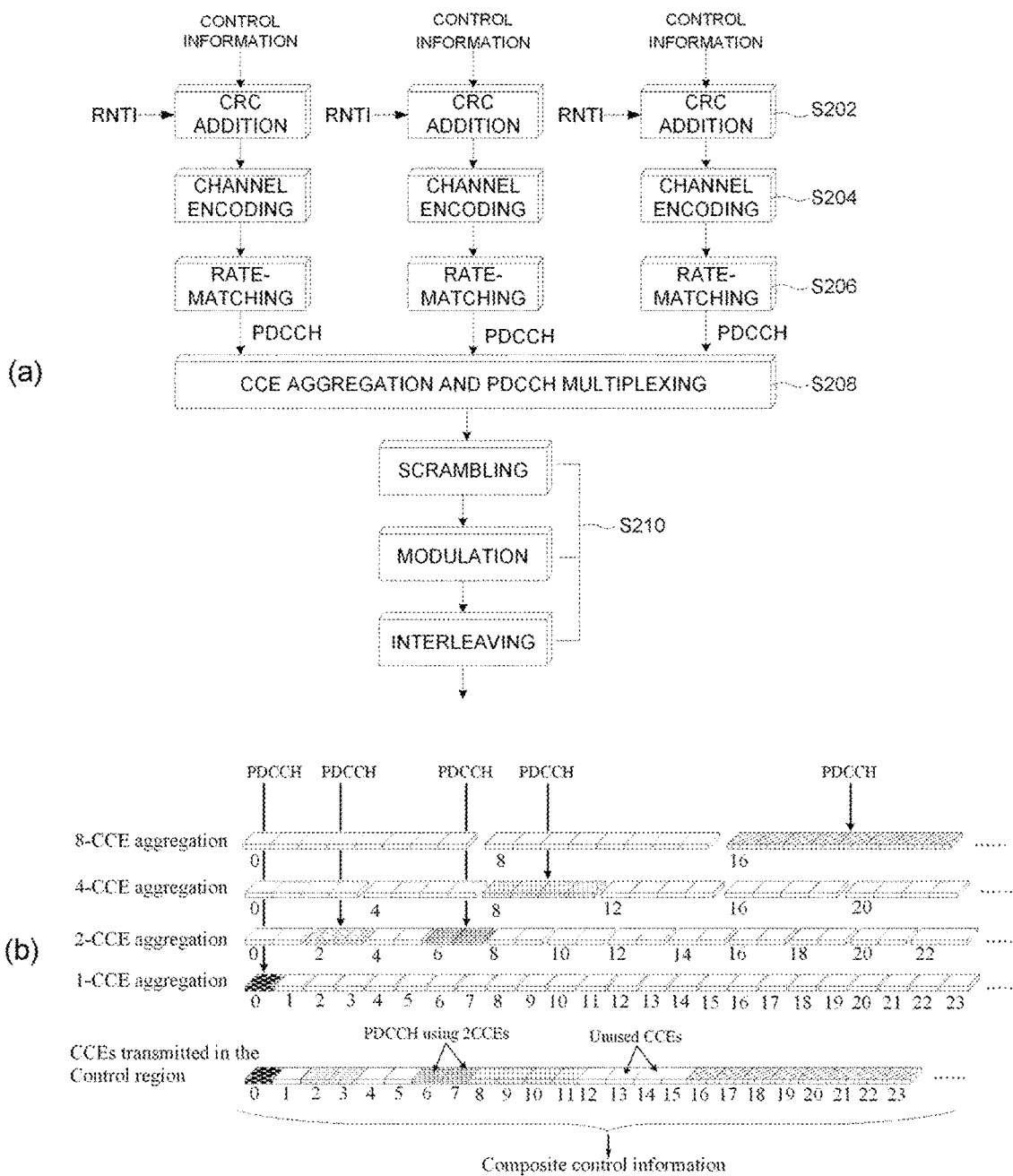
FIG. 5 illustrates a procedure for transmitting control information and a control channel in a 3GPP NR system.

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (step S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (step S206) according to the amount of resource(s) used for PDCCH transmission after performing channel encoding (e.g., polar coding) (step S204). Thereafter, the base station may multiplex the DCI(s) based on the control channel element (CCE) based PDCCH structure (step S208). In addition, the base station may apply an additional process (step S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5(b) is a diagram related to a CCE aggregation level and the multiplexing of a PDCCH and illustrates the type of a CCE aggregation level used for one PDCCH and CCE(s) transmitted in the control area according thereto.

Figure 6:
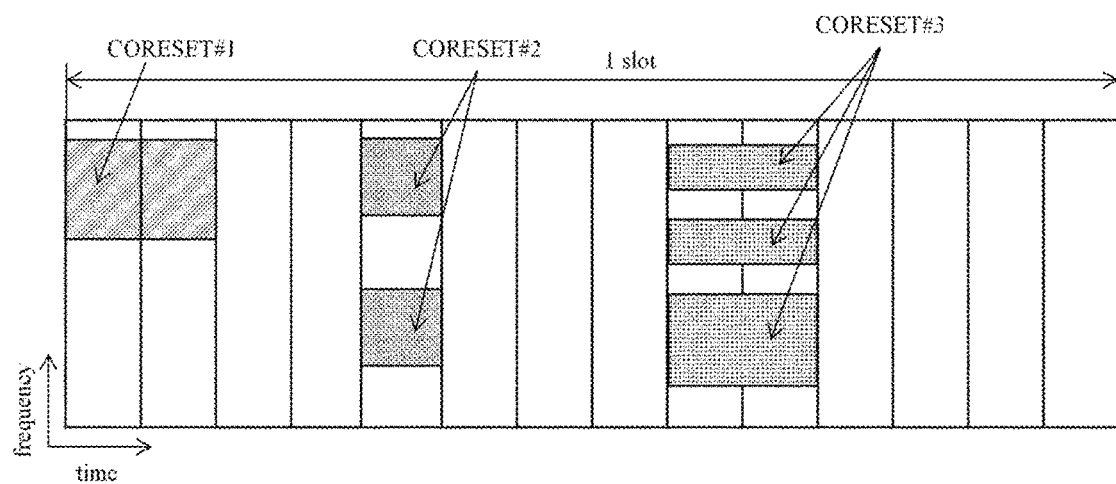
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
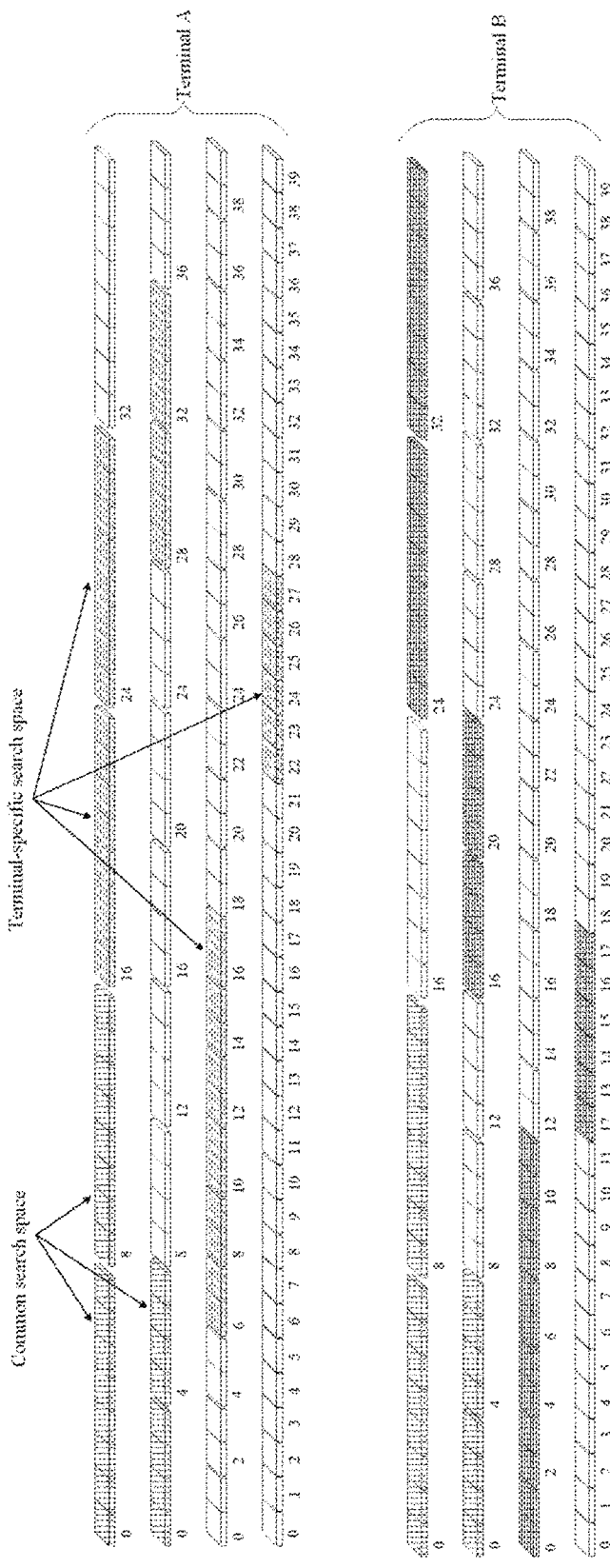
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARD). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | <2 |
| 1 | 4-14 | <2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
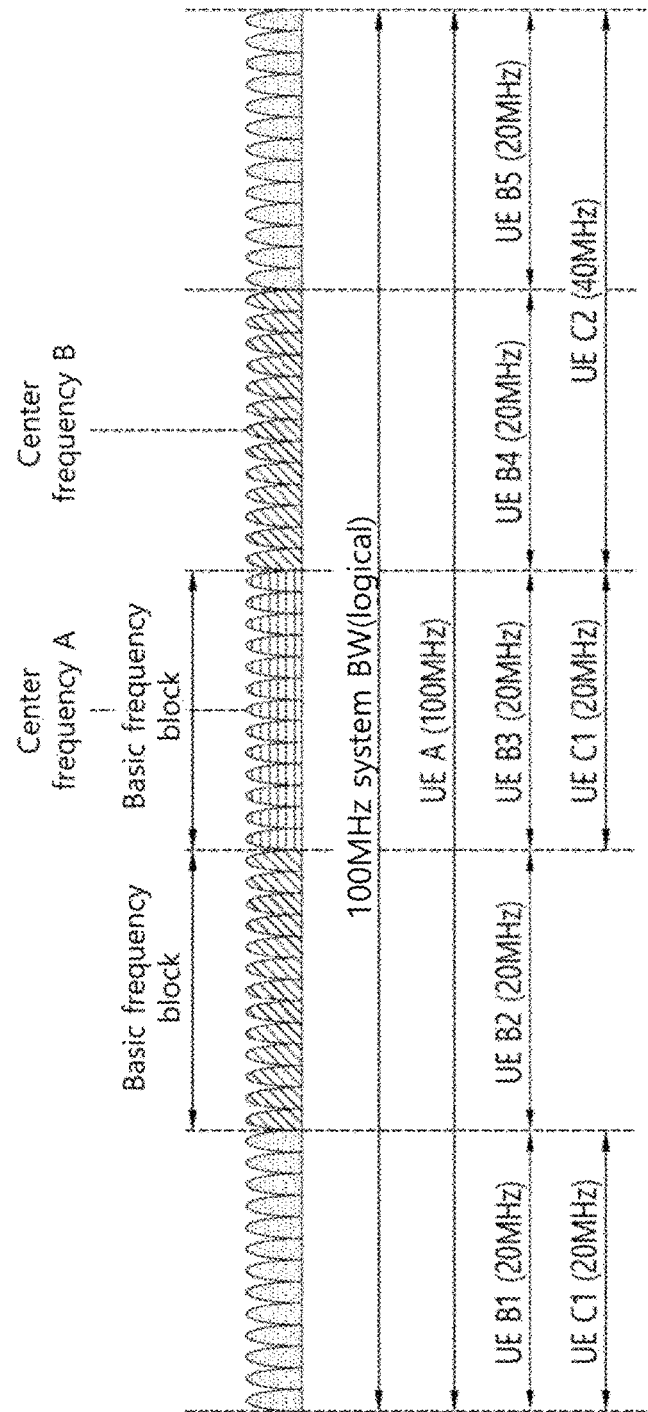
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
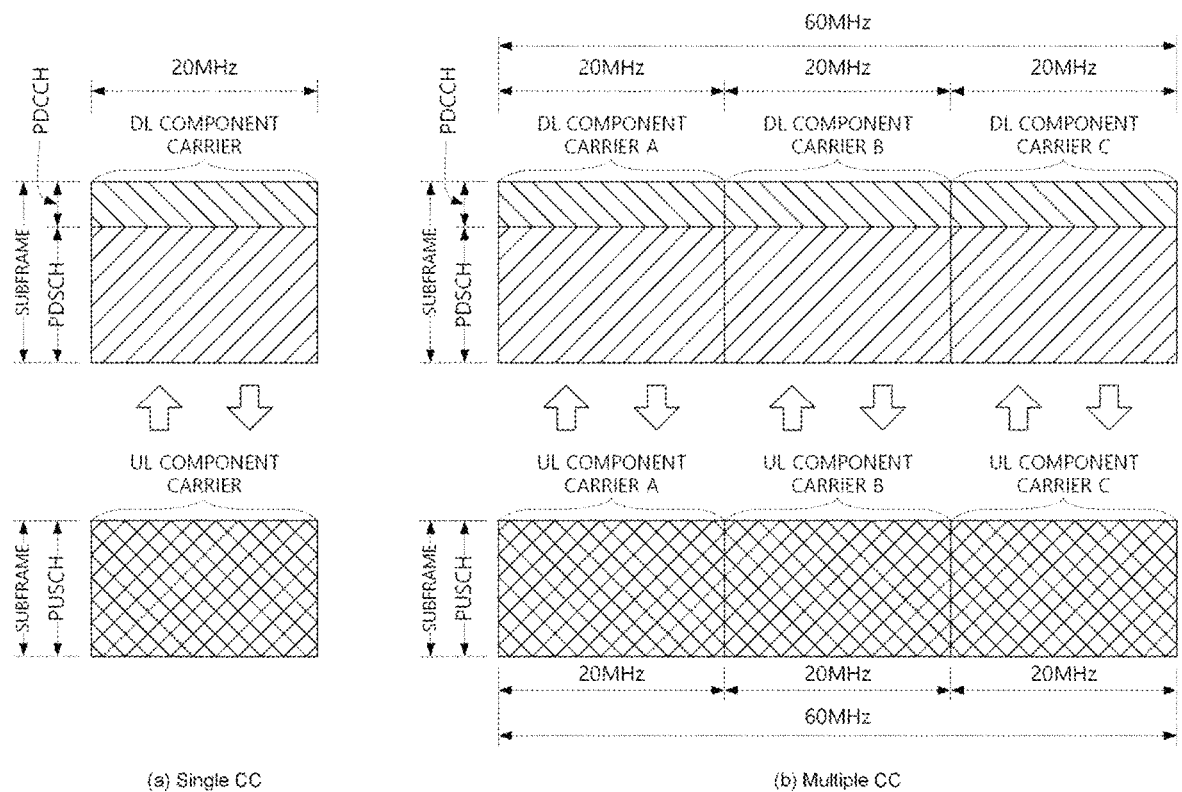
FIG. 9 is a diagram for explaining single carrier communication and multiple carrier communication.

FIG. 9 is a drawing for explaining single carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
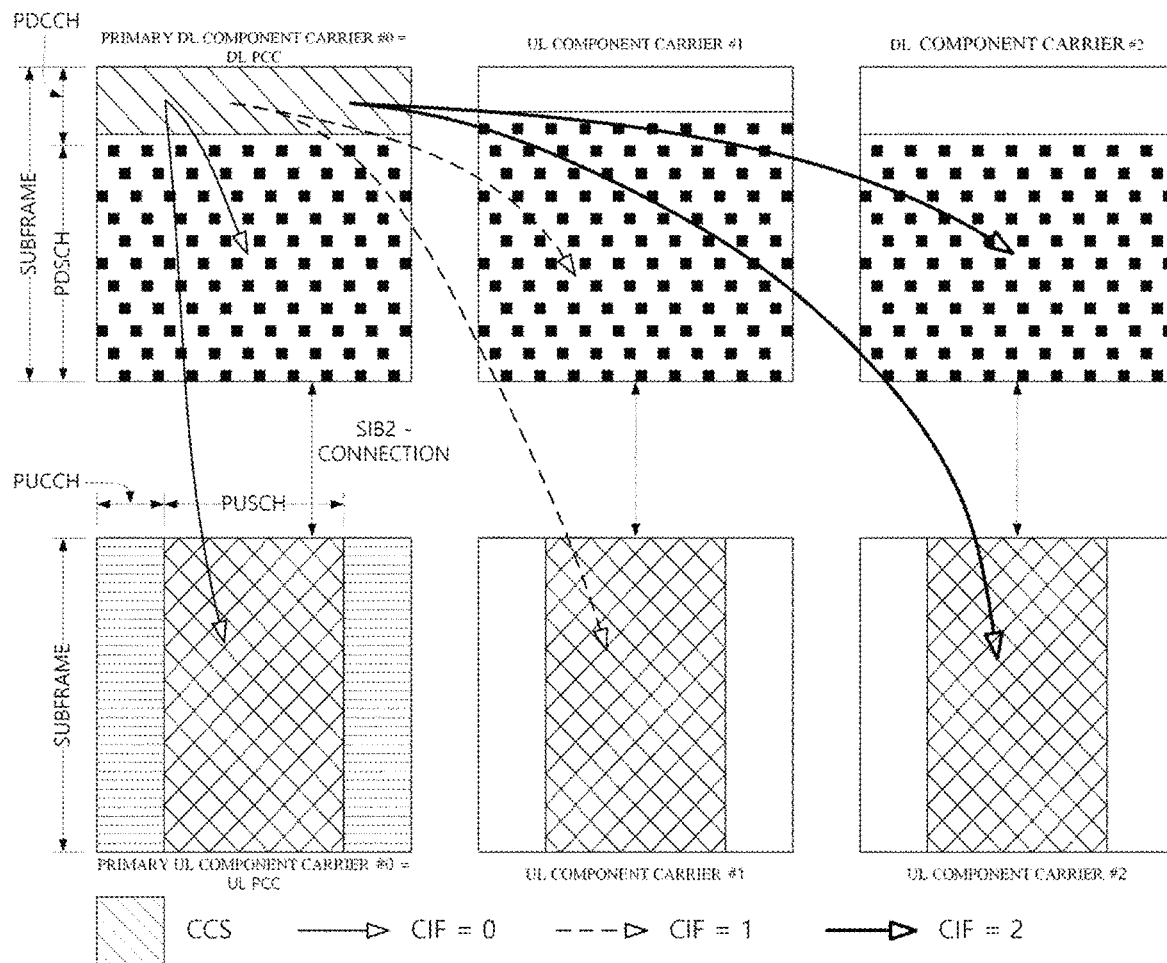
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
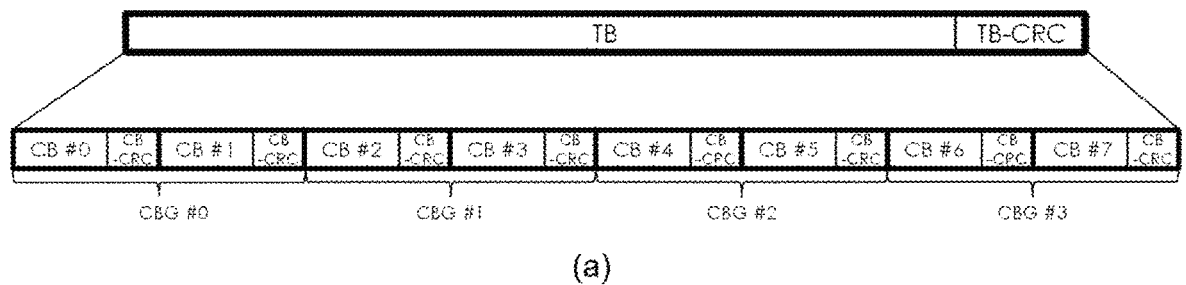
FIG. 11 illustrates a code block group (CBG) configuration and time frequency resource mapping thereof according to an embodiment of the present invention.
Figure 11:
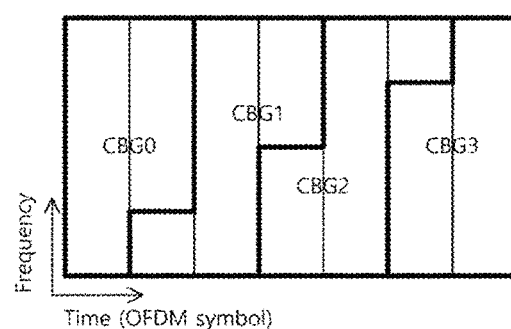

FIG. 11 illustrates a code block group (CBG) configuration and time frequency resource mapping thereof according to an embodiment of the present invention. More specifically, FIG. 11(a) illustrates an embodiment of a CBG configuration included in one transport block (TB), and FIG. 11(b) illustrates a time-frequency resource mapping of the CBG configuration.

A channel code defines the maximum supported length. For example, the maximum supported length of the turbo code used in 3GPP LTE (-A) is 6144 bits. However, the length of a transport block (TB) transmitted on the PDSCH may be longer than 6144 bits. If the length of the TB is longer than the maximum supported length, the TB may be divided into code blocks (CBs) having a maximum length of 6144 bits. Each CB is a unit in which channel coding is performed. Additionally, for efficient retransmission, several CBs may be grouped to configure one CBG. The UE and the base station require information on how the CBG is configured.

The CBG and the CB within the TB may be configured according to various embodiments. According to an embodiment, the number of available CBGs may be determined as a fixed value, or may be configured with RRC configuration information between the base station and the UE. In this case, the number of CBs is determined with the length of the TB, and the CBG may be configured depending on the information on the determined number. According to another embodiment, the number of CBs to be included in one CBG may be determined as a fixed value, or may be configured with RRC configuration information between the base station and the UE. In this case, if the number of CBs is determined with the length of the TB, the number of the CBGs may be configured depending on the information on the number of CBs per CBG.

Referring to the embodiment of FIG. 11(a), one TB may be divided into eight CBs. Eight CBs may be grouped into four CBGs again. The mapping relationship between the CBs and the CBGs (or CBG configuration) may be configured as static between the base station and the UE, or may be established as semi-static with RRC configuration information. According to another embodiment, the mapping relationship may be configured through dynamic signaling. When the UE receives the PDCCH transmitted by the base station, the UE may directly or indirectly identify the mapping relationship between the CB and the CBG (or CBG configuration) through explicit information and/or implicit information. One CBG may include only one CB, or may include all CBs constituting one TB. For reference, the techniques presented in the embodiments of the present invention may be applied regardless of the configuration of the CB and the CBG.

Referring to FIG. 11(b), CBGs constituting one TB are mapped to time-frequency resources for which the PDSCH is scheduled. According to an embodiment, each of the CBGs may be allocated first on the frequency axis and then extended on the time axis. When a PDSCH consisting of one TB including four CBGs is allocated to seven OFDM symbols, CBG0 may be transmitted over the first and second OFDM symbols, CBG1 may be transmitted over the second, third, and fourth OFDM symbols, CBG2 may be transmitted over the fourth, fifth, and sixth OFDM symbols, and CBG3 may be transmitted over the sixth and seventh OFDM symbols. The time-frequency mapping relationship allocated with the CBG and PDSCH may be determined between the base station and the UE. However, the mapping relationship illustrated in FIG. 11(b) is an embodiment for describing the present invention, and the techniques presented in the embodiment of the present invention may be applied regardless of the time-frequency mapping relationship of the CBG.

Figure 12:
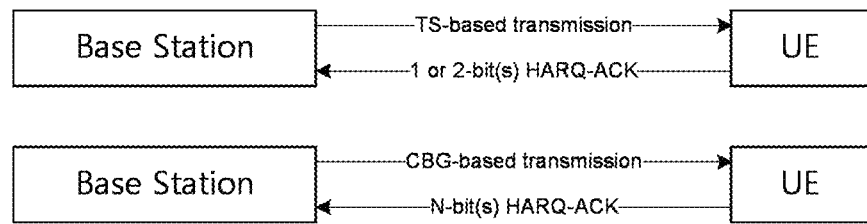
FIG. 12 illustrates a procedure in which a base station performs a TB-based transmission or a CBG-based transmission, and a UE transmits a HARQ-ACK in response thereto, according to an embodiment of the present invention.

FIG. 12 illustrates a procedure in which a base station performs a TB-based transmission or a CBG-based transmission, and a UE transmits a HARQ-ACK in response thereto. Referring to FIG. 12, the base station may configure a transmission scheme suitable for the UE of the TB-based transmission and the CBG-based transmission. The UE may transmit HARQ-ACK information bit(s) according to the transmission scheme configured by the base station through the PUCCH or PUSCH. The base station may configure the PDCCH to schedule the PDSCH to be transmitted to the UE. The PDCCH may schedule the TB-based transmission and/or the CBG-based transmission. For example, one TB or two TBs may be scheduled on the PDCCH. If one TB is scheduled, the UE has to feedback 1-bit HARQ-ACK. If two TBs are scheduled, a 2-bit HARQ-ACK has to be fed back for each of the two TBs. In order to eliminate ambiguity between the base station and the UE, a predetermined order may exist between each information bit of the 2-bit HARQ-ACK and two TBs. For reference, when the MIMO transmission rank or layer is low, one TB may be transmitted on one PDSCH, and when the MIMO transmission rank or layer is high, two TBs may be transmitted on one PDSCH.

The UE may transmit a 1-bit TB-based HARQ-ACK per one TB to inform the base station whether or not the reception of each TB is successful. In order to generate a HARQ-ACK for one TB, the UE may check the reception error of the TB through a TB-CRC. When the TB-CRC for the TB is successfully checked, the UE generates an ACK for the HARQ-ACK of the TB. However, if a TB-CRC error for the TB occurs, the UE generates a NACK for the HARQ-ACK of the TB. The UE transmits TB-based HARQ-ACK(s) generated as described above to the base station. The base station retransmits the TB of response with a NACK, among the TB-based HARQ-ACK(s) received from the UE.

In addition, the UE may transmit a 1-bit CBG-based HARQ-ACK per one CBG to inform the base station whether or not the reception of each CBG is successful. In order to generate a HARQ-ACK for one CBG, the UE may decode all CBs included in the CBG and check the reception error of each CB through the CB-CRC. When the UE successfully receives all CBs constituting one CBG (that is, when all CB-CRCs are successfully checked), the UE generates an ACK for the HARQ-ACK of the CBG. However, when the UE does not successfully receive at least one of the CBs constituting one CBG (that is, when at least one CB-CRC error occurs), the UE generates a NACK for the HARQ-ACK of the CBG. The UE transmits the CBG-based HARQ-ACK(s) generated as described above to the base station. The base station retransmits the CBG of response with a NACK, among the CBG-based HARQ-ACK(s) received from the UB. According to an embodiment, the CB configuration of the retransmitted CBG may be the same as the CB configuration of the previously transmitted CBG. The length of the CBG-based HARQ-ACK information bit(s) transmitted by the UE to the base station may be determined based on the number of CBGs transmitted through the PDSCH or the maximum number of CBGs configured with RRC signals.

On the other hand, even when the UE successfully receives all the CBGs included in the TB, a TB-CRC error for the TB may occur. In this case, the UE may perform flipping of the CBG-based HARQ-ACK in order to request retransmission for the TB. That is, even though all CBGs included in the TB are successfully received, the UE may generate all of the CBG-based HARQ-ACK information bits as NACKs. Upon receiving the CBG-based HARQ-ACK feedback in which all HARQ-ACK information bits are NACKs, the base station retransmits all CBGs of the TB.

According to an embodiment of the present invention, CBG-based HARQ-ACK feedback may be used for the successful transmission of the TB. The base station may indicate the UE to transmit a CBG-based HARQ-ACK. In this case, a retransmission technique according to the CBG-based HARQ-ACK may be used. The CBG-based HARQ-ACK may be transmitted through a PUCCH. In addition, when the UCI is configured to be transmitted through the PUSCH, the CBG-based HARQ-ACK may be transmitted through the PUSCH. In the PUCCH, the configuration of the HARQ-ACK resource may be configured through an RRC signal. In addition, an actually transmitted HARQ-ACK resource may be indicated through a PDCCH scheduling a PDSCH transmitted based on the CBG. The UE may transmit HARQ-ACK(s) for whether or not the reception of transmitted CBGs is transmitted, through one PUCCH resource indicated through the PDCCH among PUCCH resources configured with RRC.

The base station may identify whether the UE has successfully received the CBG(s) transmitted to the UE through CBG-based HARQ-ACK feedback of the UE. That is, through the HARQ-ACK for each CBG received from the UE, the base station may recognize the CBG(s) that the UE has successfully received and the CBG(s) that the UE has failed to receive. The base station may perform CBG retransmission based on the received CBG-based HARQ-ACK. More specifically, the base station may bundle and retransmit only the CBG(s) of HARQ-ACKs of response with failure, in one TB. In this case, the CBG(s) for which the HARQ-ACKs is responded with successful reception are excluded from retransmission. The base station may schedule the retransmitted CBG(s) as one PDSCH and transmit it to the UE.

<Communication Method in Unlicensed Band>

Figure 13:
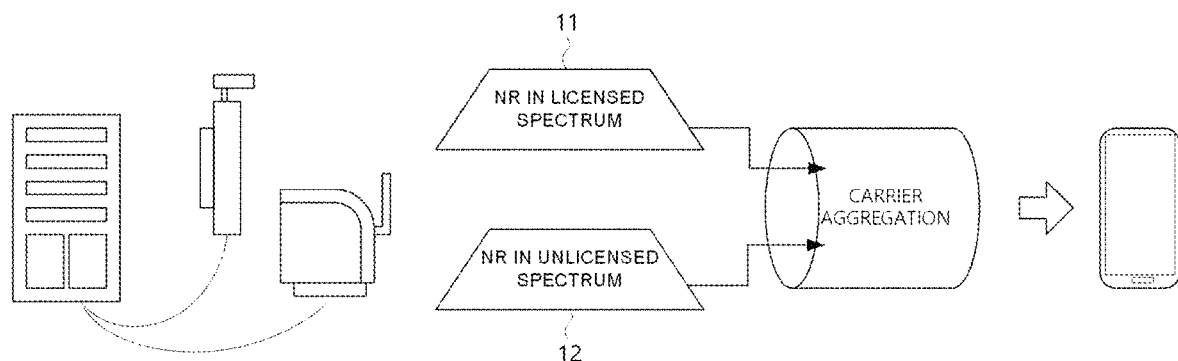
FIG. 13 illustrates a New Radio-Unlicensed (NR-U) service environment.

FIG. 13 illustrates a New Radio-Unlicensed (NR-U) service environment.

Referring to FIG. 13, a service environment in which NR technology 11 in the existing licensed band and NR-Unlicensed (NR-U), i.e., NR technology 12 in the unlicensed band may be provide to the user. For example, in the NR-U environment, NR technology 11 in the licensed band and the NR technology 12 in the unlicensed band may be integrated using technologies such as carrier aggregation which may contribute to network capacity expansion. In addition, in an asymmetric traffic structure with more downlink data than uplink data, NR-U can provide an NR service optimized for various needs or environments. For convenience, the NR technology in the licensed band is referred to as NR-L (NR-Licensed), and the NR technology in the unlicensed band is referred to as NR-U (NR-Unlicensed).

Figure 14:
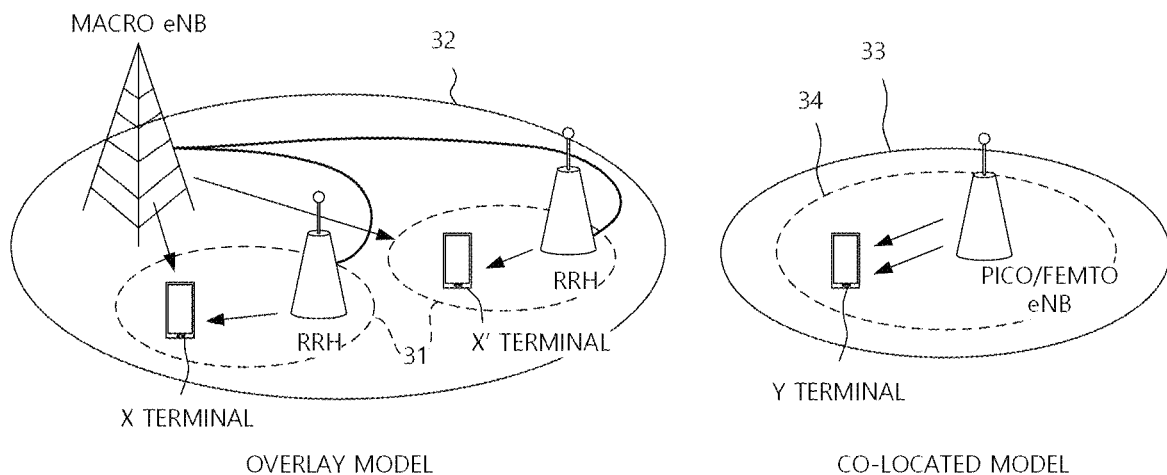
FIG. 14 illustrates an embodiment of an arrangement scenario of a UE and a base station in an NR-U service environment.

FIG. 14 illustrates a deployment scenario of a user equipment and a base station in an NR-U service environment. A frequency band targeted by the NR-U service environment has short radio communication range due to the high frequency characteristics. Considering this, the deployment scenario of the user equipment and the base station may be an overlay model or a co-located model in an environment in which coexist the existing NR-L service and NR-U service.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the NR-U service as an auxiliary downlink channel of the NR-L service through the carrier aggregation.

In the co-located model, a pico/femto base station may perform the wireless communication with a Y UE by using both the licensed carrier and the unlicensed carrier. However, it may be limited that the pico/femto base station uses both the NR-L service and the NR-U service to downlink transmission. A coverage (33) of the NR-L service and a coverage (34) of the NR-U service may be different according to the frequency band, transmission power, and the like.

When NR communication is performed in the unlicensed band, conventional equipments (e.g., wireless LAN (Wi-Fi) equipments) which perform communication in the corresponding unlicensed band may not demodulate an NR-U message or data. Therefore, conventional equipments determine the NR-U message or data as a kind of energy to perform an interference avoidance operation by an energy detection technique. That is, when energy corresponding to the NR-U message or data is lower than −62 dBm or certain energy detection (ED) threshold value, the wireless LAN equipments may perform communication by disregarding the corresponding message or data. As a result, that user equipment which performs the NR communication in the unlicensed band may be frequently interfered by the wireless LAN equipments.

Therefore, a specific frequency band needs to be allocated or reserved for a specific time in order to effectively implement an NR-U technology/service. However, since peripheral equipments which perform communication through the unlicensed band attempt access based on the energy detection technique, there is a problem in that an efficient NR-U service is difficult. Therefore, a research into a coexistence scheme with the conventional unlicensed band device and a scheme for efficiently sharing a radio channel needs to be preferentially made in order to settle the NR-U technology. That is, a robust coexistence mechanism in which the NR-U device does not influence the conventional unlicensed band device needs to be developed.

Figure 15:
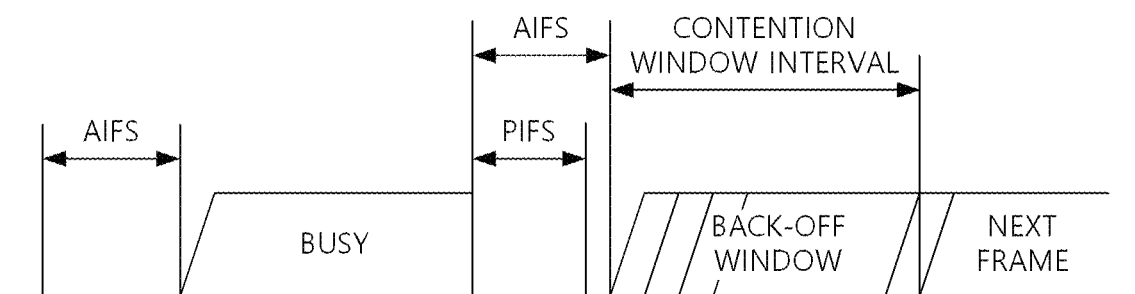
FIG. 15 illustrates a communication method (e.g., wireless LAN) operating in an existing unlicensed band.

FIG. 15 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 15, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration represents a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT
The Tx entity does not perform the LBT procedure for transmission.

Category 2: LBT without Random Backoff
The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 μs length, but the present invention is not limited thereto.

Category 3: LBT Performing Random Backoff Using CW of Fixed Size
The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 μs, but the present invention is not limited thereto. The backoff counter N is decreased by 1 from the initial value, and when the value of the backoff counter N reaches 0, the Tx entity may perform the transmission. Meanwhile, in order to perform backoff, the Tx entity first senses whether the channel is idle during a second interval (that is, a defer duration $T_d$). According to an embodiment of the present invention, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 μs and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size

The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present invention, a first type channel access may refer to a Category 4 channel access, and a second type channel access may refer to a Category 2 channel access.

Figure 16:
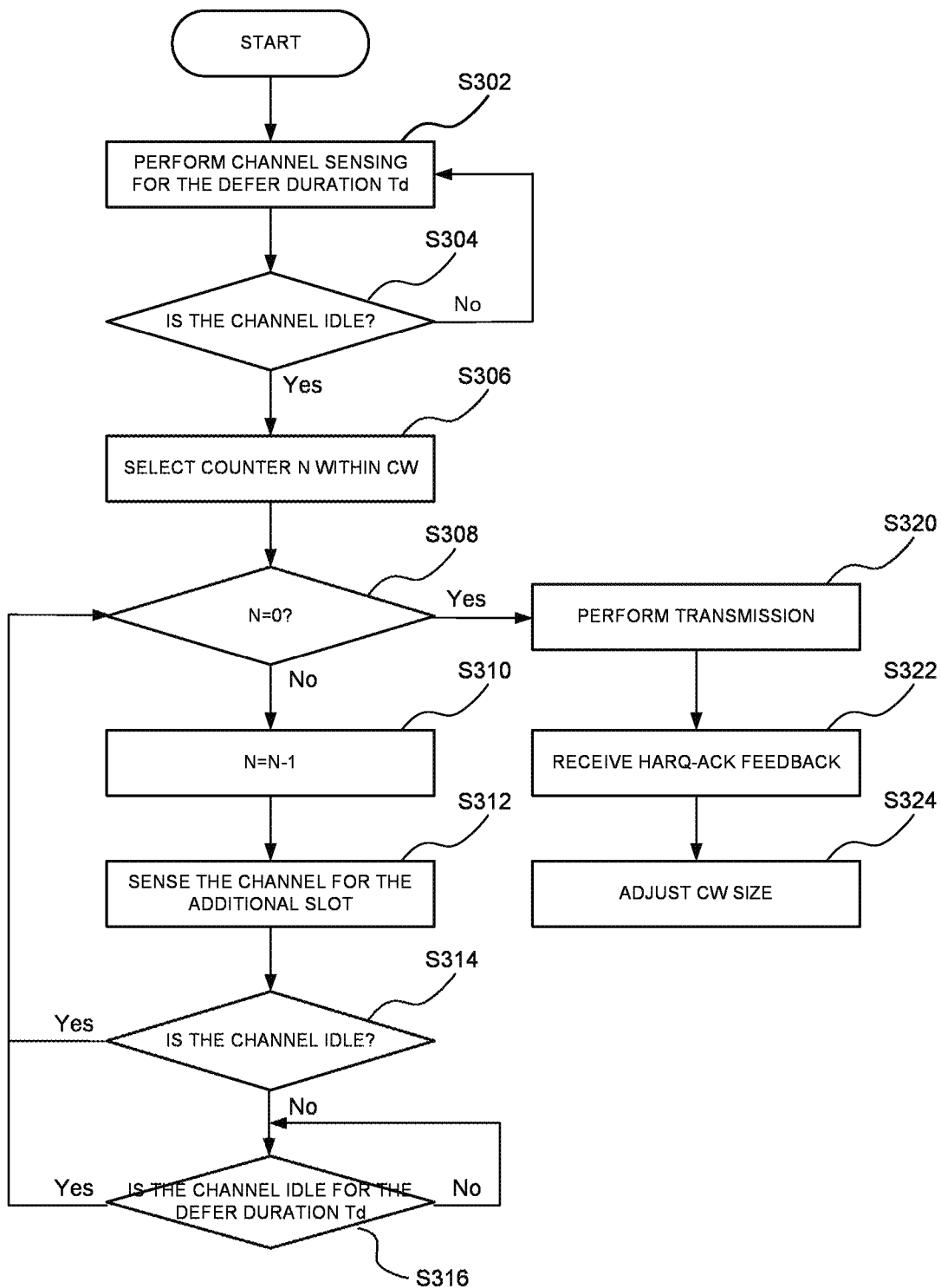
FIG. 16 illustrates a channel access procedure based on Category 4 LBT according to an embodiment of the present invention.

FIG. 16 illustrates a channel access procedure based on Category 4 LBT according to an embodiment of the present invention.

In order to perform the channel access, first, the Tx entity performs channel sensing for the defer duration $T_d$ (step S302). According to an embodiment of the present invention, the channel sensing for a defer duration $T_d$ in step S302 may be performed through channel sensing for at least a portion of the defer duration $T_d$. For example, the channel sensing for the defer duration $T_d$ may be performed through the channel sensing during one slot period within the defer duration $T_d$. The Tx entity checks whether the channel is idle through the channel sensing for the defer duration $T_d$ (step S304). If the channel is sensed to be idle for the defer duration $T_d$, the Tx entity proceeds to step S306. If the channel is not sensed to be idle for the defer duration $T_d$ (that is, sensed to be busy), the Tx entity returns to step S302. The Tx entity repeats steps S302 to S304 until the channel is sensed to be idle for the defer duration $T_d$. The defer duration $T_d$ may be set based on the channel access priority class of the Tx entity, and consists of a period of 16 μs and m consecutive slot periods. Here, m is a value set according to the channel access priority class.

Next, the Tx entity obtains a random value within a predetermined CW, sets the random value to the initial value of the backoff counter (or backoff timer) N (step S306), and proceeds to step S308. The initial value of the backoff counter N is randomly selected from values between 0 and CW. The Tx entity performs the backoff procedure by using the set backoff counter N. That is, the Tx entity performs the backoff procedure by repeating steps S308 to S316 until the value of the backoff counter N reaches 0. Meanwhile, FIG. 16 illustrates that step S306 is performed after the channel is sensed to be idle for the defer duration $T_d$, but the present invention is not limited thereto. That is, step S306 may be performed independently of steps S302 to S304, and may be performed prior to steps S302 to S304. When step S306 is performed prior to steps S302 to S304, if the channel is sensed to be idle for the defer duration $T_d$ by steps S302 to S304, the Tx entity proceeds to step S308.

In step S308, the Tx entity checks whether the value of the backoff counter N is 0. If the value of the backoff counter N is 0, the Tx entity proceeds to step S320 to perform a transmission. If the value of the backoff counter N is not 0, the Tx entity proceeds to step S310. In step S310, the Tx entity decreases the value of the backoff counter N by 1. According to an embodiment, the Tx entity may selectively decrease the value of the backoff counter by 1 in the channel sensing process for each slot. In this case, step S310 may be skipped at least once by the selection of the Tx entity. Next, the Tx entity performs channel sensing for an additional slot period (step S312). The Tx entity checks whether the channel is idle through the channel sensing for the additional slot period (step S314). If the channel is sensed to be idle for the additional slot period, the Tx entity returns to step S308. In this way, the Tx entity may decrease the backoff counter by 1 whenever the channel is sensed to be idle for a predetermined slot period. Here, the predetermined slot period may be 9 μs, but the present invention is not limited thereto.

In step S314, if the channel is not sensed to be idle for the additional slot period (that is, sensed to be busy), the Tx entity proceeds to step S316. In step S316, the Tx entity checks whether the channel is idle for the additional defer duration $T_d$. According to an embodiment of the present invention, the channel sensing in step S316 may be performed in units of slots. That is, the Tx entity checks whether the channel is sensed to be idle during all slot periods of the additional defer duration $T_d$. When the busy slot is detected within the additional defer duration $T_d$, the Tx entity immediately restarts step S316. When the channel is sensed to be idle during all slot periods of the additional defer duration $T_d$, the Tx entity returns to step S308.

On the other hand, if the value of the backoff counter N is 0 in the check of step S308, the Tx entity performs the transmission (step S320). The Tx entity receives a HARQ-ACK feedback corresponding to the transmission (step S322). The Tx entity may check whether the previous transmission is successful through the received HARQ-ACK feedback. Next, the Tx entity adjusts the CW size for the next transmission based on the received HARQ-ACK feedback (step S324).

As described above, after the channel is sensed to be idle for the defer duration $T_d$, the Tx entity may perform the transmission when the channel is idle for N additional slot periods. As described above, the Tx entity may be a base station or a UE, and the channel access procedure of FIG. 16 may be used for downlink transmission of the base station and/or uplink transmission of the UE.

Hereinafter, a method for adaptively adjusting a CWS when accessing a channel in an unlicensed band is presented. The CWS may be adjusted based on UE (User Equipment) feedback, and UE feedback used for CWS adjustment may include the HARQ-ACK feedback and CQI/PMI/RI. In the present invention, a method for adaptively adjusting a CWS based on the HARQ-ACK feedback is presented. The HARQ-ACK feedback includes at least one of ACK, NACK, DTX, and NACK/DTX.

As described above, the CWS is adjusted based on ACK even in a wireless LAN system. When the ACK feedback is received, the CWS is reset to the minimum value (CWmin), and when the ACK feedback is not received, the CWS is increased. However, in a cellular system, a CWS adjustment method in consideration of multiple access is required.

First, for the description of the present invention, terms are defined as follows.

- Set of HARQ-ACK feedback values (i.e., HARQ-ACK feedback set): refers to HARQ-ACK feedback value(s) used for CWS update/adjustment. The HARQ-ACK feedback set is decoded at a time when the CWS is determined and corresponds to available HARQ-ACK feedback values. The HARQ-ACK feedback set includes HARQ-ACK feedback value(s) for one or more DL (channel) transmissions (e.g., PDSCH) on an unlicensed band carrier (e.g., Scell, NR-U cell). The HARQ-ACK feedback set may include HARQ-ACK feedback value(s) for a DL (channel) transmission (e.g., PDSCH), for example, a plurality of HARQ-ACK feedback values fed back from a plurality of UEs. The HARQ-ACK feedback value may indicate reception response information for the code block group (CBG) or the transport block (TB), and may indicate any one of ACK, NACK, DTX, or NACK/DTX. Depending on the context, the HARQ-ACK feedback value may be mixed with terms such as a HARQ-ACK value, a HARQ-ACK information bit, and a HARQ-ACK response.
- Reference window: refers to a time interval in which a DL transmission (e.g., PDSCH) corresponding to the HARQ-ACK feedback set is performed in an unlicensed band carrier (e.g., Scell, NR-U cell). A reference window may be defined in units of slots or subframes according to embodiments. The reference window may indicate one or more specific slots (or subframes). According to an embodiment of the present invention, the specific slot (or reference slot) may include a start slot of the most recent DL transmission burst in which at least some HARQ-ACK feedback is expected to be available.

Figure 17:
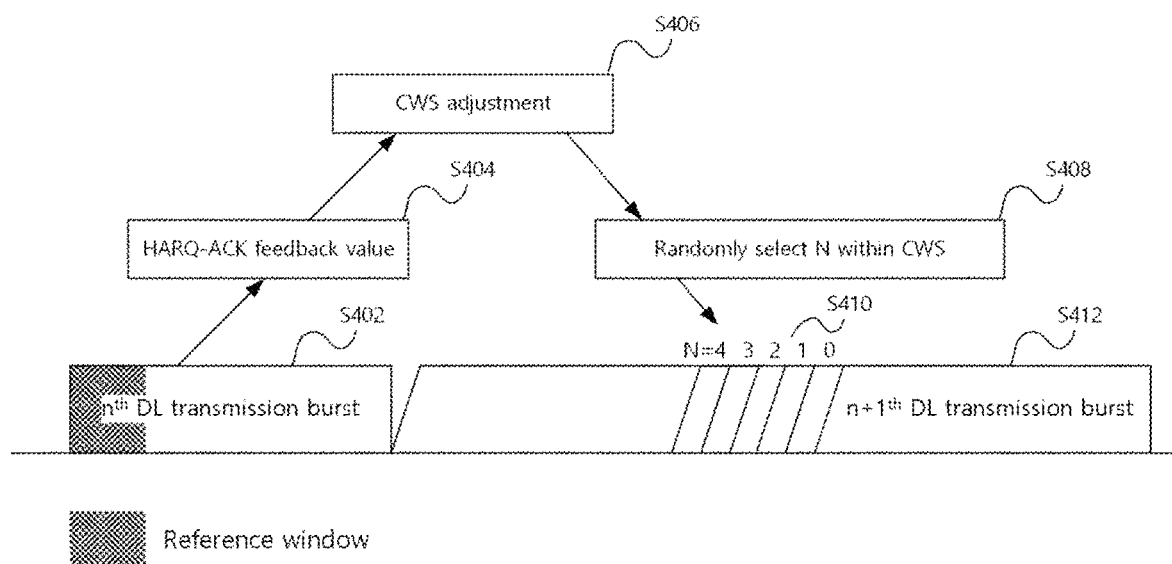
FIG. 17 illustrates an embodiment of a method of adjusting a contention window size (CWS) based on HARQ-ACK feedback.

FIG. 17 illustrates an embodiment of a method of adjusting a contention window size (CWS) based on HARQ-ACK feedback. In the embodiment of FIG. 17, the Tx entity may be a base station and the Rx entity may be a UE, but the present invention is not limited thereto. In addition, although the embodiment of FIG. 17 assumes a channel access procedure for the DL transmission by the base station, at least some configurations may be applied to a channel access procedure for the UL transmission by the UE.

Referring to FIG. 17, the Tx entity transmits the n-th DL transmission burst on an unlicensed band carrier (e.g., Scell, NR-U cell) (step S402), and then if an additional DL transmission is required, the Tx entity may transmit the (n+1)-th DL transmission burst based on the LBT channel access (step S412). Here, the transmission burst indicates a transmission through one or more adjacent slots (or subframes). FIG. 17 illustrates a channel access procedure and a CWS adjustment method based on the aforementioned first type channel access (that is, Category 4 channel access).

First, the Tx entity receives a HARQ-ACK feedback corresponding to the PDSCH transmission(s) on an unlicensed band carrier (e.g., Scell, NR-U cell) (step S404). The HARQ-ACK feedback used for CWS adjustment includes a HARQ-ACK feedback corresponding to the most recent DL transmission burst (that is, n-th DL transmission burst) on the unlicensed band carrier. More specifically, the HARQ-ACK feedback used for CWS adjustment includes a HARQ-ACK feedback corresponding to the PDSCH transmission on the reference window within the most recent DL transmission burst. The reference window may indicate one or more specific slots (or subframes). According to an embodiment of the present invention, the specific slot (or reference slot) includes a start slot of the most recent DL transmission burst in which at least some HARQ-ACK feedback is expected to be available.

When the HARQ-ACK feedback is received, a HARQ-ACK value is obtained for each transport block (TB). The HARQ-ACK feedback includes at least one of a TB-based HARQ-ACK bit sequence and a CBG-based HARQ-ACK. When the HARQ-ACK feedback is the TB-based HARQ-ACK bit sequence, one HARQ-ACK information bit is obtained per TB. On the other hand, when the HARQ-ACK feedback is the CBG-based HARQ-ACK bit sequence, N HARQ-ACK information bit(s) are obtained per TB. Here, N is the maximum number of CBGs per TB configured in the Rx entity of the PDSCH transmission. According to an embodiment of the present invention, HARQ-ACK value(s) for each TB may be determined with the HARQ-ACK information bit(s) for each TB of the HARQ-ACK feedback for CWS determination. More specifically, when the HARQ-ACK feedback is the TB-based HARQ-ACK bit sequence, one HARQ-ACK information bit of the TB is determined as the HARQ-ACK value. However, when the HARQ-ACK feedback is the CBG-based HARQ-ACK bit sequence, one HARQ-ACK value may be determined based on N HARQ-ACK information bit(s) corresponding to CBGs included in the TB.

Next, the Tx entity adjusts the CWS based on the HARQ-ACK values determined in step S404 (step S406). That is, the Tx entity determines the CWS based on the HARQ-ACK value(s) determined with the HARQ-ACK information bit(s) for each TB of the HARQ-ACK feedback. More specifically, the CWS may be adjusted based on the ratio of NACKs among HARQ-ACK value(s). First, variables may be defined as follows.

- p: Priority class value
- CW_min_p: Predetermined CWS minimum value of priority class p
- CW_max_p: Predetermined CWS maximum value of priority class p
- CW_p: CWS for transmission of priority class p. CW_p is set to any one of a plurality of CWS values between CW_min_p and CW_max_p included in the allowed CWS set of the priority class p.

According to an embodiment of the present invention, the CWS may be determined according to the following steps.

Step A-1) For every priority class p, CW_p is set to CW_min_p. In this case, the priority class p includes {1, 2, 3, 4}.

Step A-2) When the ratio of NACKs to HARQ-ACK values for the PDSCH transmission(s) of the reference window k is Z % or more, CW_p is increased to the next highest allowed value for every priority class p (further, Step A-2 remains). Otherwise, Step A proceeds to Step A-1. Here, Z is a predetermined integer in the range of 0<=Z<=100, and according to an embodiment, it may be set to one of {30, 50, 70, 80, 100}.

Here, the reference window k includes the start slot (or subframe) of the most recent transmission by the Tx entity. In addition, the reference window k is a slot (or subframe) in which at least some of the HARQ-ACK feedbacks is expected to be possible. If CW_p=CW_max_p, the next highest allowed value for CW_p adjustment is CW_max_p.

Next, the Tx entity selects a random value within the CWS determined in step S406 and sets the random value to the initial value of the backoff counter N (step S408). The Tx entity performs backoff by using the set backoff counter N (step S410). That is, the Tx entity may decrease the backoff counter by 1 for each slot period in which the channel is sensed to be idle. When the value of the backoff counter reaches 0, the Tx entity may transmit the (n+1)-th DL transmission burst in the channel (step S412).

Meanwhile, in the above-described CWS adjustment process, determination has to be made as to whether not only ACK and NACK but also DTX or NACK/DTX are considered together among HARQ-ACK feedbacks. According to an embodiment of the present invention, depending on whether the transmission in the unlicensed band is based on self-carrier scheduling or cross-carrier scheduling, determination may be made as to whether DTX or NACK/DTX is considered together in the CWS adjustment process.

In self-carrier scheduling, a DL transmission (e.g., PDSCH) on the unlicensed band carrier is scheduled through the control channel (e.g., (E)PDCCH) transmitted on the same unlicensed band carrier. Here, since the DTX indicates a failure of the DL transmission by a hidden node or the like in the unlicensed band carrier, it may be used for CWS adjustment together with NACK. In addition, DTX is one of the methods in which the UE informs the base station that the UE fails to decode the control channel even though the base station transmits, to the UE, the control channel including scheduling information (e.g., (E)PDCCH). DTX may be determined only by the HARQ-ACK feedback value, or may be determined taking into account the HARQ-ACK feedback value and the actual scheduling situation. According to an embodiment of the present invention, DTX and NACK/DTX may be counted as NACK for CWS adjustment in the self-carrier scheduling situation. That is, when the ratio of the sum of NACK, DTX, and NACK/DTX to HARQ-ACK values for the PDSCH transmission(s) of the reference window k is equal to or greater than Z %, the CWS is increased to the next highest allowed value. Otherwise, the CWS is reset to the minimum value.

In cross-carrier scheduling, a DL transmission (e.g., PDSCH) on the unlicensed band carrier may be scheduled through the control channel (e.g., (E)PDCCH) transmitted on the licensed band carrier. In this case, since the DTX feedback is used to determine the decoding situation of the UE for the control channel transmitted on the licensed band carrier, it is not helpful to adaptively adjust the CWS for a channel access in the unlicensed band. Therefore, according to an embodiment of the present invention, DTX may be ignored for CWS determination in the cross-carrier scheduling situation from the licensed band. That is, for CWS adjustment, among HARQ-ACK value(s), only ACK and NACK may be considered for calculating the ratio of NACK, or only ACK, NACK and NACK/DTX may be considered for calculating the ratio of NACK. Therefore, when calculating the ratio of the NACK, DTX may be excluded.

Figure 18:
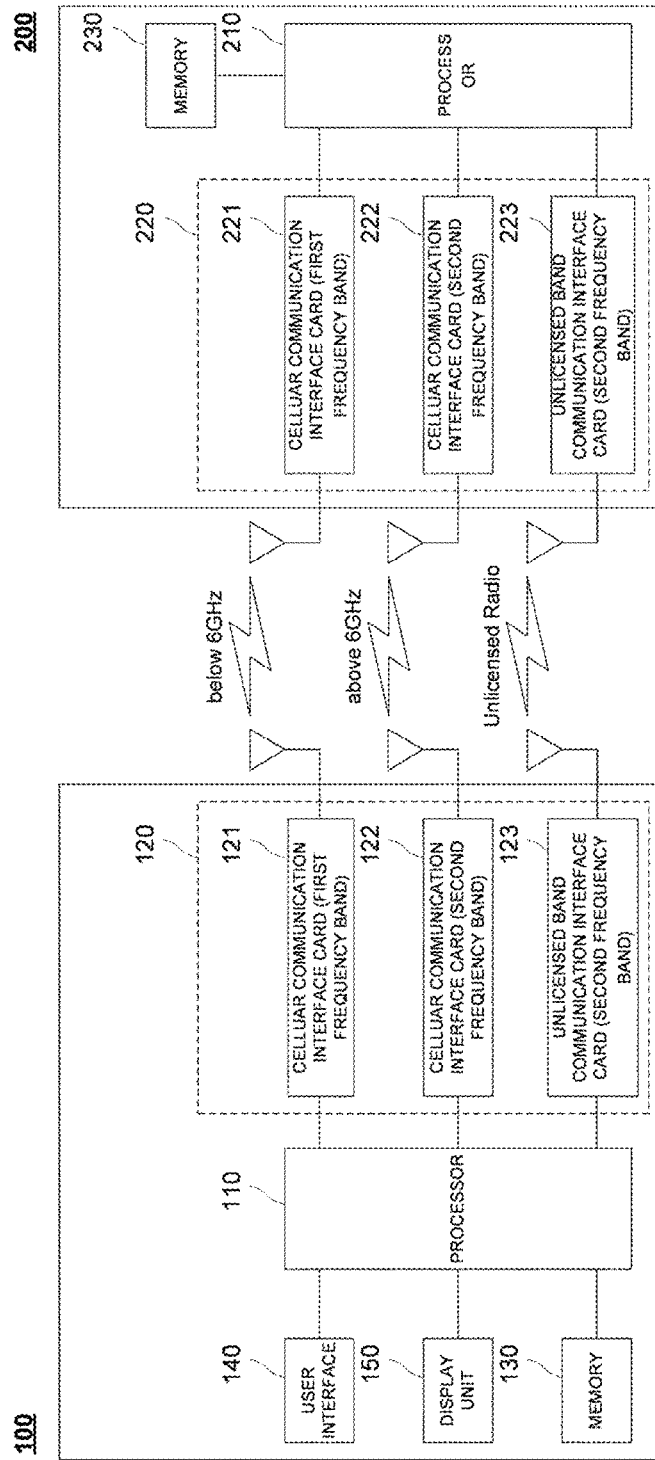
FIG. 18 is a block diagram illustrating configurations of a UE and a base station according to an embodiment of the present invention.

FIG. 18 is a block diagram showing the configurations of a UE and a base station according to an embodiment of the present invention. In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 100 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the UE 100, an external device, and a server in accordance with the cellular communication standards or protocols in the frequency bands 6 GHz or more supported by the corresponding NIC module.

The unlicensed band communication interface card 223 transmits or receives a radio signal with at least one of the UE 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 18 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The NR system may receive a synchronization signal (SS) and a physical broadcast channel (PBCH), and may perform at least one of initial cell access, RRM measurement, and mobility management based on the synchronization signal and the PBCH. As described above, the synchronization signal may include a PSS and an SSS. In addition, the synchronization signal and PBCH may be referred to as an "SS/PBCH block" or a "synchronization signal and PBCH block (SSB)". Embodiments for transmitting and receiving SSBs will be described with reference to FIGS. 19 to 42.

Figure 19:
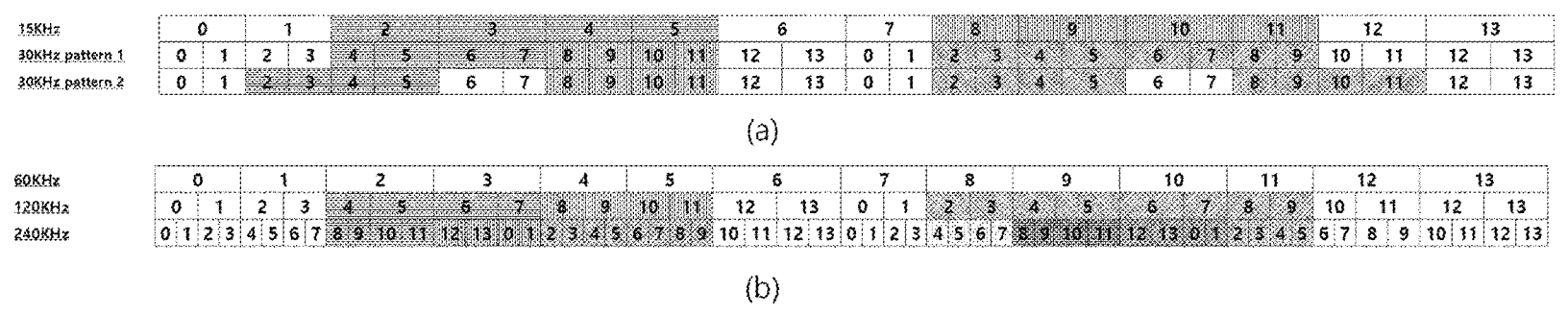

FIG. 19 shows the locations of OFDM symbols occupied by SSBs in a plurality of slots of a licensed band in an NR system according to an embodiment of the present disclosure.

The SSB may include 4 OFDM symbols and 20 RBs. Specifically, a PSS may occupy 1 OFDM symbol, an SSS may occupy 1 OFDM symbol, and a PBCH may occupy two OFDM symbols and one OFDM symbol multiplexed with an SSS by FDM. The location of the OFDM symbol occupied by the SSB in the slot may differ depending on a subcarrier spacing (SCS). FIG. 19(*a*) shows SSB patterns when subcarrier spacing values for SSB transmission are 15 KHz and 30 KHz, respectively. In addition, FIG. 19(*b*) shows SSB patterns when subcarrier spacing values for SSB transmission are 120 KHz and 240 KHz, respectively. When the subcarrier spacing is 30 KHz, any one of an SSB pattern for eMBB transmission and an SSB pattern in consideration of URLLC may be used. In FIG. 19, the hatched OFDM symbols indicate the locations of the OFDM symbols in the slot, which is occupied by the SSBs. In addition, different hatching patterns indicate different SSB indexes. The SSB index will be described later.

Figure 20:
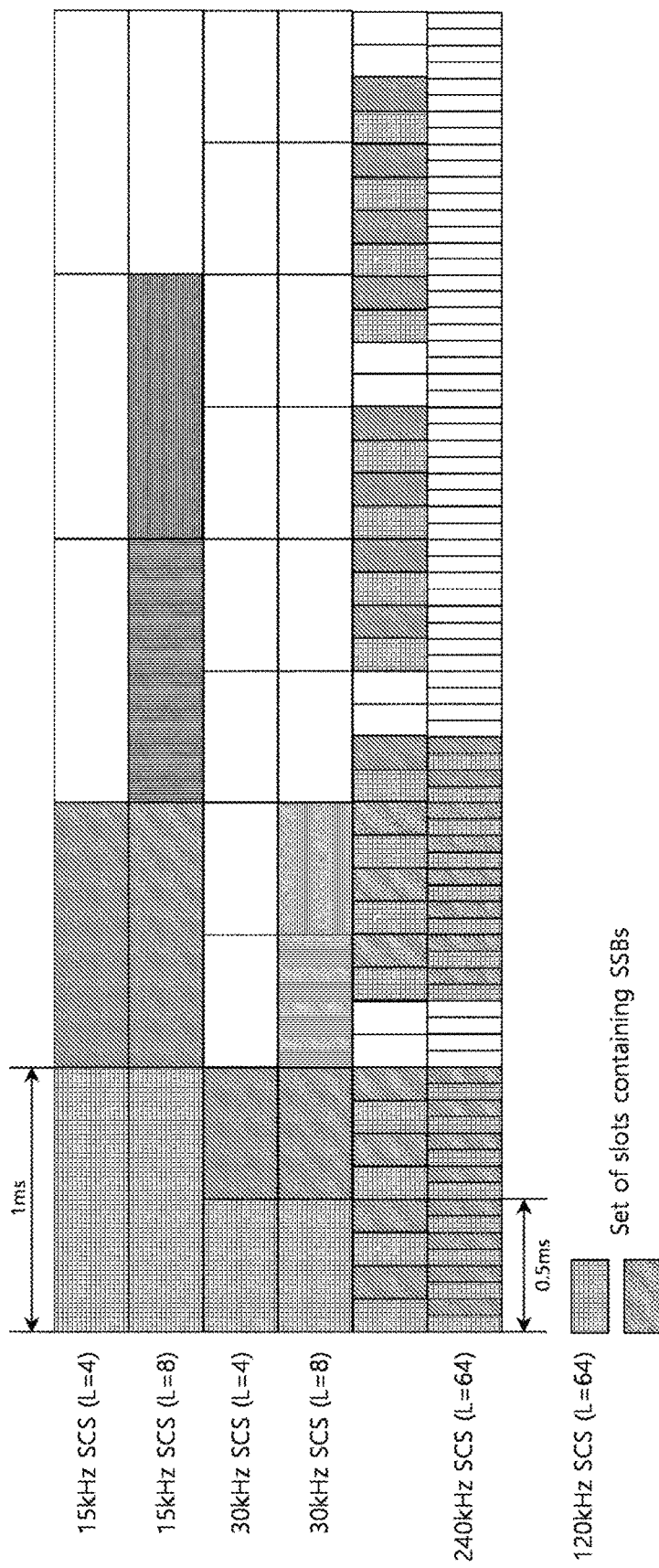
FIG. 20 shows the locations of slots occupied by SSBs within a half radio frame, i.e., 5 ms, of a licensed band in an NR system according to an embodiment of the present invention.

FIG. 20 shows the locations of slots occupied by SSBs within a half radio frame, i.e., 5 ms, of a licensed band in an NR system according to an embodiment of the present disclosure. In FIG. 20, the hatched slots indicate locations of slots including SSBs in a half radio frame. One slot may include two SSBs. Two SSBs in one slot may have different SSB indexes from each other. In addition, the SSBs located in different slots may have different SSB indexes from each other. The SSB index will be described later. In addition, L represents the maximum number of SSBs capable of being transmitted by the base station in a half radio frame in FIG. 20.

In the NR system, one subcarrier spacing is defined for each frequency band, thereby reducing the complexity for the UE to search for an SSB for initial cell access. In particular, when a frequency band of 6 GHz or less is used, the NR system is specified to use a subcarrier spacing of either 15 KHz or 30 KHz for an SSB. In addition, when a frequency band above 6 GHz is used, the NR system is specified to use a subcarrier spacing of either 120 KHz or 240 KHz for an SSB.

If a wireless communication device performs channel access in an unlicensed band, an LBT procedure may be used. Therefore, if a channel is not idle, the wireless communication device may fail to access the channel. The base station may fail to access a channel even when performing channel access for transmitting an SSB, so the SSB may not be transmitted in the location configured by the base station. As a result, even when the base station configures the location in which the SSB is to be transmitted for the UE in order for the UE to assume the location in which the SSB is transmitted, the UE may not receive the SSB. Since the SSB is periodically transmitted, even if the UE fails to receive the SSB at any one time point, the UE may receive the SSB after one periodicity from the corresponding time point. However, the reception of the SSB by the UE in the above manner results in a delay in RRM measurement and measurement for neighbouring cells. Therefore, latency may be increased throughout the system.

In addition, the SSB is used for beam link configuration and beam operation. Specifically, the base station transmits a plurality of SSBs corresponding to different SSB indexes in different time domains. The UE configures a plurality of beam links using a plurality of SSBs. The base station performs beam sweeping. The UE may configure a beam link according to whether or not the UE has received SSBs transmitted through different beams in different time domains. When the base station fails to transmit the SSB due to failure of channel access, there is a problem in that a beam link is unable to be configured. As a result, the failure of channel access may increase the latency for the beam link. Therefore, a method capable of reducing failure of SSB transmission and increasing opportunities for SSB transmission is required.

In the case where the NR system is used in an unlicensed band, a subcarrier spacing of 60 KHz may be used for SSB transmission in order to increase a channel access opportunity. A subcarrier spacing of 15 kHz or 30 kHz may be used for SSB transmission in a licensed band of 6 GHz or less. In addition, a subcarrier spacing of 15 kHz, 30 kHz or 60 kHz may be used for data transmission in a licensed band of 6 GHz or less. In addition, a subcarrier spacing of 120 kHz or 240 kHz may be used for SSB transmission in a licensed band above 6 GHz. In addition, a subcarrier spacing of 60 kHz or 120 kHz may be used for data transmission in a licensed band above 6 GHz. In the case where the NR system is used in an unlicensed band of 7 GHz or less (e.g., less than 7.125 GHZ), the subcarrier spacing of 15 KHz or 30 KHz, which is used in the licensed band of 6 GHz or less, may be considered. However, if the subcarrier spacing of 60 KHz is used for SSB transmission in an unlicensed band, the spacing between OFDM symbols is reduced to ¼ of that when the subcarrier spacing of 15 KHz is used. Therefore, if the subcarrier spacing of 60 kHz is used in the NR system in the unlicensed band, it is possible to increase transmission opportunities in a symbol unit after channel access for SSBs and data channels. The time for transmitting a reservation signal when the base station succeeds in channel access within one OFDM symbol in the case of using a subcarrier spacing of 60 kHz may be reduced compared to the time for transmitting a reservation signal in the case of using subcarrier spacings of 15 kHz and 30 kHz. Hereinafter, a method of transmitting the SSB, which may be used in an unlicensed band, in particular, a method of transmitting the SSB when a subcarrier spacing of 60 KHz is used will be described.

If SSBs are transmitted, and if a subcarrier spacing (SCS) of 15 KHz or 30 KHz is used in an unlicensed band, the SSB pattern described with reference to FIGS. 19 to 20 may be used as it is or after being partially modified. The SSB pattern in the case where a subcarrier spacing value for SSB transmission is 60 KHz in the unlicensed band will be described with reference to FIGS. 21 to 23.

A pattern of SSBs capable of being consecutively transmitted in time within one slot may be used. Through this, the base station may increase transmission efficiency. In this embodiment, if the base station consecutively transmits the same beam or transmits different beams after successful channel access, the base station may consecutively occupy the corresponding channel. Through this, the base station may prevent other wireless communication devices that intend to use the corresponding channel from occupying the channel. As a result, the base station may transmit a plurality of SSBs through one successful channel access, and may increase the probability of performing other transmissions after SSB transmission. The base station may consecutively transmit SSBs within one slot. In addition, the base station may consecutively transmit a plurality of SSBs in time within one slot. Specifically, the base station may transmit SSBs by DL burst transmission. In the case where an SSB pattern enabling consecutive transmission is used, the base station may use a specific channel consecutively to prevent other wireless communication devices from accessing the corresponding channel. In this embodiment, the subcarrier spacing value for SSB transmission in an unlicensed band may be 60 KHz.

In addition, an SSB pattern in which transmission is terminated before the boundary between a slot in which SSBs are transmitted and a slot subsequent to the slot in which the SSBs are transmitted may be used. That is, a gap for an LBT procedure may be configured after the SSB transmission and before starting of the subsequent slot. Specifically, the base station may terminate SSB transmission a predetermined time before the boundary between a slot in which SSBs are transmitted and a slot subsequent to the slot in which the SSBs are transmitted. Specifically, the base station may terminate SSB transmission before at least one OFDM symbol from the boundary between a slot in which SSBs are transmitted and a slot subsequent to the slot in which the SSBs are transmitted. If such an SSB pattern is used, the base station may start an LBT procedure after SSB transmission, thereby increasing the possibility of transmitting a PDCCH or a PDSCH from the starting time point of the slot subsequent to the slot in which the SSBs are transmitted. In this embodiment, a subcarrier spacing value for SSB transmission in an unlicensed band may be 60 KHz.

Figure 21:
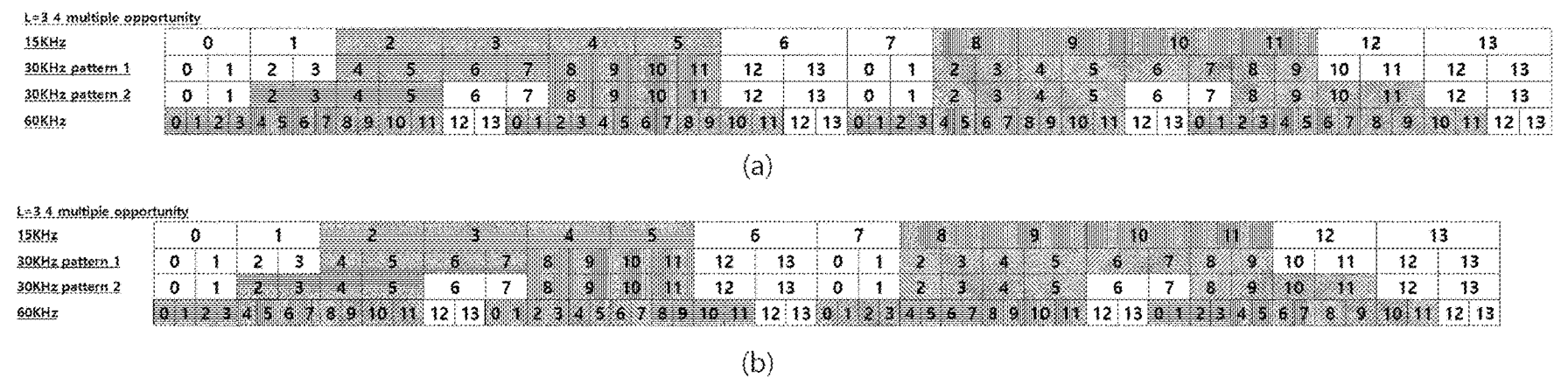
Figure 22:
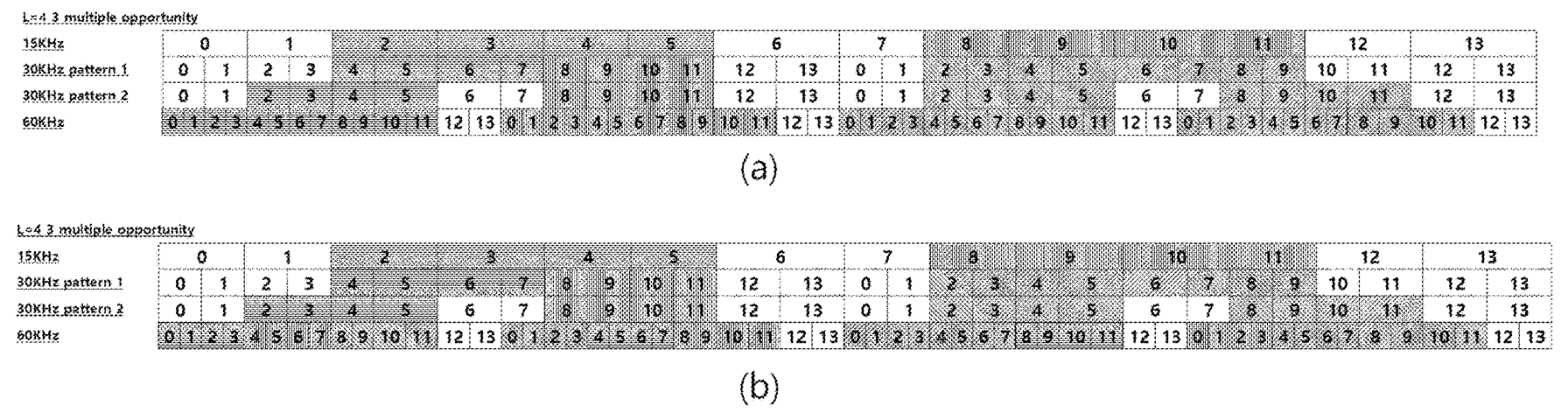
Figure 23:
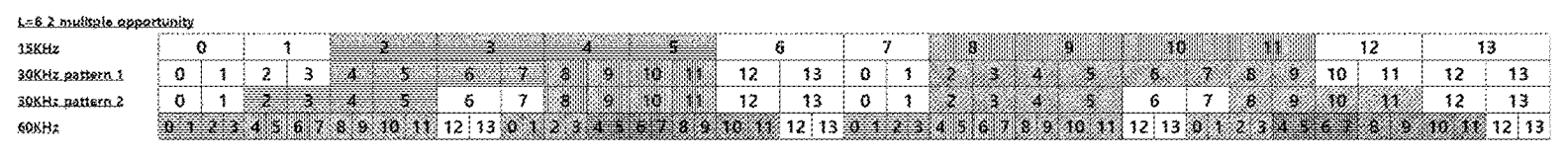

FIG. 21 shows the locations of OFDM symbols in which SSBs are transmitted within a time interval of 1 ms in the case where a subcarrier spacing of 60 KHz is used and the maximum number of SSBs is 3 according to an embodiment of the present disclosure. FIG. 22 shows the locations of OFDM symbols in which SSBs are transmitted within a time interval of 1 ms in the case where a subcarrier spacing of 60 KHz is used and the maximum number of SSBs is 4 according to an embodiment of the present invention. FIG. 23 shows the locations of OFDM symbols in which SSBs are transmitted within a time interval of 1 ms in the case where a subcarrier spacing of 60 KHz is used and the maximum number of SSBs is 6 according to an embodiment of the present invention. In FIGS. 21 to 23, the hatched OFDM symbols indicate OFDM symbols occupied by SSBs. In addition, different hatching patterns correspond to different SSB indexes. In FIGS. 21 to 23, the base station consecutively transmits SSBs within one slot. Through this, the base station may prevent another wireless communication device from accessing a corresponding channel in one slot after successful channel access for SSB transmission within the corresponding slot. In addition, in FIGS. 21 to 23, the base station ends before the boundary between a slot in which the SSBs are transmitted and a slot subsequent to the slot in which the SSBs are transmitted. Through this, the base station may increase the possibility of transmitting a PDCCH or a PDSCH from the starting time point of the slot subsequent to the slot in which the SSBs are transmitted after SSB transmission. As a result, the base station may prevent delay in initial cell access, radio resource management (RRM) measurement, and radio link monitoring (RLM) measurement due to LBT failure through the embodiment described with reference to FIGS. 21 to 23.

The base station may transmit a plurality of SSBs through SSB transmission within a predetermined time interval for SSB transmission. In this case, duration of the predetermined time interval for SSB transmission may be 5 ms. A plurality of SSBs transmitted through SSB transmission may be referred to as an "SSB set". Each of the plurality of SSBs included in the SSB set may be assigned a SSB index, which is unique in the SSB set. The SSB index may be increased by 1 starting from 0. The SSBs having different hatchings in FIGS. 21 to 23 correspond to different SSB indexes. FIGS. 21(a), 22(a), and 23 show the case where the locations of OFDM symbols are fixed for each SSB index in the slot in which the SSBs are transmitted. FIGS. 20(b) and 21(b) show the case where the locations of OFDM symbols are not fixed for each SSB index in the slot in which the SSBs are transmitted. Specifically, the base station may cycle the SSB index corresponding to an SSB transmission location in every SSB transmission. Through this embodiment, it is possible to uniformly configure the probability of success in SSB transmission for each SSB index. This will be described in detail with reference to FIGS. 32 to 42.

Figure 24:
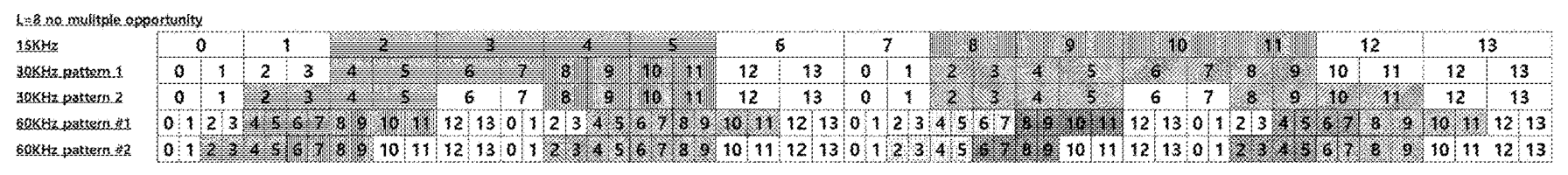

FIG. 24 shows the locations of OFDM symbols in which SSBs are transmitted within a time interval of 1 ms in the case where a subcarrier spacing of 60 KHz is used for SSB transmission and the maximum number of SSBs is 8 according to an embodiment of the present invention. In FIG. 24, the hatched OFDM symbol indicates an OFDM symbol occupied by an SSB. In addition, different hatching patterns correspond to different SSB indexes. FIG. 24 shows an embodiment of two SSB patterns that may be applied to the case where a subcarrier spacing of 60 KHz is used. A second SSB pattern (pattern #2) starts SSB transmission in an OFDM symbol preceding that of a first SSB pattern (pattern #1). The base station may increase the probability of success in the LBT procedure for PDSCH transmission or PDCCH transmission after SSB transmission using the second SSB pattern (pattern #2) compared to the case of using the first SSB pattern (pattern #1). If the first SSB pattern (pattern #1) and the second SSB pattern (pattern #2) are used, a gap for LBT before a slot boundary may be secured for PDCCH or PDSCH transmission in the slot boundary after the slot in which SSBs are transmitted. In the case where data channel transmission is performed, Cat-4 LBT, that is, a channel access procedure in which random back-off is performed, is required. Accordingly, the SSB pattern in FIG. 24 may increase the possibility of data channel transmission if the data channel transmission is performed after SSB transmission. From this point of view, if the base station uses the first SSB pattern, transmission efficiency may be improved compared to the case of using the second SSB pattern (pattern #2).

In an unlicensed band, the base station may attempt to transmit an SSB from the earliest slot in the time domain of a time interval in which the SSB is able to be transmitted. Through this, the base station may prevent missing of an opportunity for SSB transmission or delay of SSB transmission due to failure of the LBT procedure. This will be described with reference to FIGS. 25 to 29. For convenience of description, the time interval capable of transmitting the SSB is referred to as an "SSB transmission window".

Figure 25:
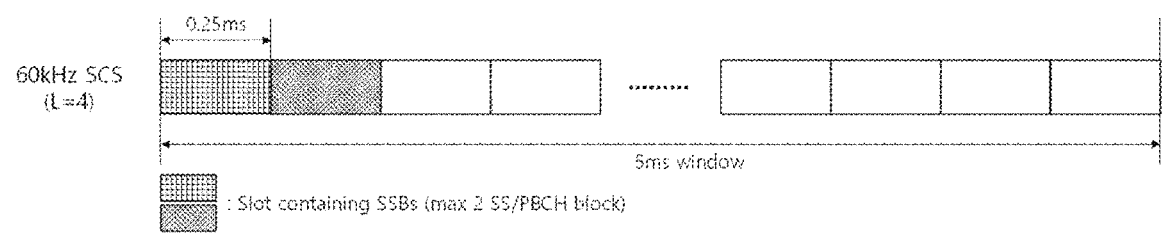
FIG. 25 shows the locations of slots in which SSBs are transmitted in an SSB transmission window in the case where a subcarrier spacing of 60 KHz is used for SSB transmission according to another embodiment of the present invention.
Figure 25:
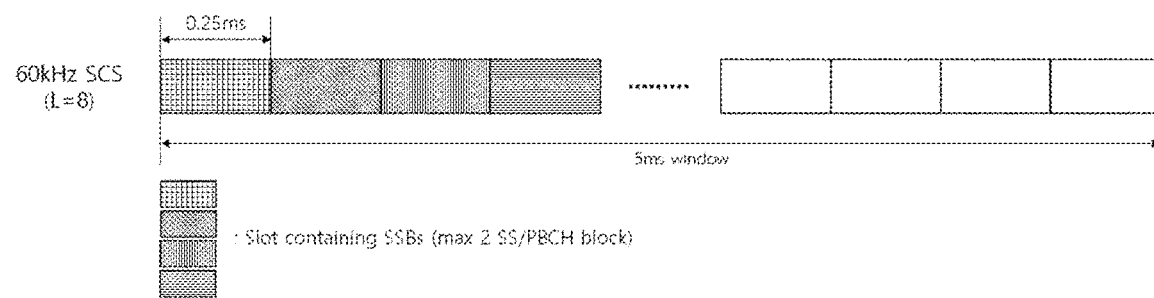

FIG. 25 shows the locations of slots in which SSBs are transmitted in an SSB transmission window in the case where a subcarrier spacing of 60 KHz is used for SSB transmission according to another embodiment of the present invention. Specifically, FIG. 25(a) shows the locations of slots in which SSBs are transmitted in an SSB transmission window in the case where the maximum number of SSBs capable of being transmitted in the SSB transmission window is 4. In addition, FIG. 25(b) shows the locations of slots in which SSBs are transmitted in an SSB transmission window in the case where the maximum number of SSBs capable of being transmitted in the SSB transmission window is 8. In an embodiment, the SSB transmission window may have a duration of 5 ms.

In a specific embodiment, the base station may transmit a maximum number of SSBs capable of being transmitted in the SSB transmission window in every transmission opportunity. For example, if the base station obtains a transmission opportunity through an LBT procedure, the base station may transmit a maximum number of SSBs capable of being transmitted in the SSB transmission window. In this embodiment, the time interval in which an SSB set is transmitted may be configured based on the maximum number of SSBs capable of being transmitted in the SSB transmission window. Specifically, the time interval in which the SSB set is transmitted may be configured as slots corresponding to the maximum number of SSBs capable of being transmitted in the SSB transmission window.

Figure 26:
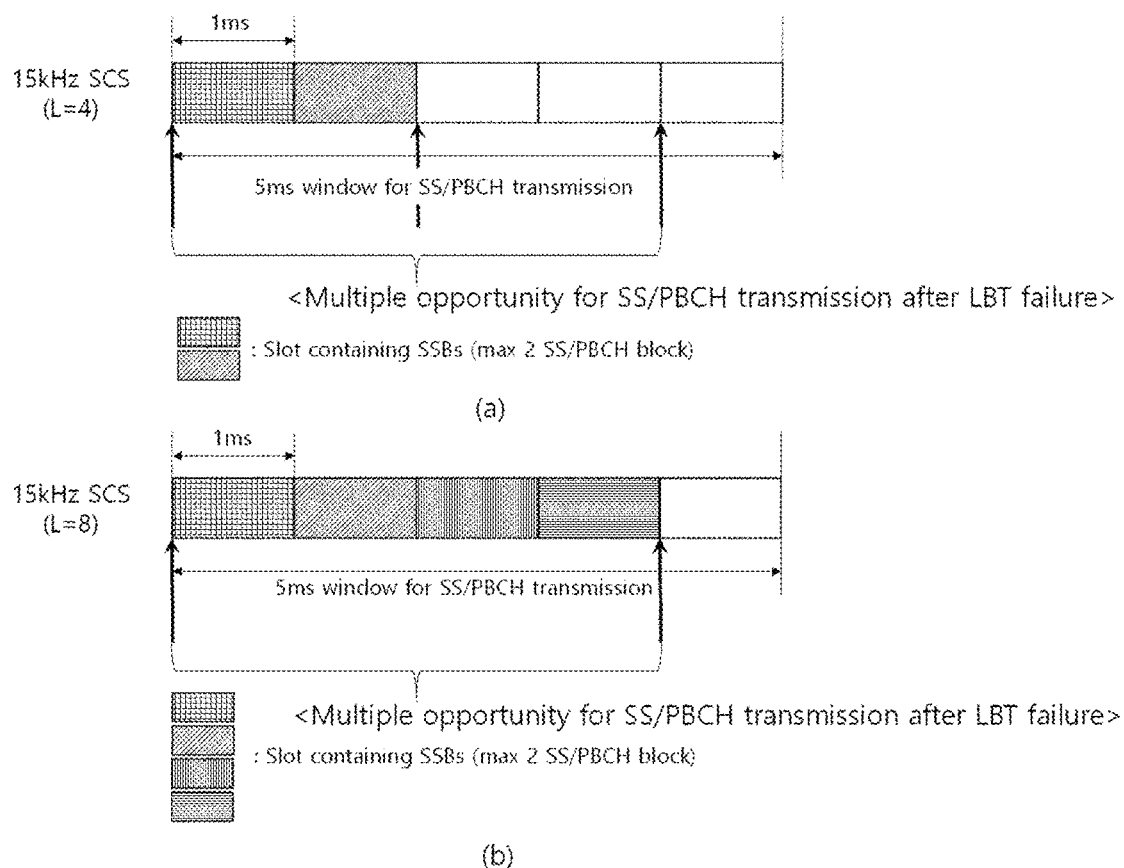
FIG. 26 shows the case where there is a plurality of locations of slots in which a base station is able to start transmission of SSBs according to the maximum number of SSBs capable of being transmitted within an SSB transmission window when a subcarrier spacing of 15 KHz is used for SSB transmission in an unlicensed band according to an embodiment of the present invention.
Figure 27:
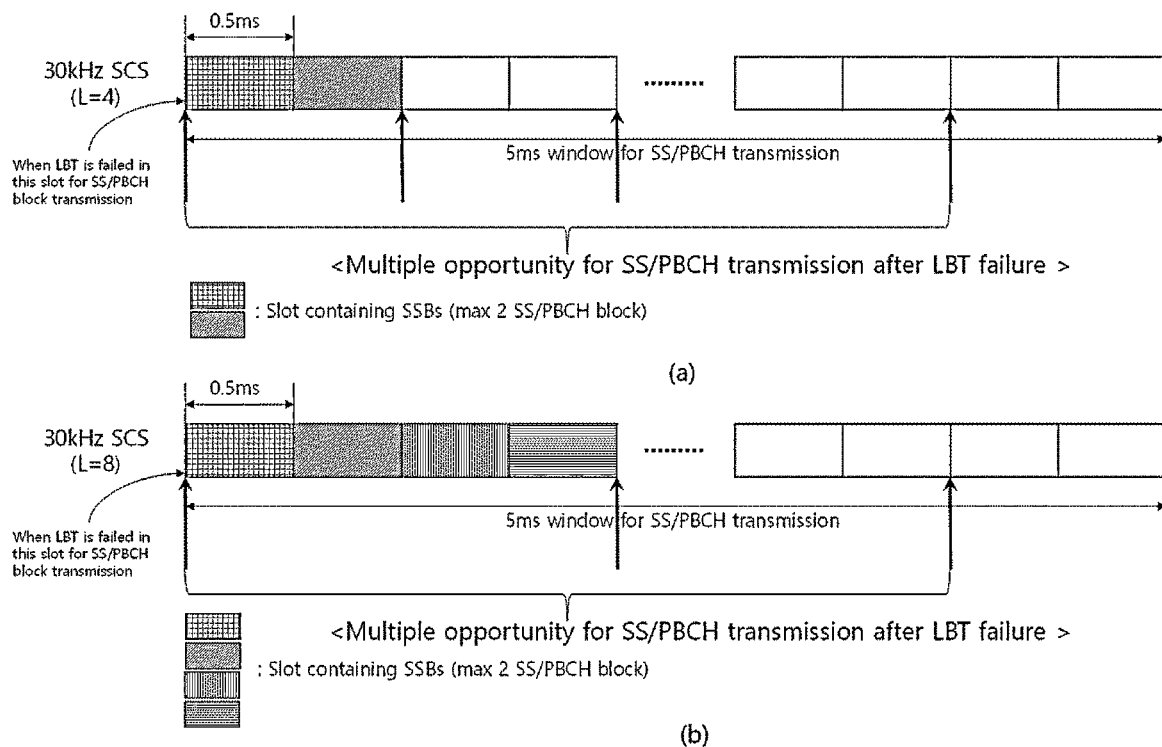
FIG. 27 shows the case where there is a plurality of locations of slots in which a base station is able to start transmission of SSBs according to the maximum number of SSBs capable of being transmitted within an SSB transmission window when a subcarrier spacing of 30 KHz is used for SSB transmission in an unlicensed band according to an embodiment of the present invention.
Figure 28:
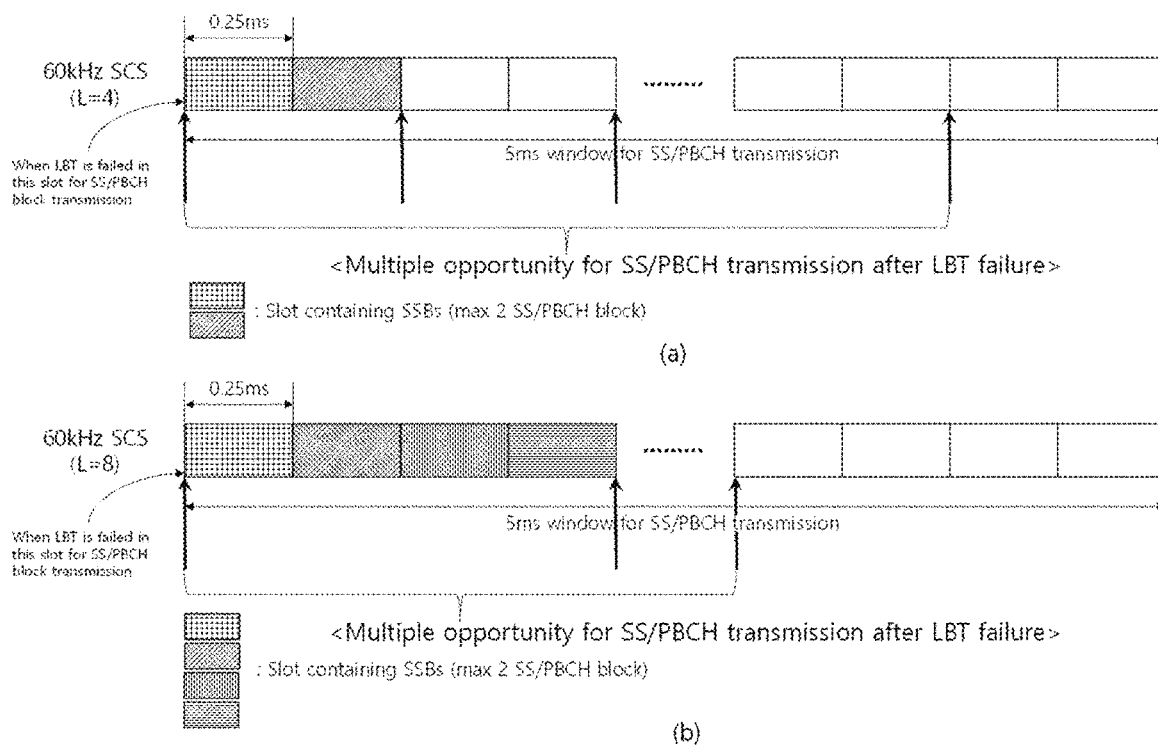
FIG. 28 shows the case where there is a plurality of locations of slots in which a base station is able to start transmission of SSBs according to the maximum number of SSBs capable of being transmitted within an SSB transmission window when a subcarrier spacing of 60 KHz is used for SSB transmission in an unlicensed band according to an embodiment of the present invention.

FIGS. 26 to 28 show the case where there is a plurality of locations of slots in which a base station is able to start transmission of SSBs according to a preconfigured maximum number of SSBs in an SSB transmission window for SSB transmission in an unlicensed band. The base station may transmit an SSB by configuring the location of a slot capable of starting SSB transmission in the SSB transmission window according to the maximum number of SSBs, and the UE may receive an SSB from the location of the slot capable of transmitting an SSB, which is configured by the base station, within the SSB transmission window. If the base station fails in LBT in the slot capable of starting SSB transmission, the base station may perform LBT for starting transmission in a slot capable of starting subsequent SSB transmission, and may perform SSB transmission in the corresponding slot.

FIG. 26 shows the case where there is a plurality of locations of slots in which a base station is able to start transmission of SSBs according to the maximum number of SSBs capable of being transmitted within an SSB transmission window when a subcarrier spacing of 15 KHz is used for SSB transmission in an unlicensed band according to an embodiment of the present invention. In FIG. 26(a), in the case where the duration of an SSB transmission window is configured as 5 ms and the maximum number of SSBs capable of being transmitted in the SSB transmission window is configured as 4, the base station may configure a first slot, a third slot, and a fifth slot as the locations of slots capable of starting SSB transmission within the SSB transmission window. The UE receives the SSB from the location of the slot capable of starting SSB transmission, which is configured by the base station. In FIG. 26(b), in the case where the duration of an SSB transmission window is configured as 5 ms and the maximum number of SSBs capable of being transmitted in the SSB transmission window is configured as 8, the base station may configure a first slot and a fifth slot as the locations of slots capable of starting SSB transmission within the SSB transmission window. The UE receives the SSB from the location of the slot capable of starting SSB transmission, which is configured by the base station.

FIG. 27 shows the case where there is a plurality of locations of slots in which a base station is able to start SSB transmission according to the maximum number of SSBs capable of being transmitted within an SSB transmission window when a subcarrier spacing of 30 KHz is used for SSB transmission in an unlicensed band according to an embodiment of the present invention. FIG. 27(a) shows the case where the duration of an SSB transmission window is 5 ms and the maximum number of SSBs capable of being transmitted in the SSB transmission window is 4. FIG. 27(b) shows the case where the duration of an SSB transmission window is 5 ms and the maximum number of SSBs capable of being transmitted in the SSB transmission window is 8.

FIG. 28 shows the case where there is a plurality of locations of slots in which a base station is able to start SSB transmission according to the maximum number of SSBs capable of being transmitted within an SSB transmission window when a subcarrier spacing of 60 KHz is used for SSB transmission in an unlicensed band according to an embodiment of the present invention. FIG. 28(a) shows the case where the duration of an SSB transmission window is 5 ms and the maximum number of SSBs capable of being transmitted in the SSB transmission window is 4. FIG. 28(b) shows the case where the duration of an SSB transmission window is 5 ms and the maximum number of SSBs capable of being transmitted in the SSB transmission window is 8.

In another specific embodiment, the base station may be configured to start SSB transmission in every slot within the SSB transmission window. The location of the slot in which SSB transmission starts may differ between the SSB transmission windows depending on the result of channel access in the SSB transmission window. Therefore, failure in channel access may cause an imbalance in the transmission opportunity between a plurality of SSBs that have different SSB indexes and are transmitted using different beams. The base station may reduce the imbalance in the transmission opportunity between the SSBs through this embodiment. In this case, the base station may transmit SSBs corresponding to different SSB indexes in every location capable of SSB transmission, which is included in each slot. Through this, the SSBs corresponding to different SSB indexes may have equal opportunities for transmission.

Figure 29:
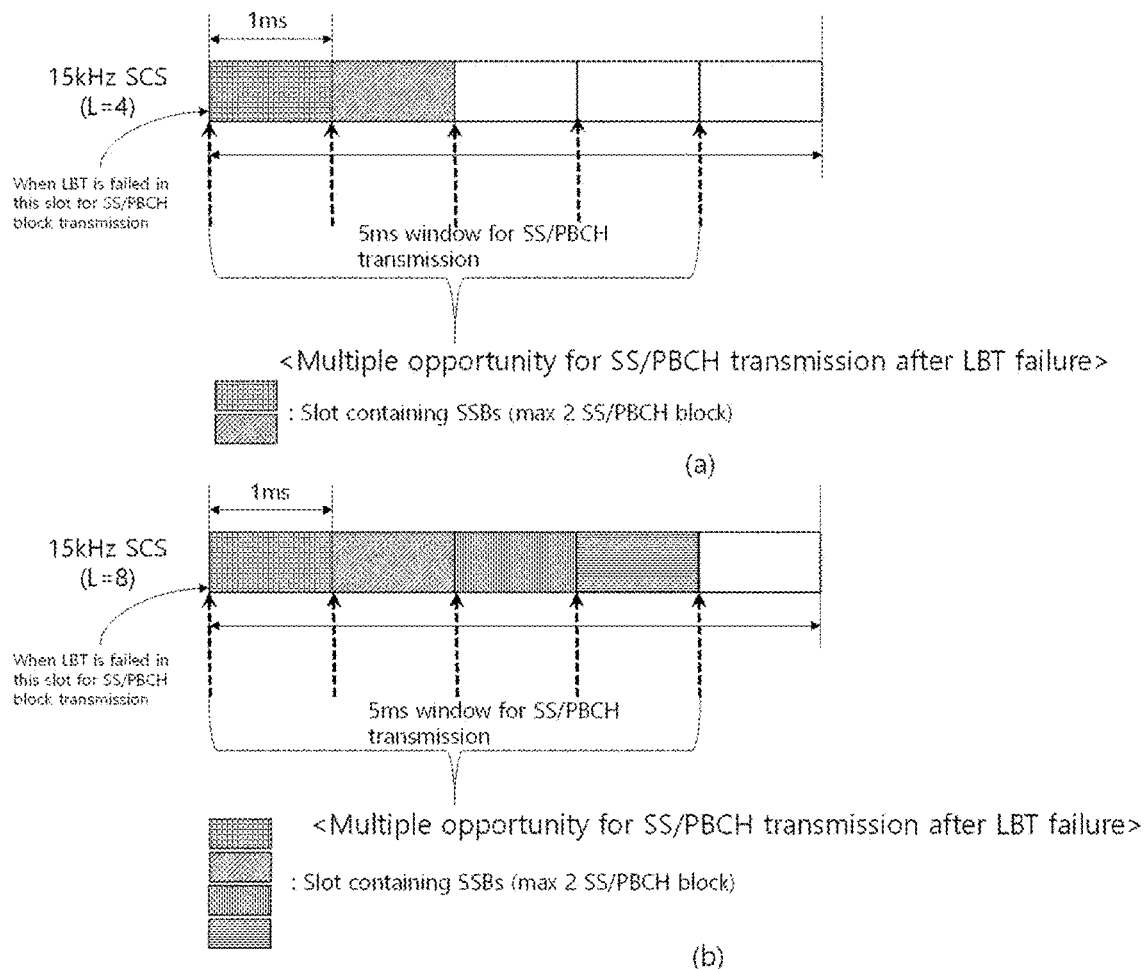
FIG. 29 shows the case where a base station has an SSB transmission starting opportunity in every slot within an SSB transmission window when a subcarrier spacing of 15 KHz is used for SSB transmission in an unlicensed band according to an embodiment of the present invention.

FIG. 29 shows the case where a base station has an SSB transmission-starting opportunity in every slot within an SSB transmission window when a subcarrier spacing of 15 KHz is used for SSB transmission in an unlicensed band according to an embodiment of the present invention. FIG. 29(a) shows the case where the duration of an SSB transmission window is configured as 5 ms and the maximum number of SSBs capable of being transmitted in the SSB transmission window is configured as 4. FIG. 29(b) shows the case where the duration of an SSB transmission window is configured as 5 ms and the maximum number of SSBs capable of being transmitted in the SSB transmission window is configured as 8.

Figure 30:
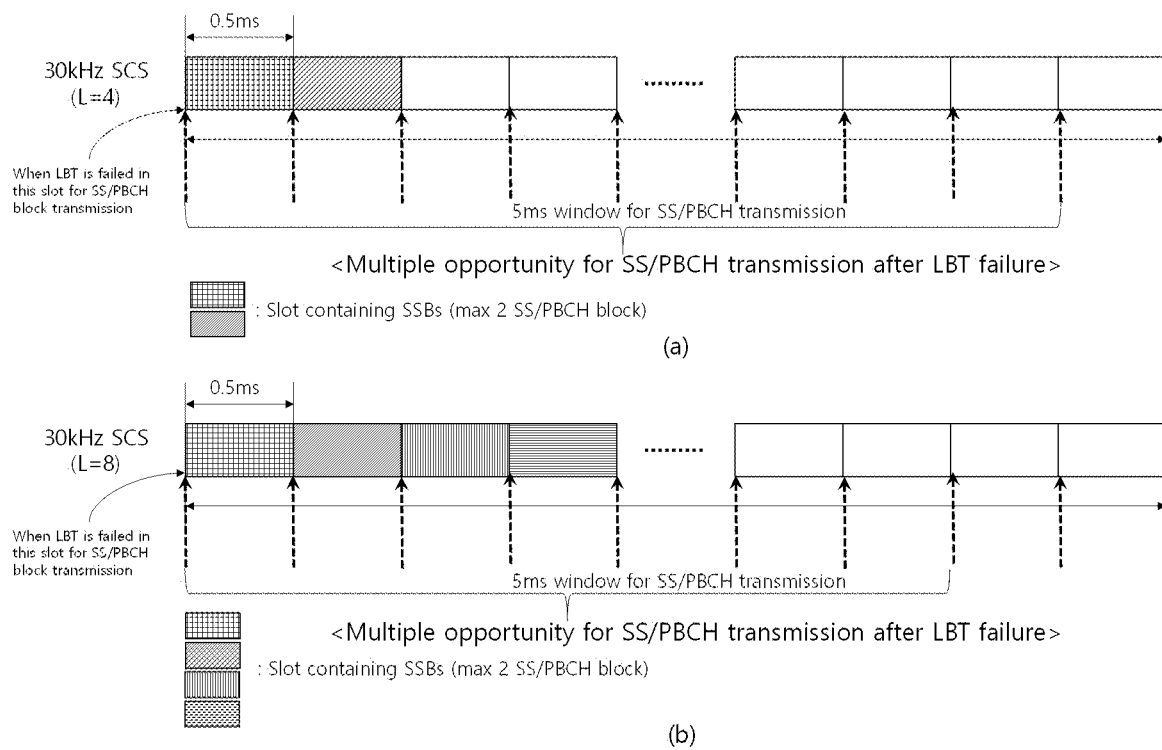
FIG. 30 shows the case where a base station has an SSB transmission starting opportunity in every slot within an SSB transmission window when a subcarrier spacing of 30 KHz is used for SSB transmission in an unlicensed band according to an embodiment of the present invention.

FIG. 30 shows the case where a base station has an SSB transmission starting opportunity in every slot within an SSB transmission window when a subcarrier spacing of 30 KHz is used for SSB transmission in an unlicensed band according to an embodiment of the present invention. FIG. 30(a) shows the case where the duration of an SSB transmission window is configured as 5 ms and the maximum number of SSBs capable of being transmitted in the SSB transmission window is configured as 4. FIG. 30(b) shows the case where the duration of an SSB transmission window is configured as 5 ms and the maximum number of SSBs capable of being transmitted in the SSB transmission window is configured as 8.

Figure 31:
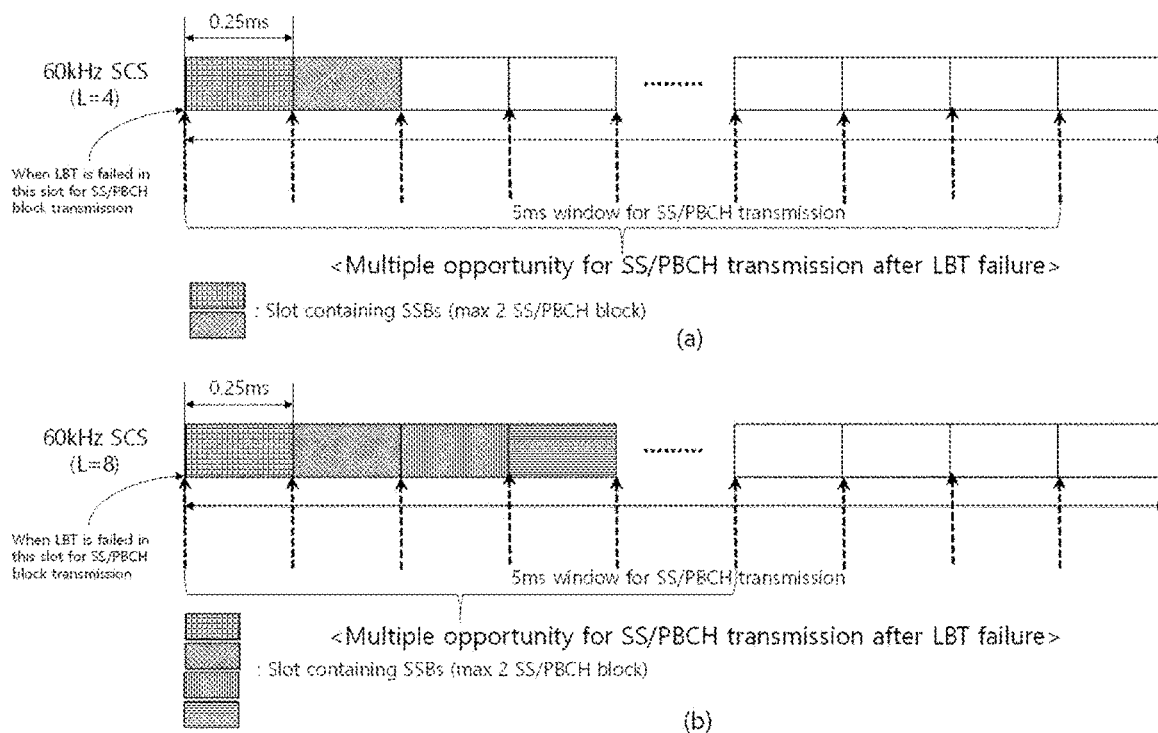
FIG. 31 shows the case where a base station has an SSB transmission starting opportunity in every slot within an SSB transmission window when a subcarrier spacing of 60 KHz is used for SSB transmission in an unlicensed band according to an embodiment of the present invention.

FIG. 31 shows the case where a base station has an SSB transmission starting opportunity in every slot within an SSB transmission window when a subcarrier spacing of 60 KHz is used for SSB transmission in an unlicensed band according to an embodiment of the present invention. FIG. 31(a) shows the case where the duration of an SSB transmission window is configured as 5 ms and the maximum number of SSBs capable of being transmitted in the SSB transmission window is configured as 4. FIG. 31(b) shows the case where the duration of an SSB transmission window is configured as 5 ms and the maximum number of SSBs capable of being transmitted in the SSB transmission window is configured as 8.

In another specific embodiment, the base station may configure an SSB transmission starting opportunity in every specific time interval within the SSB transmission window, thereby transmitting the SSBs. Specifically, the base station may attempt to transmit SSBs in every specific time interval. In this case, the specific time interval may have a duration of an integer multiple of a slot. In addition, a specific time interval may be configured in the range of predetermined candidates through RRC configuration of the base station. In addition, the specific time interval may be a fixed value agreed by the UE and the base station.

The base station may not be able to transmit the SSB due to failure of a channel access (e.g., LBT) procedure. If the base station is unable to transmit the SSB in a configured location, the SSB transmission window may be defined such that the SSB is to be transmitted in another location. The SSB transmission window is a time interval in which the base station is able to transmit an SSB, and includes a plurality of SSB transmission candidate locations. If the base station fails to start SSB transmission at any one SSB transmission candidate location, the base station may attempt to transmit the SSB in the SSB transmission candidate location, which is later than the corresponding SSB transmission candidate location, within the SSB transmission window. The SSB transmission candidate location is a time point at which the base station is able to start SSB transmission. If the UE fails to receive an SSB at any one SSB transmission candidate location in the SSB transmission window, the UE may receive the SSB in the SSB transmission candidate location, which is later than the corresponding SSB transmission candidate location, in the corresponding SSB transmission window. In this case, the UE may determine whether or not the base station failed to start SSB transmission or whether or not the base station failed to transmit an SSB in the SSB transmission candidate location. In a specific embodiment, if the UE fails to receive an SSB in any one SSB transmission candidate location within the SSB transmission window, the UE may attempt to receive the SSB in the SSB transmission candidate location subsequent to the corresponding SSB transmission candidate location in the corresponding SSB transmission window. After the UE starts SSB reception at any one SSB transmission candidate location and completes the SSB reception, the UE may not expect to further receive the SSBs within the corresponding SSB transmission window. Specifically, after the UE starts SSB reception at any one SSB transmission candidate location and completes the SSB reception, the UE may not attempt to further receive the SSBs in the corresponding SSB transmission window.

In another specific embodiment, if the UE fails to receive a specific SSB at any one SSB transmission candidate location in the SSB transmission window, the UE may attempt to receive the specific SSB in an SSB transmission candidate location subsequent to the corresponding SSB transmission candidate location within the corresponding SSB transmission window. After the UE starts to receive a specific SSB at any one SSB transmission candidate location and completes the reception of the specific SSB, the UE may not perform reception of the specific SSB within the corresponding SSB transmission window. Specifically, after the UE receives a specific SSB at any one SSB transmission candidate location, the UE may not further attempt to receive the specific SSB within the corresponding SSB transmission window.

In another specific embodiment, even after the UE completes reception of a specific SSB at any one SSB transmission candidate location, the UE may attempt to receive a specific SSB within the corresponding SSB transmission window. In this case, this is due to the fact that the UE may further receive a specific SSB, and may obtain a combining gain through the specific SSB further received. These embodiments may be applied to the case where an omni-transmission (omni-TX) method is used, as well as the case where a plurality of SSBs corresponding to different beam indexes is transmitted for beam operation. Specifically, the embodiments may also be applied to the case where the same SSB is repeatedly transmitted. The base station may transmit an SSB after an LBT procedure, and may not be able to transmit all SSBs of the SSB block set within a DRS transmission window due to failure of the LBT procedure. Therefore, the SSB transmission probability may vary for each SSB index depending on the sequence of SSB transmission. An embodiment for securing a uniform probability of transmitting SSBs corresponding to different SSB indexes may be required. This will be described with reference to FIGS. 32 to 42.

Each of the SSB transmission candidate locations in the SSB transmission window is mapped to any one SSB of a SSB set, and the base station may transmit SSBs based on the mapping between the SSB transmission candidate locations and the SSBs. In this case, the plurality of SSBs in the SSB set may be identified by SSB indexes, which are unique values in the SSB set. In addition, a plurality of SSB transmission candidate locations within the SSB transmission window may be identified by SSB transmission candidate location indexes. Specifically, if the base station succeeds in channel access at a specific SSB transmission candidate location, the base station may start SSB transmission from the corresponding SSB transmission candidate location. In this case, the base station may transmit the SSBs mapped to the respective SSB transmission candidate locations. In a specific embodiment, the base station may transmit an SSB mapped to each of one or more SSB transmission candidate locations in each of one or more SSB transmission candidate locations located in a time interval from the SSB transmission candidate location in which channel access is successful until the transmission of the SSB set is terminated. In addition, the base station may transmit SSBs within the SSB transmission window, and may transmit the SSBs within the maximum number of SSBs capable of being transmitted in the SSB transmission window.

The base station may transmit SSBs based on a discovery reference signal (DRS) transmission periodicity. Specifically, the DRS transmission of the base station may include SSB transmission. In this case, the window for SSB transmission or the SSB transmission window described above may be replaced with a DRS transmission window. In addition, the DRS transmission window indicates a time interval capable of transmitting a DRS. In addition, the duration of the DRS transmission window may be fixed. In addition, the DRS transmission window may be configured so as to repeat in a specific periodicity. In addition, the DRS transmission window may be configured for each UE.

Figure 32:
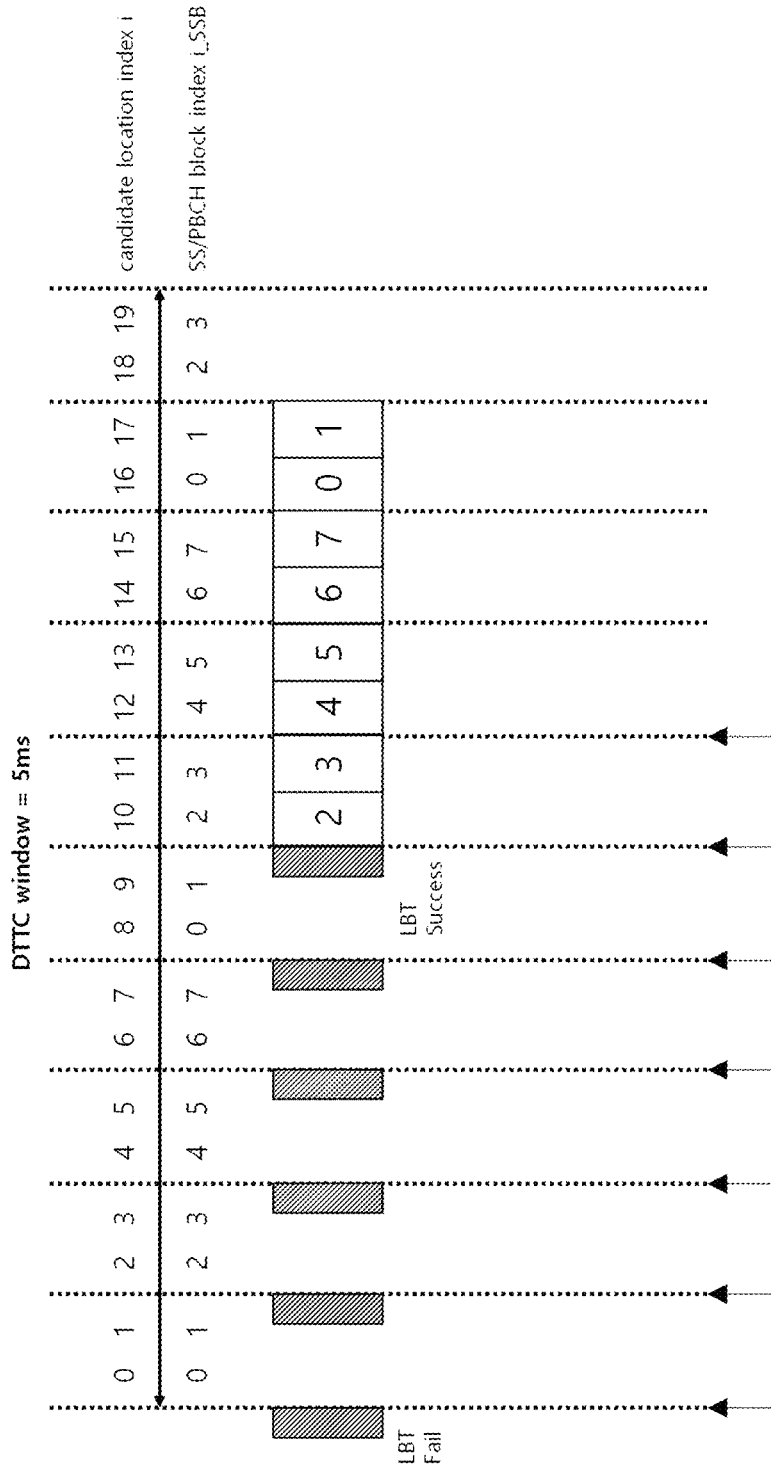
FIG. 32 shows the case where the mapping between SSB indexes and candidate location indexes is fixed in a DRS transmission window according to an embodiment of the present invention.

FIG. 32 shows the case where the mapping between SSB indexes and SBS transmission candidate location indexes is fixed in a DRS transmission window according to an embodiment of the present invention.

In FIG. 32, in the case where a subcarrier spacing of 30 KHz is used and the duration of a DRS transmission window is configured as 5 ms, there may be 20 SSB transmission candidate locations within a DRS transmission window, and each of the 20 SSB transmission candidate locations may correspond to one SSB index. In this case, the SSB index corresponding to each of the 20 SSB transmission candidate locations may be static. That is, the SSB index corresponding to each of the 20 SSB transmission candidate locations may remain the same after being configured. For example, if the maximum number of SSBs capable of being transmitted is 8, the SSB transmission candidate location indexes and the SSB indexes may be mapped as follows. Since a subcarrier spacing of 30 KHz is used, a DRS transmission window having a duration of 5 ms includes SSB transmission candidate locations for transmission of a total of 20 SSBs. For convenience of explanation, each SSB transmission candidate location index is denoted as "i", and the SSB index corresponding to the SSB transmission candidate location "i" is denoted as "i_SSB". If the indexes of the SSB transmission candidate locations are 0 to 7, it may be given as i_SSB=i. In addition, if the indexes of the SSB transmission candidate locations are 8 to 15, it may be given as i_SSB=(i−8). In addition, if the indexes of the SSB transmission candidate locations are 16 to 19, it may be given as i_SSB=(i−16). The mapping between the SSB transmission candidate location indexes and the SSB indexes is maintained in a DRS transmission window in the next periodicity. FIG. 32 shows the case to which this embodiment is applied. In this embodiment, assuming that the probability of success in LBT is the same between the SSB transmission candidate location indexes, SSBs corresponding to SSB index values 0 to 3 may have a probability of 3/20 for transmission opportunities, and SSBs corresponding to SSB index values 4 to 7 may have a probability of 1/10 for transmission opportunities. The mapping between the SSB transmission candidate location indexes and the SSB indexes may be reconfigured for each DRS transmission window in order to secure a uniform transmission probability between the SSBs corresponding to different SSB indexes. Specifically, the mapping relationship between the SSB transmission candidate locations and the SSBs in a second DRS transmission window may be different from the mapping relationship between the SSB transmission candidate locations and the SSBs in a first DRS transmission window.

Figure 33:
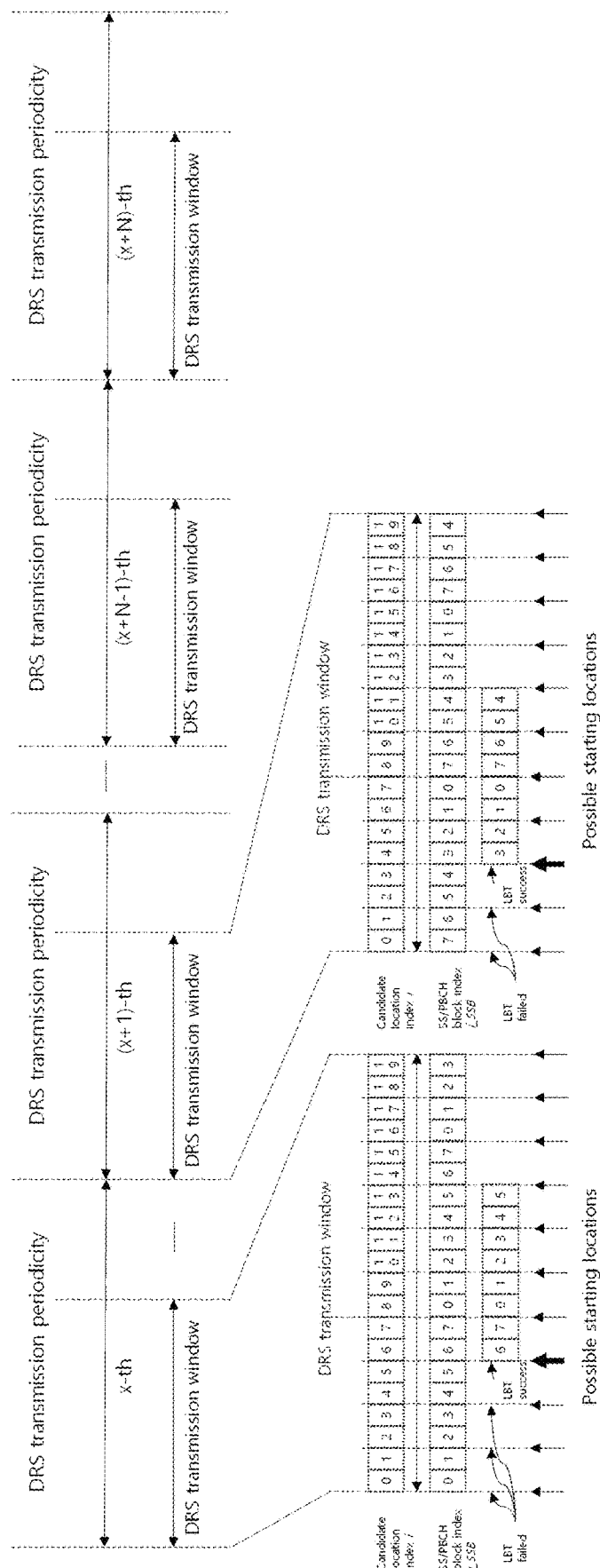
FIGS. 33 to 34 show the case where the mapping between SSB indexes and candidate location indexes is not fixed in a DRS transmission window according to an embodiment of the present invention.
Figure 34:
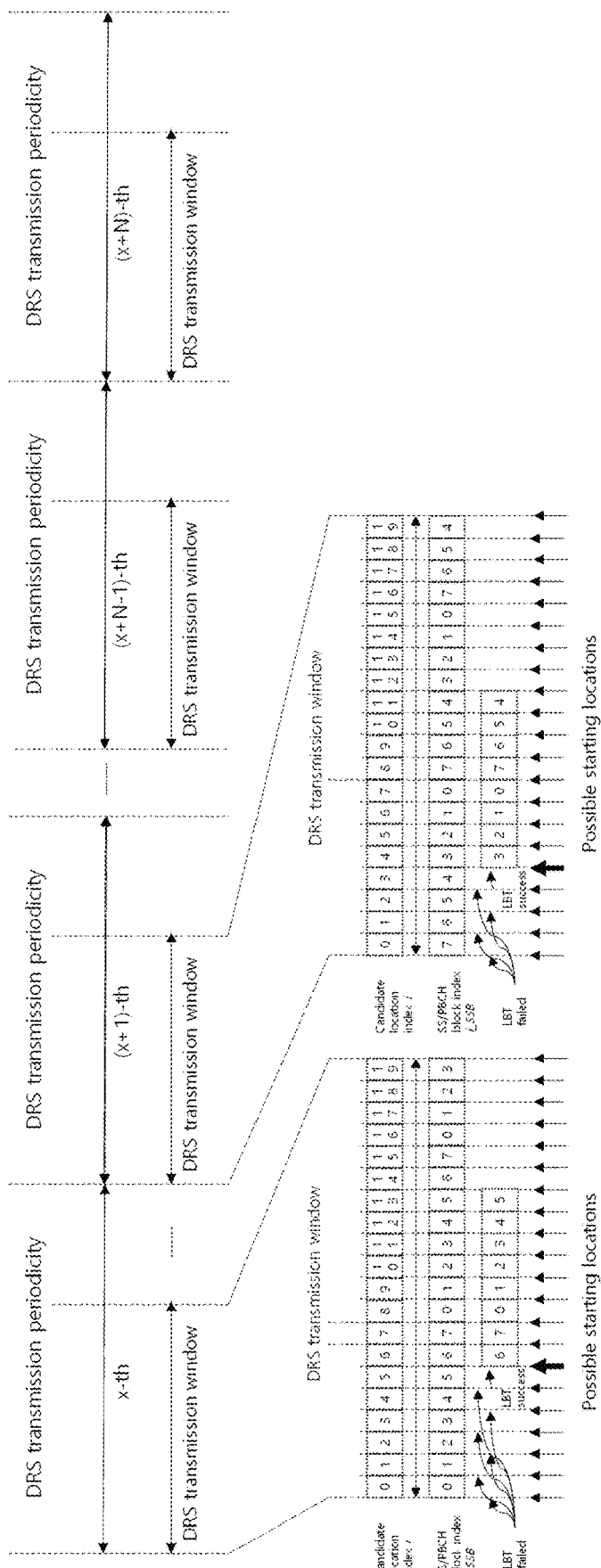

FIGS. 33 to 34 show the case where the mapping between SSB indexes and SSB transmission candidate location indexes is not fixed in a DRS transmission window according to an embodiment of the present invention.

The base station may cyclically wrap around SSB indexes mapped to the SSB transmission candidate location indexes in a previous DRS transmission window, and may map the same to the SSB transmission candidate location indexes. Specifically, the SSB indexes may be mapped to the SSB transmission candidate location indexes in the DRS transmission window in the reverse order of the SSB indexes mapped to the SSB transmission candidate location indexes in the immediately previous DRS transmission window. The base station may map the SSB indexes to the SSB transmission candidate location indexes in the DRS transmission window in the reverse order of the SSB indexes mapped to the SSB transmission candidate location indexes in the immediately previous DRS transmission window, and may transmit SSBs based on the mapping between the SSB transmission candidate location indexes and the SSB indexes. In a specific embodiment, the SSB indexes may be mapped to the SSB transmission candidate location indexes in the even-numbered DRS transmission windows as follows.

$i\_SSB = i \bmod L$

Here, "x mod y" represents the remainder obtained by dividing x by y. In addition, "L" is the maximum number of SSBs capable of being transmitted by the base station within the DRS transmission window.

In addition, the SSB indexes may be mapped to the SSB transmission candidate location indexes in the odd-numbered DRS transmission windows as follows.

$i\_SSB = (L-1) - (i \bmod L)$

For example, in the case where the maximum number of SSBs capable of being transmitted in a DRS transmission window is 8, the duration of a DRS transmission window is 5 ms, and a subcarrier spacing of 30 KHz is used for SSB transmission, the SSB transmission candidate location indexes and the SSB indexes may be mapped as follows. Since a subcarrier spacing of 30 KHz is used, a DRS transmission window having a duration of 5 ms includes SSB transmission candidate locations for transmission of a total of 20 SSBs. "X" is an even number. If the indexes of an $X^{th}$ SSB transmission candidate location are 0 to 7, it may be given as i_SSB=i mod 8. In addition, if the indexes of the SSB transmission candidate locations are 8 to 15, it may be given as i_SSB=i mod 8. In addition, if the indexes of the SSB transmission candidate locations are 16 to 19, i_SSB=i mod 8. In the case of an $(X+1)^{th}$ DRS transmission window, if the indexes of the SSB transmission candidate locations are 0 to 7, it may be given as i_SSB=7−(i mod 8). In addition, if the indexes of the SSB transmission candidate locations are 8 to 15, it may be given as i_SSB=7−(i mod 8). In addition, if the indexes of the SSB transmission candidate locations are 16 to 19, it may be given as i_SSB=7−(i mod 8). FIG. 33 shows SSB transmission to which this embodiment is applied.

In FIG. 33, the base station performs an LBT procedure in one slot for SSB transmission, that is, in granularity of two SSB transmission candidate locations. As described above, the base station may perform channel access in one slot, that is, in granularity of two SSB transmission candidate locations for SSB transmission. Specifically, the base station may perform an LBT procedure in one slot for SSB transmission, that is, in granularity of two SSB transmission candidate locations for SSB transmission. In this case, if the base station fails in an LBT procedure for starting SSB transmission in the SSB transmission candidate location having an index i, the base station may perform the LBT procedure for starting SSB transmission in the SSB transmission candidate location having an index i+2, and the base station is unable to perform the LBT procedure for starting SSB transmission in the SSB transmission candidate location having an index i+1. However, the present embodiment is not limited thereto, and the base station may perform channel access for SSB transmission in granularity of n SSB transmission candidate locations. Here, "n" is a positive integer. Specifically, the base station may perform an LBT procedure for SSB transmission in granularity of n SSB transmission candidate locations. Specifically, if the base station fails in an LBT procedure for starting SSB transmission in the SSB transmission candidate location having an index i, the base station may perform the LBT procedure for starting SSB transmission in the SSB transmission candidate location having an index i+n, and is unable to perform the LBT procedure for starting SSB transmission in the SSB transmission candidate locations prior to the SSB transmission candidate location having an index i+n. In a specific embodiment, "n" may be 1.

FIG. 34 shows the case where the base station performs an LBT procedure for SSB transmission in granularity of one SSB transmission candidate location.

In the foregoing description, although it has been described by way of example that there are 20 SSB transmission candidate locations in the DRS transmission window and the maximum number of transmissions within 5 ms is 8, the above embodiments are not limited to these values. The embodiments may also be applied to the case where there are P SSB transmission candidate locations in the DRS transmission window and the maximum number of transmissions within 5 ms is Q. In this case, P is a natural number greater than 0, and Q is a natural number greater than 0.

In the embodiments described with reference to FIGS. 33 to 34, two types of mapping between SSB transmission candidate locations and SSB indexes are alternately applied to the DRS transmission window. Four types of mapping between SSB transmission candidate locations and SSB indexes may be alternately applied to the DRS transmission window. This will be described with reference to FIGS. 35 to 36.

Figure 35:
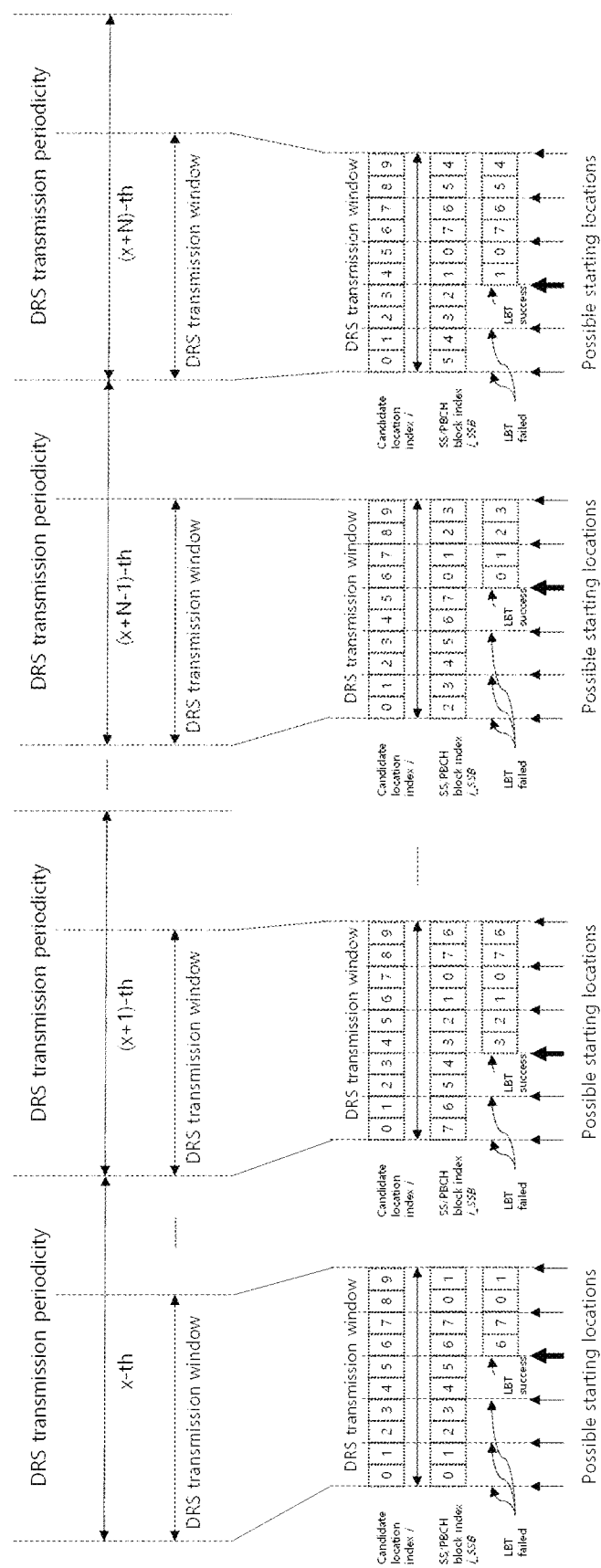
FIGS. 35 to 37 show the case where the mapping between SSB indexes and candidate location indexes is not fixed in a DRS transmission window according to another embodiment of the present invention.
Figure 36:
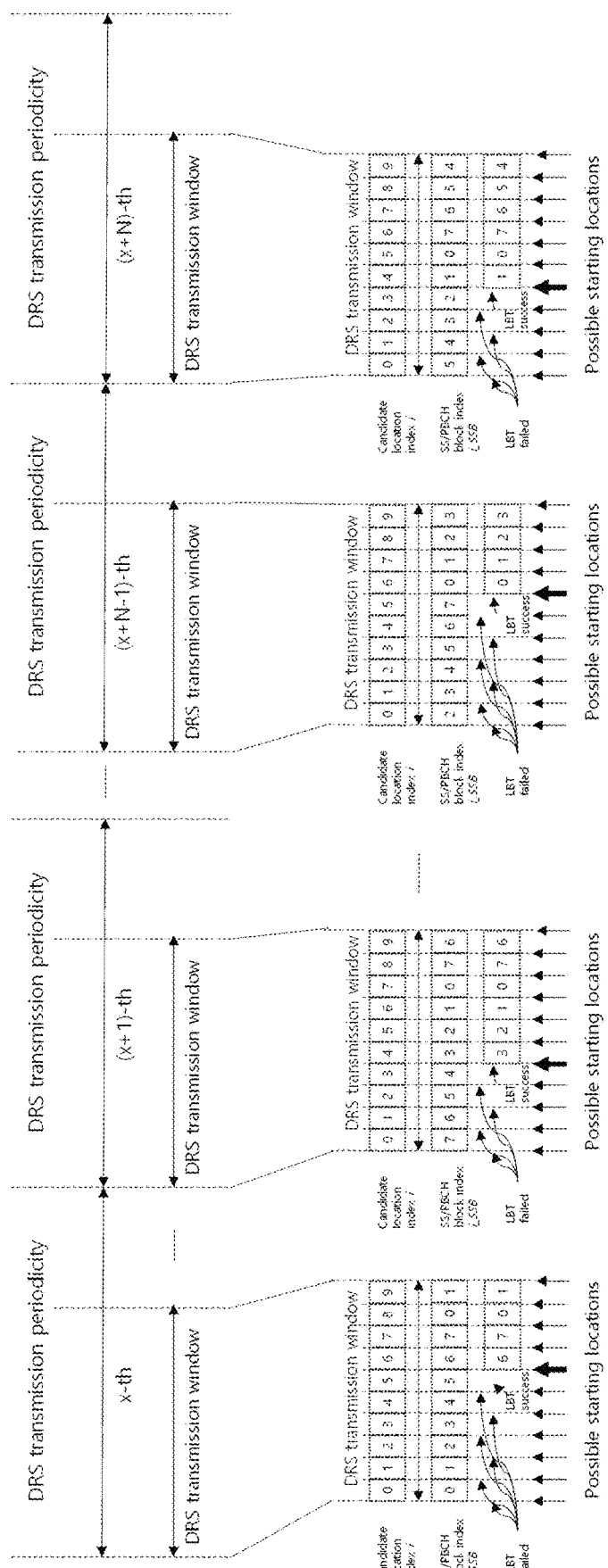
Figure 37:
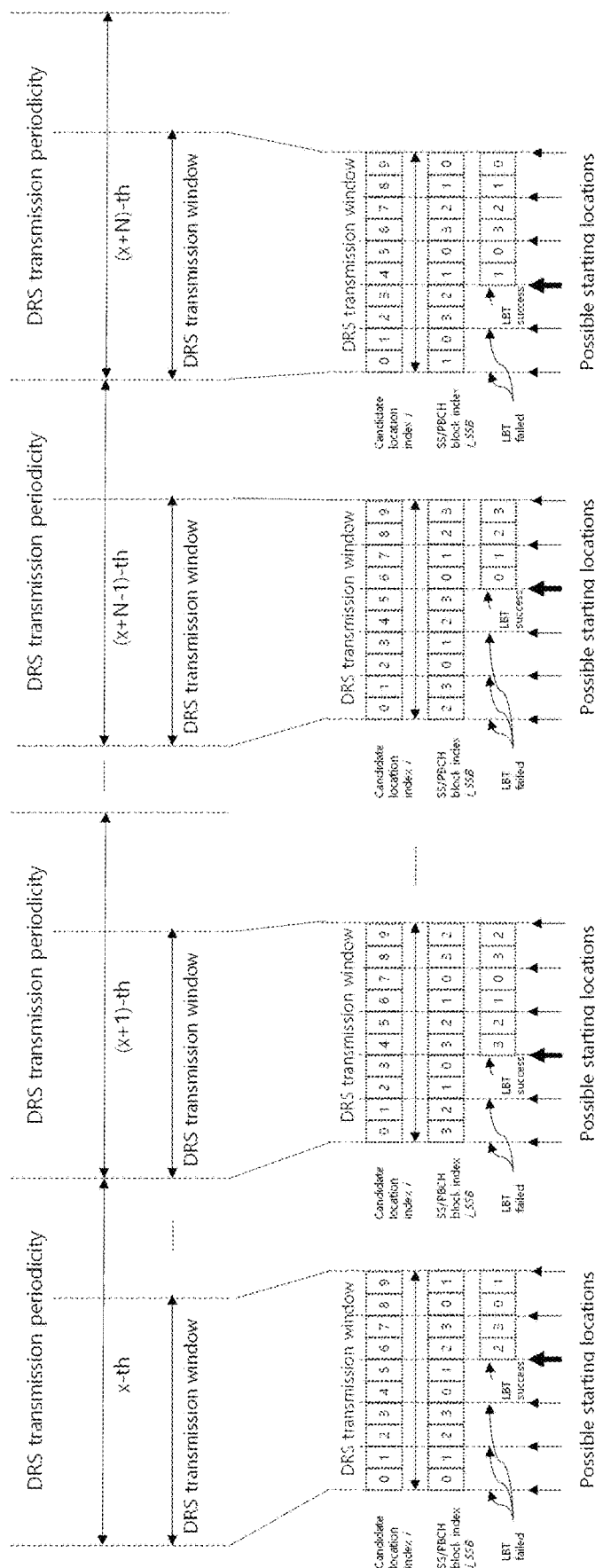

FIGS. 35 to 37 show the case where the mapping between SSB indexes and SSB transmission candidate location indexes is not fixed in a DRS transmission window according to another embodiment of the present invention.

In a specific embodiment, if the remainder obtained by dividing N by 4 is 0 in an $(x+N)^{th}$ DRS transmission window, SSB indexes may be mapped to SSB transmission candidate location indexes as follows.

$i\_SSB = i \bmod L$

Here, "x mod y" represents the remainder obtained by dividing x by y. In addition, "L" is the maximum number of SSBs capable of being transmitted by the base station within a DRS transmission window.

In addition, if the remainder obtained by dividing N by 4 is 1 in the $(x+N)^{th}$ DRS transmission window, the SSB indexes may be mapped to the SSB transmission candidate location indexes as follows.

$i\_SSB = (L-1) - (i \bmod L)$

In addition, if the remainder obtained by dividing N by 4 is 2 in the $(x+N)^{th}$ DRS transmission window, the SSB indexes may be mapped to the SSB transmission candidate location indexes as follows.

$i\_SSB = (i+2) \bmod L$

In addition, if the remainder obtained by dividing N by 4 is 3 in the (x+N)th DRS transmission window, the SSB indexes may be mapped to the SSB transmission candidate location indexes as follows.

$i\_SSB = (L-1) - \{(i+2) \bmod L\}$

For example, if the maximum number of SSBs capable of being transmitted in a DRS transmission window is 8, if the duration of a DRS transmission window is 5 ms, and if a subcarrier spacing of 15 KHz is used for SSB transmission, the SSB transmission candidate location indexes and the SSB indexes may be mapped as follows. Since a subcarrier spacing of 15 KHz is used, a DRS transmission window having a duration of 5 ms includes SSB transmission candidate locations for transmission of a total of 10 SSBs. "X" is a multiple of 4. If the indexes of an $X^{th}$ SSB transmission candidate location are 0 to 7, it may be given as i_SSB=i mod 8. In addition, if the indexes of the SSB transmission candidate locations are 8 to 9, it may be given as i_SSB=i mod 8. If the indexes of an $(X+1)^{th}$ SSB transmission candidate location are 0 to 7, it may be given as i_SSB=7−(i mod 8). In addition, if the indexes of the SSB transmission candidate locations are 8 to 9, it may be given as i_SSB=7−(i mod 8). If the indexes of an $(X+2)^{th}$ SSB transmission candidate location are 0 to 5, it may be given as i_SSB=(i+2) mod 8. In addition, if the indexes of the SSB transmission candidate locations are 6 to 9, it may be given as i_SSB= (i+2) mod 8. If the indexes of an $(X+3)^{th}$ SSB transmission candidate location are 0 to 5, it may be given as i_SSB=7−{(i+2) mod 8)}. In addition, if the indexes of the SSB transmission candidate locations are 6 to 9, it may be given as i_SSB=7−{(i+2) mod 8)}.

In FIG. 35, the base station performs an LBT procedure in one slot for SSB transmission, that is, in granularity of two SSB transmission candidate locations. As described above, the base station may perform an LBT procedure in one slot, that is, in granularity of two SSB transmission candidate locations for SSB transmission. In this case, if the base station fails in an LBT procedure for starting SSB transmission in the SSB transmission candidate location having an index i, the base station may perform the LBT procedure for starting SSB transmission in the SSB transmission candidate location having an index i+2, and the base station is unable to perform the LBT procedure for starting SSB transmission in the SSB transmission candidate location having an index i+1. However, the present embodiment is not limited thereto, and the base station may perform the LBT procedure for SSB transmission in granularity of n SSB transmission candidate locations. Here, "n" is a positive integer. Specifically, if the base station fails in an LBT procedure for starting SSB transmission in the SSB transmission candidate location having an index i, the base station may perform the LBT procedure for starting SSB transmission in the SSB transmission candidate location having an index i+n, and is unable to perform the LBT procedure for starting SSB transmission in the SSB transmission candidate locations prior to the SSB transmission candidate location having an index i+n.

FIG. 36 shows the case where the base station performs an LBT procedure for SSB transmission in granularity of one SSB transmission candidate location.

In the foregoing description, although it has been described by way of example that there are 10 SSB transmission candidate locations in the DRS transmission window and the maximum number of transmissions within 5 ms is 8, the above embodiments are not limited to these values. The embodiments may also be applied to the case where there are P SSB transmission candidate locations in the DRS transmission window and the maximum number of transmissions within 5 ms is Q. In this case, P is a natural number greater than 0, and Q is a natural number greater than 0.

In another specific embodiment, if the remainder obtained dividing N by 4 is 0 in an $(x+N)^{th}$ DRS transmission window, the SSB indexes may be mapped to the SSB transmission candidate location indexes as follows.

$i\_SSB = i \bmod L$

Here, "x mod y" represents the remainder obtained by dividing x by y. In addition, "L" is the maximum number of SSBs capable of being transmitted by the base station within a half radio frame.

In addition, if the remainder obtained dividing N by 4 is 1 in the $(x+N)^{th}$ DRS transmission window, the SSB indexes may be mapped to the SSB transmission candidate location indexes as follows.

$i\_SSB = (L-1) - \{(i+2) \bmod L\}$. In addition, if the remainder obtained dividing N by 4 is 2 in the $(x+N)^{th}$ DRS transmission window, the SSB indexes may be mapped to the SSB transmission candidate location indexes as follows.

$$i\_SSB=(i+2) \bmod L$$

In addition, if the remainder obtained dividing N by 4 is 3 in the $(x+N)^{th}$ DRS transmission window, the SSB indexes may be mapped to the SSB transmission candidate location indexes as follows.

$$i\_SSB=(L-1)-(i \bmod L)$$

FIG. 37 shows that the embodiment described with reference to FIG. 35 is applied to the case where the maximum number of SSBs capable of being transmitted in the DRS transmission window is 4.

FIGS. 38 to 42 show the case where the mapping between SSB indexes and SSB transmission candidate location indexes is not fixed in a DRS transmission window according to another embodiment of the present invention.

The base station may configure the mapping between SSB transmission candidate location indexes and SSB indexes to differ between transmission DRS windows from an $x^{th}$ DRS transmission window to an $(x+N)^{th}$ DRS transmission window. Specifically, whenever the DRS transmission window is changed, the base station may cyclically wrap around and configure the value of SSB indexes mapped to the SSB transmission candidate location indexes. If the maximum number of SSBs capable of being transmitted by the base station in a half radio frame is 8, the base station may apply cyclical wrapping-around to the mapping between the SSB transmission candidate locations and the SSB indexes in units of any one of 4, 2, and 1. In addition, if the maximum number of SSBs capable of being transmitted by the base station in a half radio frame is 4, the base station may apply cyclical wrapping-around to the mapping between the SSB transmission candidate locations and the SSB indexes in units of any one of 2 and 1.

Figure 38:
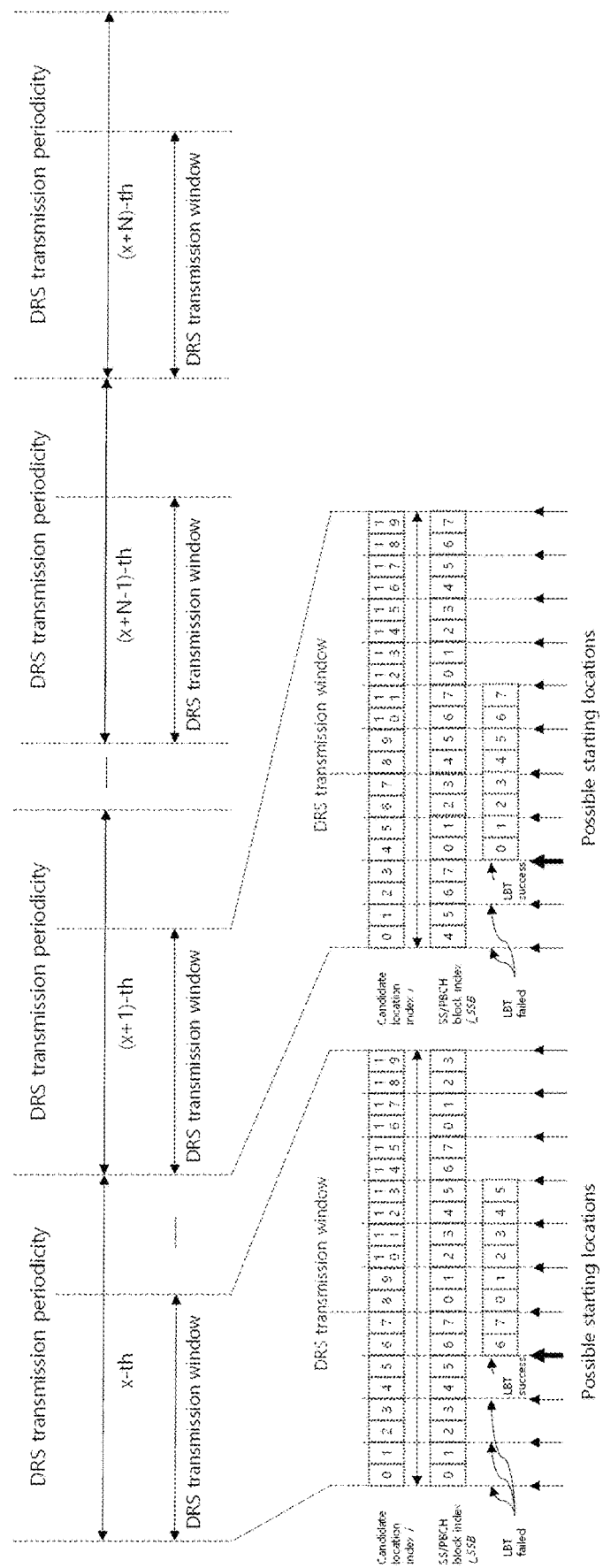
FIGS. 38 to 42 show the case where the mapping between SSB indexes and candidate location indexes is not fixed in a DRS transmission window according to another embodiment of the present invention.
Figure 39:
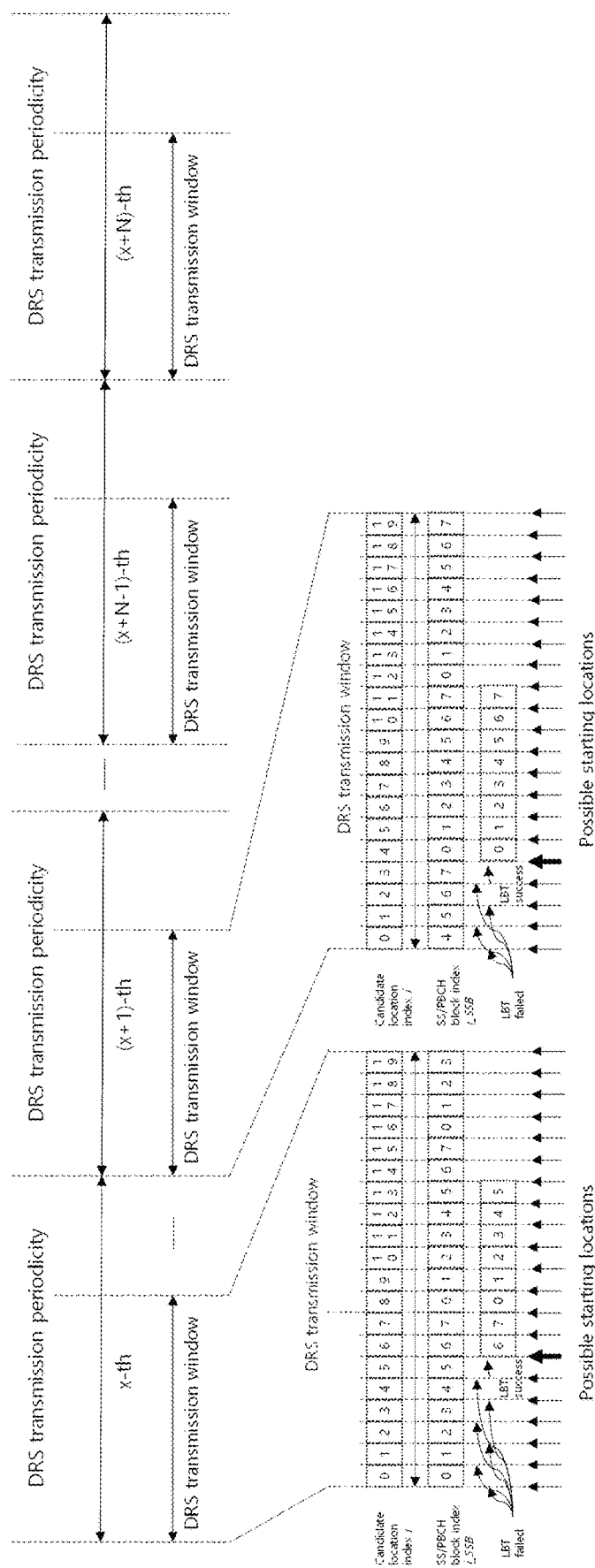

The base station may apply cyclical wrapping-around to the mapping between the SSB transmission candidate locations and the SSB indexes in units of a value obtained by dividing the maximum number of SSBs capable of being transmitted in the DRS transmission window by 4. FIGS. 38 to 39 show embodiments of applying cyclic extensions to the mapping between SSB transmission candidate locations and SSB indexes in units of a value obtained by dividing the maximum number of SSBs capable of being transmitted by the base station in a half radio frame by 4 according to an embodiment of the present invention.

Specifically, SSB transmission candidate location indexes and SSB indexes may be mapped as follows.

If the remainder obtained by dividing N by 2 is 0 in an $(x+N)^{th}$ DRS transmission window, the SSB indexes may be mapped to the SSB transmission candidate location indexes as follows.

$$i\_SSB=i \bmod L$$

Here, "x mod y" represents the remainder obtained by dividing x by y. In addition, "L" is the maximum number of SSBs capable of being transmitted by the base station within a DRS transmission window.

In addition, if the remainder obtained dividing N by 2 is 1 in the $(x+N)^{th}$ DRS transmission window, the SSB indexes may be mapped to the SSB transmission candidate location indexes as follows.

$$i\_SSB=(i+L/2) \bmod L$$

FIG. 38 shows the mapping between the SSB transmission candidate location indexes and the SSB indexes in the case where the maximum number of SSBs capable of being transmitted in the DRS transmission window is 8 and a subcarrier spacing of 30 KHz is used for SSB transmission. Therefore, the DRS transmission window may include 20 SSB transmission candidate locations. In FIG. 38, although it has been described by way of example that there are 20 SSB transmission candidate locations in the DRS transmission window, the maximum number of transmissions in the DRS transmission window is 8, and the duration of the DRS transmission window is 5 ms, the above embodiments are not limited to these values. The embodiments may also be applied to the case where there are P SSB transmission candidate locations in the DRS transmission window and the maximum number of transmissions in the DRS transmission window is Q. In this case, P is a natural number greater than 0, and Q is a natural number greater than 0.

In FIG. 38, the base station performs an LBT procedure in one slot for SSB transmission, that is, in granularity of two SSB transmission candidate locations. As described above, the base station may perform an LBT procedure for SSB transmission in one slot, that is, in granularity of two SSB transmission candidate locations. In this case, if the base station fails in an LBT procedure for starting SSB transmission in the SSB transmission candidate location having an index i, the base station may perform the LBT procedure for starting SSB transmission in the SSB transmission candidate location having an index i+2, and the base station is unable to perform the LBT procedure for starting SSB transmission in the SSB transmission candidate location having an index i+1. However, the present embodiment is not limited thereto, and the base station may perform an LBT procedure for SSB transmission in granularity of n SSB transmission candidate locations. Here, "n" is a positive integer. Specifically, if the base station fails in an LBT procedure for starting SSB transmission in the SSB transmission candidate location having an index i, the base station may perform the LBT procedure for starting SSB transmission in the SSB transmission candidate location having an index i+n, and is unable to perform the LBT procedure for starting SSB transmission in the SSB transmission candidate locations prior to the SSB transmission candidate location having an index i+n.

FIG. 39 shows the case where the base station performs an LBT procedure for SSB transmission in units of one SSB transmission candidate location.

Figure 40:
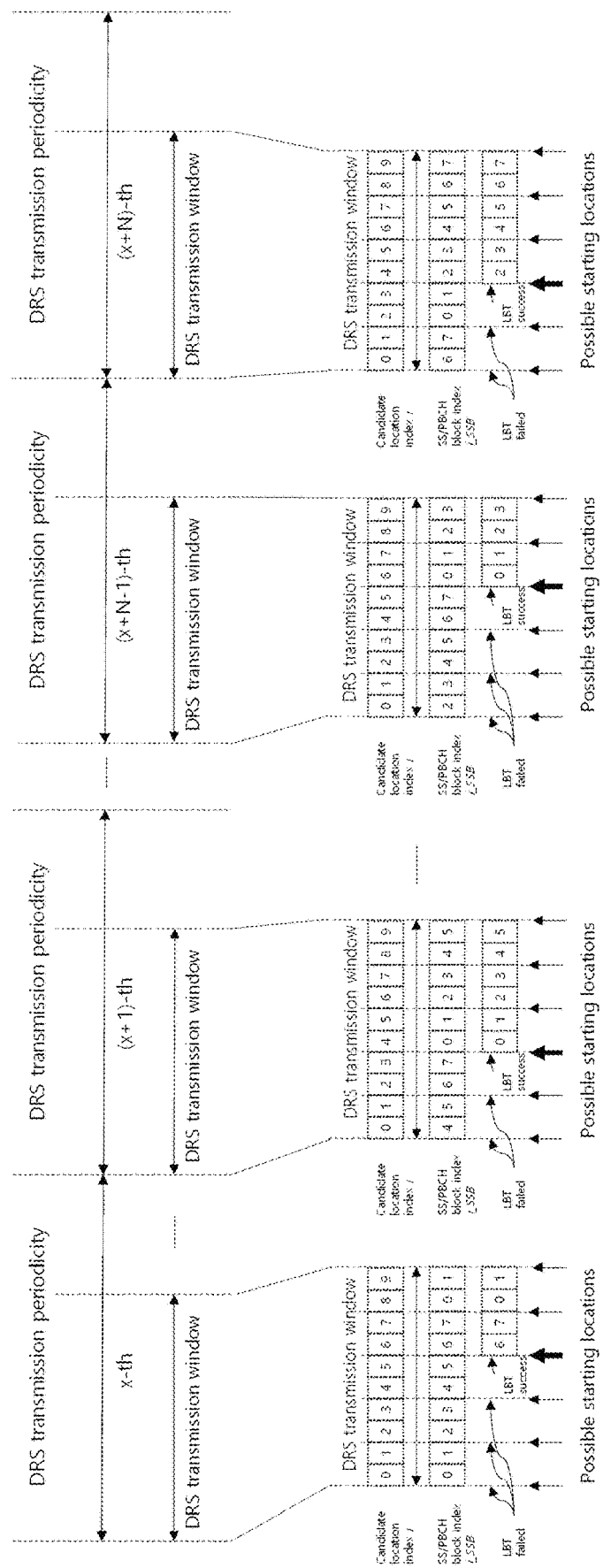
Figure 41:
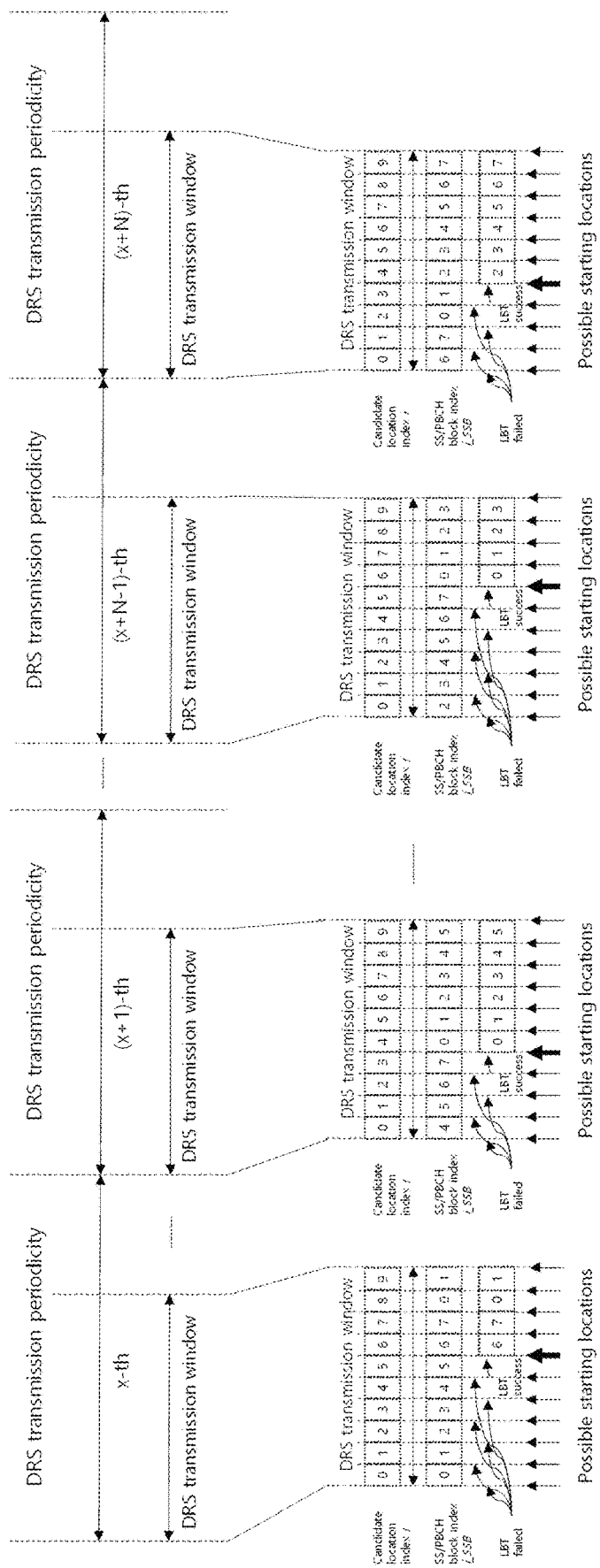
Figure 42:
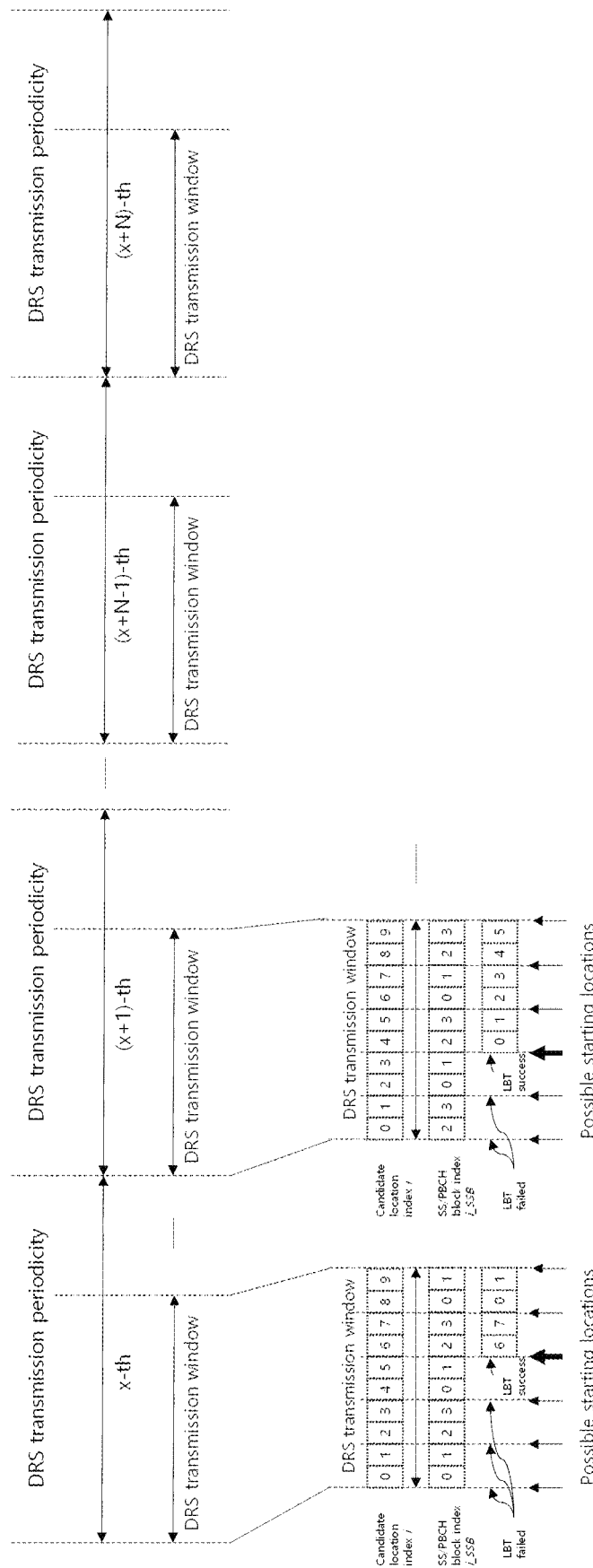

The base station may apply a cyclic extension to the mapping between SSB transmission candidate locations and SSB indexes in units of a value obtained by dividing the maximum number of SSBs capable of being transmitted by the base station in a half radio frame by 2. FIGS. 40 to 42 show embodiments of applying a cyclic extension to the mapping between SSB transmission candidate locations and SSB indexes in units of a value obtained by dividing the maximum number of SSBs capable of being transmitted by the base station in a half radio frame by 2 according to an embodiment of the present invention.

The base station may apply a cyclic extension in units of a value obtained by dividing the maximum number of SSBs capable of being transmitted by the base station in a half radio frame by 2. Specifically, the SSB transmission candidate location indexes and the SSB indexes may be mapped as follows.

If the remainder obtained by dividing N by 4 is 0 in an $(x+N)^{th}$ DRS transmission window, the SSB indexes may be mapped to the SSB transmission candidate location indexes as follows.

$$i\_SSB=i \bmod L$$

Here, "x mod y" represents the remainder obtained by dividing x by y. In addition, "L" is the maximum number of SSBs capable of being transmitted by the base station in a half radio frame.

In addition, if the remainder obtained dividing N by 4 is 1 in the $(x+N)^{th}$ DRS transmission window, the SSB indexes may be mapped to the SSB transmission candidate location indexes as follows.

$i\_SSB=(i+L/2) \bmod L$

In addition, if the remainder obtained dividing N by 4 is 2 in the $(x+N)^{th}$ DRS transmission window, the SSB indexes may be mapped to the SSB transmission candidate location indexes as follows.

$i\_SSB=(i+L/4) \bmod L$

In addition, if the remainder obtained dividing N by 4 is 3 in the $(x+N)^{th}$ DRS transmission window, the SSB indexes may be mapped to the SSB transmission candidate location indexes as follows.

$i\_SSB=(i+3*L/4) \bmod L$

FIG. 40 shows the mapping between the SSB transmission candidate location indexes and the SSB indexes in the case where the maximum number of SSBs capable of being transmitted in a DRS transmission window is 8 and a subcarrier spacing of 15 KHz is used for SSB transmission. Therefore, the DRS transmission window may include 10 SSB transmission candidate locations. In FIG. 40, although it has been described by way of example that there are 10 SSB transmission candidate locations in the DRS transmission window, the maximum number of transmissions in the DRS transmission window is 8, and the duration of the DRS transmission window is 5 ms, the above embodiments are not limited to these values. The embodiments may also be applied to the case where there are P SSB transmission candidate locations in the DRS transmission window and the maximum number of transmissions in the DRS transmission window is Q. In this case, P is a natural number greater than 0, and Q is a natural number greater than 0.

In FIG. 40, the base station performs an LBT procedure for SSB transmission in one slot, that is, in granularity of two SSB transmission candidate locations. As described above, the base station may perform an LBT procedure for SSB transmission in one slot, that is, in granularity of two SSB transmission candidate locations. In this case, if the base station fails in an LBT procedure for starting SSB transmission in the SSB transmission candidate location having an index i, the base station may perform the LBT procedure for starting SSB transmission in the SSB transmission candidate location having an index i+2, and the base station is unable to perform the LBT procedure for starting SSB transmission in the SSB transmission candidate location having an index i+1. However, the present embodiment is not limited thereto, and the base station may perform the LBT procedure for SSB transmission in granularity of n SSB transmission candidate locations. Here, "n" is a positive integer. Specifically, if the base station fails in an LBT procedure for starting SSB transmission in the SSB transmission candidate location having an index i, the base station may perform the LBT procedure for starting SSB transmission in the SSB transmission candidate location having an index i+n, and is unable to perform the LBT procedure for starting SSB transmission in the SSB transmission candidate locations prior to the SSB transmission candidate location having an index i+n.

FIG. 41 shows the case where the base station performs an LBT procedure for SSB transmission in units of one SSB transmission candidate location.

FIG. 42 shows the case where the maximum number of SSBs capable of being transmitted by the base station is 4 in a DRS transmission window. That is, if the remainder obtained dividing N by 2 is 0 in an $(x+N)^{th}$ DRS transmission window, the SSB indexes may be mapped to the SSB transmission candidate location indexes as follows.

$i\_SSB=i \bmod L$

In addition, if the remainder obtained dividing N by 2 is 1 in the $(x+N)^{th}$ DRS transmission window, the SSB indexes may be mapped to the SSB transmission candidate location indexes as follows.

$i\_SSB=(i+L/2) \bmod L$

In another specific embodiment, the SSB transmission candidate location indexes and the SSB indexes may be mapped as follows.

If the remainder obtained dividing N by 4 is 0 in an $(x+N)^{th}$ DRS transmission window, the SSB indexes may be mapped to the SSB transmission candidate location indexes as follows.

$i\_SSB=i \bmod L$

Here, "x mod y" represents the remainder obtained by dividing x by y. In addition, "L" is the maximum number of SSBs capable of being transmitted by the base station in a half radio frame.

In addition, if the remainder obtained dividing N by 4 is 1 in the $(x+N)^{th}$ DRS transmission window, the SSB indexes may be mapped to the SSB transmission candidate location indexes as follows.

$i\_SSB=(i+L/4) \bmod L$

In addition, if the remainder obtained dividing N by 4 is 2 in the $(x+N)^{th}$ DRS transmission window, the SSB indexes may be mapped to the SSB transmission candidate location indexes as follows.

$i\_SSB=(i+L/2) \bmod L$

In addition, if the remainder obtained dividing N by 4 is 3 in the $(x+N)^{th}$ DRS transmission window, the SSB indexes may be mapped to the SSB transmission candidate location indexes as follows.

$i\_SSB=(i+3*L/4) \bmod L$

In this case, the remaining operations, excluding mapping between the SSB transmission candidate location indexes and SSB indexes, may be applied in the same manner to the embodiments described with reference to FIGS. 40 to 42.

The base station may transmit SSBs based on the mapping between the SSB transmission candidate locations and the SSBs to which the embodiments described with reference to FIGS. 32 to 42 are applied. Specifically, if the base station succeeds in channel access in a specific SSB transmission candidate location, the base station starts to transmit SSBs from the corresponding SSB transmission candidate location. In this case, the base station may transmit an SSB mapped to each SSB transmission candidate location in each SSB transmission candidate location. In a specific embodiment, the base station may transmit an SSB mapped to each of one or more SSB transmission candidate locations in each of one or more SSB transmission candidate locations located in a time interval from the SSB transmission candidate location in which channel access is successful until the SSB transmission is terminated. In addition, the base station may transmit SSBs in a DRS transmission window, and may transmit SSBs within the maximum number of SSBs capable of being transmitted within the duration of the DRS transmission window. The UE may receive the SSB included in the DRS, and may perform at least one of initial access, cell detection, RRM, RLM, and RSSI measurement based on the DRS.

Through the embodiments described with reference to FIGS. 33 to 42, the base station may guarantee the probability of transmitting the SSBs, which is as uniform as possible, corresponding to respective SSB indexes.

Through the embodiments described with reference to FIGS. 33 to 42, the UE needs to receive additional timing information after receiving the SSBs. That is, the same SSB may be transmitted in a plurality of SSB transmission candidate locations within one DRS transmission window. For example, in FIG. 33, the SSB having a first SSB index (SSB index #0) may be transmitted in the SSB transmission candidate location corresponds to any one of SSB transmission candidate location indexes 0, 8, and 16 in an $x^{th}$ DRS transmission window. If the UE receives the SSB having the first SSB index (SSB index #0), the UE is not aware of whether the SSB has been received from the $1^{st}$ SSB transmission candidate location index (#0), the $9^{th}$ SSB transmission candidate location index (#8), or the $17^{th}$ SSB transmission candidate location index (#16). In addition, in FIG. 42, the SSB having the first SSB index (SSB index #0) may be transmitted in the $1^{st}$ SSB transmission candidate location index (#0) or the $5^{th}$ SSB transmission candidate location index (#4) in the $x^{th}$ DRS transmission window. If the UE receives the SSB having the first SSB index (SSB index #0), the UE is not aware of whether the SSB has been received from the $1^{st}$ SSB transmission candidate location index (#0) or the $5^{th}$ SSB transmission candidate location index (#4). Therefore, the UE needs to obtain additional timing information in order to recognize the SSB transmission candidate location in which the SSB has been received. As a result, the UE may configure the SSB reception timing according to the SSB transmission candidate location only if additional timing information is obtained. Therefore, the base station may indicate additional timing information to the UE through a PBCH during initial access. In this case, the base station may transmit a timing offset for the SSB transmission candidate location mapped to the same SSB index to the UE through a PBCH. Specifically, the base station may indicate timing information using a value of offset_SSB=floor(i/L). Here, "i" is the index of the SSB transmission candidate location, and "L" is the maximum number of SSBs capable of being transmitted by the base station within a DRS transmission window. The number of SSB transmission candidate locations included in a DRS transmission window and the maximum number of SSBs capable of being transmitted in a DRS transmission window may differ depending on the unlicensed band carrier frequency and the subcarrier spacing. In addition, the number of SSB transmission candidate locations included in a DRS transmission window and the maximum number of SSBs capable of being transmitted in a DRS transmission window may differ depending on the length of the DRS transmission window and the duration of DRS transmission. Although above descriptions have been made on the assumption that the length of the DRS transmission window is the same as the length of the SSB transmission window, the length of the SSB transmission window is 5 ms, and up to 2 SSBs are able to be transmitted in one slot, the present embodiment is not limited thereto.

In addition, in the unlicensed band, the UE and the base station perform channel access in units of 20 MHz. This is intended for coexistence with other radio access technologies (RATs) using unlicensed bands, such as Wi-Fi. Specifically, in the unlicensed band, the UE and the base station may perform an LBT procedure in units of 20 MHz, and may perform transmission in a channel according to the result of the LBT procedure. The UE must perform random access for uplink synchronization with the base station. Specifically, random access is required to be performed when the UE operates in a stand-alone state in an unlicensed band, as well as when both a carrier of an unlicensed band and a carrier of a licensed band are used. This is due to the fact that the UE may not be collocated with the base station, or may use non-ideal backhaul in an indoor environment or an outdoor environment with low coverage, which requires a random access procedure for uplink synchronization. In the case where a bandwidth including a plurality of 20 MHz bandwidths is configured as a bandwidth for uplink transmission for the UE, the UE may attempt to transmit a random access preamble using a 20 MHz bandwidth, which is a part of the corresponding frequency bandwidth. If the frequency band corresponding to the frequency bandwidth, through which the random access preamble transmission is attempted, is busy, the UE is unable to transmit a random access preamble even if a frequency bandwidth other than the 20 MHz bandwidth through which the random access preamble transmission is attempted, among the bandwidths configured for the UE, is idle. This problem may degrade spectral efficiency. Therefore, a method for solving the problem is required.

The base station may configure a bandwidth part (BWP) to have a bandwidth of 20 MHz in an unlicensed band. Specifically, the base station may not be allowed to configure the bandwidth of the BWP of the unlicensed band to have a value other than 20 MHz. If a frequency bandwidth having a bandwidth of 20 MHz or more is used, a plurality of BWPs may be configured for the UE. In addition, the base station may configure a PRACH transmission occasion for each BWP. The UE may attempt PRACH transmission for each BWP. In this case, if the UE succeeds in channel access in any one BWP, the UE may transmit a PRACH in the corresponding BWP. Therefore, in this embodiment, the UE may secure a higher PRACH transmission probability compared to the case where the UE attempts PRACH transmission in a frequency bandwidth having any one 20 MHz bandwidth. In addition, the base station may configure a PRACH transmission occasion for each 20 MHz bandwidth for the UE. The UE may attempt PRACH transmission for each 20 MHz bandwidth. In this case, if the UE succeeds in channel access at any one 20 MHz bandwidth, the UE may transmit a PRACH in the corresponding 20 MHz bandwidth. Therefore, in this embodiment, the UE may secure a higher PRACH transmission probability compared to the case where PRACH transmission is attempted in a frequency bandwidth having any one 20 MHz bandwidth.

However, if the UE succeeds in channel access in a plurality of BWPs or a plurality of 20 MHz bandwidths, it is a question whether the UE is able to transmit a PRACH in all of the plurality of BWPs or the plurality of 20 MHz bandwidths. If the UE succeeds in channel access in a plurality of BWPs or a plurality of 20 MHz bandwidths and transmits a PRACH in the plurality of BWPs or the plurality of 20 MHz bandwidths, there may be frequent collisions in transmission between UEs in the PRACH occasion. This may lead to a contention resolution procedure, which may increase system latency. Accordingly, even in the case where the UE succeeds in channel access in a plurality of BWPs or a plurality of 20 MHz bandwidths, the UE may transmit a PRACH only in any one BWP or 20 MHz bandwidth. In this case, any one BWP or 20 MHz bandwidth in which PRCH transmission is performed may be configured according to an agreement between the UE and the base station. Specifically, the UE and the base station may negotiate priority for the BWP or the 20 MHz bandwidth to be used for transmission after channel access. If the UE succeeds in channel access in a plurality of BWPs or a plurality of 20 MHz bandwidths, the UE may select any one of the plurality of BWP or the plurality of 20 MHz bandwidths according to the priority. The UE may transmit a PRACH through the selected BWP. The base station may perform PRACH detection according to priority. In this case, if the base station completes PRACH detection in one or more BWPs or one or more 20 MHz bandwidths according to the priority, the base station may not further perform PRACH detection. In this case, the number of one or more BWPs or one or more 20 MHz bandwidths may be determined according to an agreement between the UE and the base station. In addition, the priority may be configured based on a serving cell index. Specifically, the priority may be configured such that a BWP having a higher serving cell index or a 20 MHz bandwidth having a higher serving cell index has a higher priority. In another specific embodiment, the priority may be configured such that a BWP having a lower serving cell index or a 20 MHz bandwidth having a lower serving cell index has a higher priority. The priority may be configured based on the index of the BWP or the channel number occupied by the 20 MHz bandwidth. Specifically, the priority may be configured such that a BWP having a higher BWP index has a higher priority. In another specific embodiment, the priority may be configured such that a BWP having a lower BWP index has a higher priority.

In a random access procedure for uplink synchronization, the UE and the base station should perform at least 4 steps. Specifically, the UE should transmit a PRACH to the base station, and the base station must transmit a RACH response (RAR) to the UE. The UE should transmit a PUSCH, that is, message-3, in response to the RAR. In addition, the base station must transmit message-4 to the UE. In the transmission by the base station and the UE, each of the base station and the UE should perform a channel access procedure. Therefore, the random access procedure is more likely to cause an excessive delay. Therefore, a method for preventing the excessive delay is required for the random access procedure. In particular, a method for preventing the excessive delay in relation to RACH transmission is required.

The UE may attempt to transmit a PRACH within a PRACH transmission window. Specifically, if the UE fails to transmit a PRACH in a PRACH occasion configured by the base station, the UE may attempt to transmit a PRACH within a PRACH transmission window. In a specific embodiment, if the UE fails to transmit a PRACH in a PRACH occasion configured by the base station, the UE may attempt channel access within a PRACH transmission window. If the UE succeeds in channel access, the UE may transmit a PRACH to the base station. In this case, the PRACH transmission window may be configured by the base station. Specifically, the PRACH transmission window may be configured by the base station through RRC configuration. In addition, the base station may indicate information on the PRACH transmission window through RMSI before RRC configuration. If the UE fails to receive information on the PRACH transmission window through RMSI, the UE may use default parameters as information on the PRACH transmission window based on PRACH configuration information configured by RMSI.

In the above description, success in channel access may indicate success in the LBT procedure.

If the UE operates in a stand-alone state in an unlicensed band, the UE is required to transmit an uplink control channel (PUCCH, physical uplink control channel) to the base station through the unlicensed band. In addition, the UE may not be collocated with the base station, or may use non-ideal backhaul in an indoor environment or an outdoor environment with low coverage, and the UE is also required to transmit a PUCCH in this case. Therefore, a PUCCH transmission method and a PUCCH design for an unlicensed band are required. This will be described with reference to FIGS. 43 to 45.

Unlike a licensed band, in an unlicensed band, a plurality of wireless communication devices is used, so restrictions on use for each region or each country may be applied thereto. For example, regulations regarding fairness, power spectral density (PSD), and occupied channel bandwidth (OCB) may be applied. Specifically, a regulation in which the PSD must be limited to 10 dBM/MHz or less and in which a transmission carrier must occupy 80% or more of a nominal bandwidth may be applied. In the case of downlink transmission, since the base station performs transmission to a plurality of UEs, it may not be a problem to occupy 80% of a nominal bandwidth. However, in the case of uplink transmission, since the UE performs transmission to the base station, it may be a problem to use 80% of a nominal bandwidth. In addition, since transmission power of 10 dBm/MHz or less must be used in the unlicensed band, the UE is required to perform uplink transmission in a distributed manner. Specifically, the PSD limit for each frequency band may be defined as follows.

Figure 43:
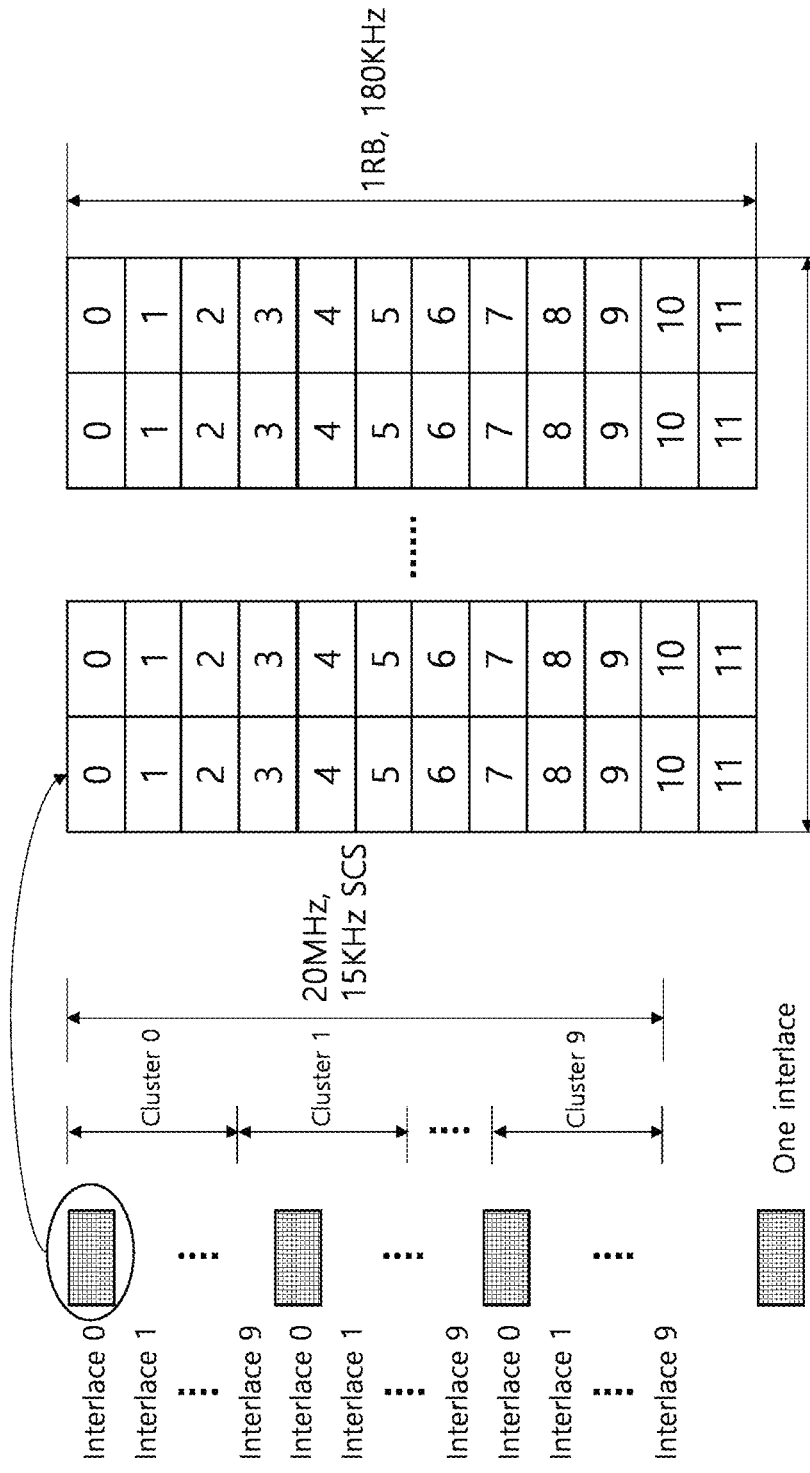
FIG. 43 shows a design of a PUSCH used in LTE-LAA.

The case where transmission power control (TPC) is applied at 5150 to 5350 MHz (with TPC): 10 dBM/MHz The case where transmission power control is not applied at 5250 to 5350 MHz (without TPC): 7 dBM/MHz The case where transmission power control is not applied at 5150 to 5350 MHz (without TPC): 10 dBM/MHz The case where transmission power control is applied at 5150 to 5250 MHz (with TPC): 17 dBM/MHz The case where transmission power control is applied at 5470 to 5725 MHz (with TPC): 17 dBM/MHz The case where transmission power control is not applied at 5470 to 5725 MHz (without TPC): 14 dBM/MHz The case where 40 dBM effective isotropic radiated power (ERIP) is used at 60 GHz: 13 dBM/MHz ERIP FIG. 43 shows a PUSCH design used in LTE-LAA.

An LTE-LAA system uses a PUSCH structure in which RBs are interlaced, as shown in FIG. 43. Through this, the UE may perform PUSCH transmission while satisfying the rules for PSD and OCB. In an NR system, an interlaced RB structure, as shown in FIG. 43, may be used for PUSCH transmission and PUCCH transmission. However, if a subcarrier spacing of 15 KHz is applied to a channel having a 20 MHz bandwidth in order to satisfy the aforementioned regulation, one interlace may occupy at least 10 RBs. Since one interlace occupies at least 10 RBs, up to 10 interlaces may be used. In this case, the interlace is a resource allocation unit, and may indicate that a plurality of RBs is located at the same interval in a frequency band.

The number of UEs capable of simultaneously performing PUCCH transmission in the unlicensed band may be limited, compared to the PUCCH in the licensed band that multiplexes different UEs using one RB, because one UE must use at least 10 RBs in order to satisfy the PSD and OCB regulations. That is, multiplexing capacity may be insufficient. In order to solve this problem, a PUCCH transmission method and a PUCCH design are required.

In the case where the PUCCH uses an interlace structure configured in units of RBs, orthogonal cover code (OCC) having a length of N may be applied to N consecutive RBs within one interlace in a frequency domain. If the PUCCH uses an interlace structure configured in units of RB groups, orthogonal cover code (OCC) having a length of N may be applied to N RB groups. In this case, the RB group represents a plurality of consecutive RBs in the frequency domain. These embodiments make it possible to increase the multiplexing capacity by N times. The base station may indicate to the UE an index of interlace to be used for PUCCH transmission. In this case, the base station may indicate to the UE the index of OCC to be used by the UE for PUCCH transmission. Through this, a plurality of UEs may simultaneously perform PUCCH transmission within one RB unit or RB group unit interlace. This embodiment may be applied to the PUCCH format transmitted on a sequence basis. Specifically, the embodiment may be applied to transmission of PUCCH format 0, PUCCH format 1, PUCCH format 3, and PUCCH format 4 defined in the NR system. However, the embodiment cannot be applied to transmission of PUCCH format 2 defined in the NR system.

Figure 44:
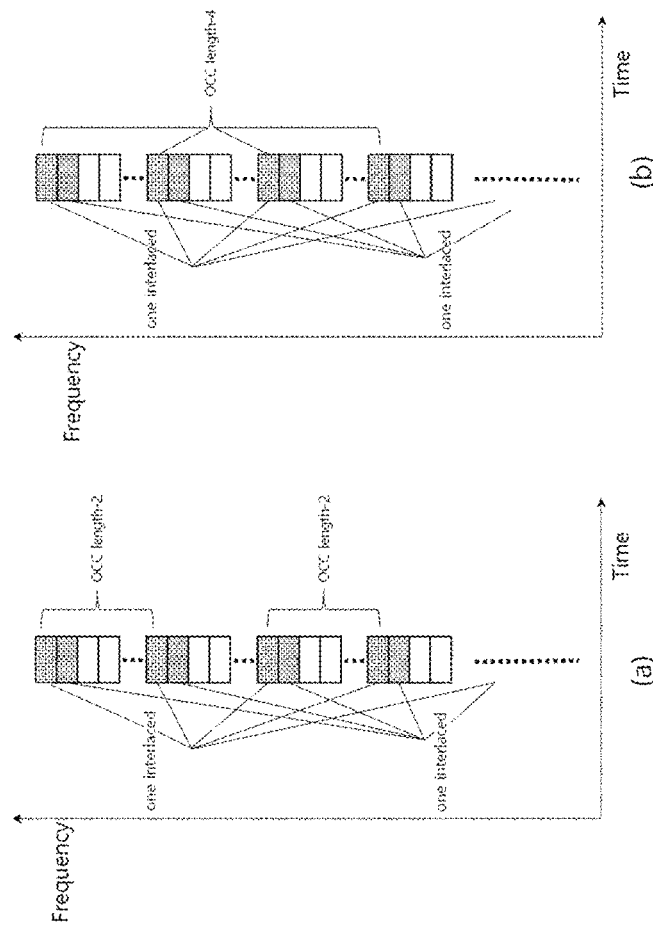
FIG. 44 shows the case in which a plurality of user equipments transmits a short PUCCH using OCC within one interlace according to an embodiment of the present invention.

FIG. 44 shows the case in which a plurality of UEs transmits a short PUCCH corresponding to PUCCH format 0 using OCC within one interlace according to an embodiment of the present invention. In FIG. 44(a), two UEs transmit PUCCHs through two consecutive RBs within one interlace using OCC having an OCC length of 2. In FIG. 44(b), four UEs transmit PUCCHs through four consecutive RBs within one interlace using OCC having an OCC length of 4. Although it has been described by way of example in FIG. 44 that a short PUCCH is transmitted through one symbol, the embodiment of the present invention may also be applied in the same manner to the case of transmitting a short PUCCH through two symbols.

Figure 45:
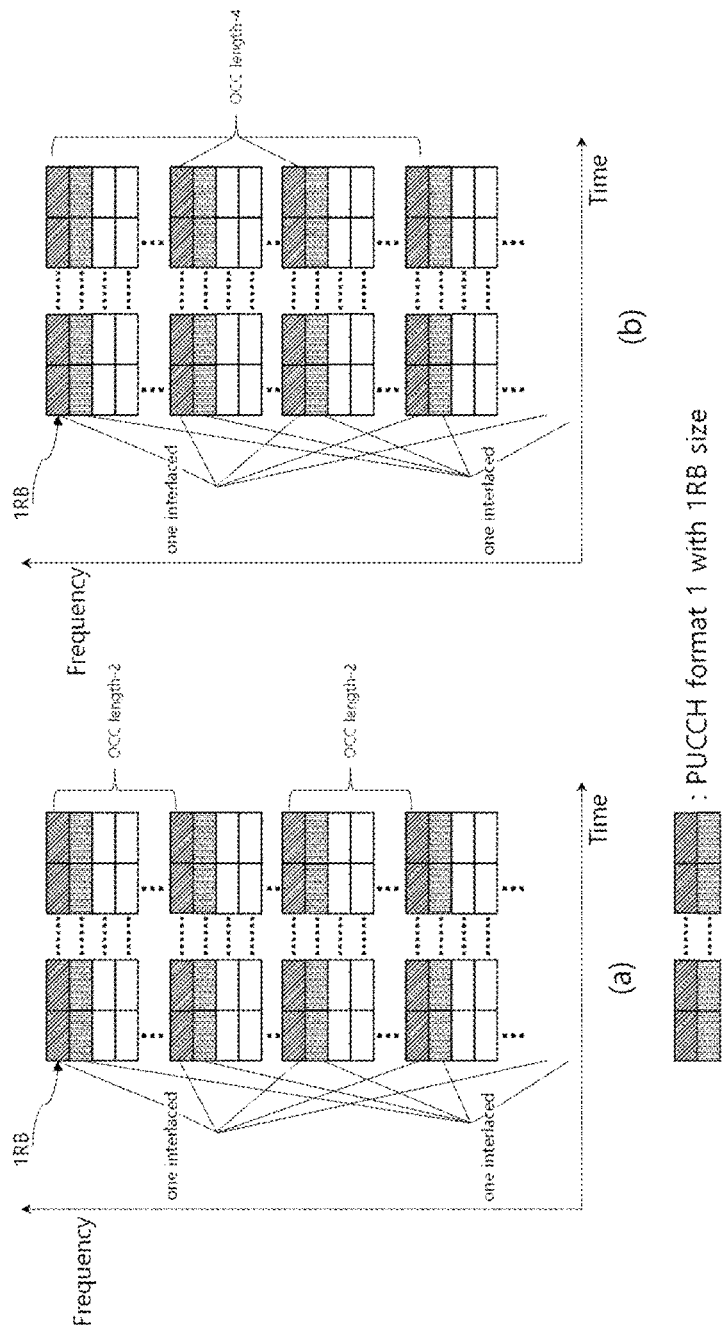
FIG. 45 shows the case in which a plurality of user equipments transmits a long PUCCH corresponding to PUCCH format 1 using OCC within one interlace according to an embodiment of the present invention.

FIG. 45 shows the case where a plurality of UEs transmits a long PUCCH corresponding to PUCCH format 1 using OCC in one interlace according to an embodiment of the present invention. In FIG. 45(a), two UEs transmit PUCCHs through two consecutive RBs within one interlace using OCC having an OCC length of 2. In FIG. 45(b), four UEs transmit PUCCHs through four consecutive RBs within one interlace using OCC having an OCC length of 4. Although it has been described by way of example in FIG. 45 that long PUCCHs are transmitted through four symbols, the embodiment of the present invention may also be applied in the same manner to the case of transmitting long PUCCHs through any one of five to fourteen symbols.

In the case where the UE operates in a transmission environment in which the delay spread of the channel is not large and line of sight may be formed, significant channel fluctuation may not occur in the frequency domain. In this case, the length of OCC may be increased. Therefore, the length of OCC may vary depending on the transmission environment.

In another specific embodiment, if interlacing is performed in units of one or more RB groups, the UEs may transmit PUCCHs using different patterns from each other in the interlaced PUCCHs configured in units of one or more RB groups. A plurality of UEs equal to the number of one or more RB groups constituting one interlace may transmit PUCCHs using different patterns. In this case, a sequence used for each of one or more RB groups within one interlace may be a computer generated sequence (CGS). In addition, a sequence used for each of one or more RB groups within one interlace may be a Zadoff-Chu (ZC) sequence. Different patterns are applied to each RB group occupied by one interlace. In addition, different UEs are allocated to the respective patterns. The base station may receive PUCCHs transmitted to one or more RB groups based on a pattern corresponding to each of the one or more RB groups, and may separate and receive PUCCHs transmitted by different UEs, which are multiplexed with different patterns in one interlace.

A method of rotating a phase of a sequence used for one or more RB groups within one interlace with different patterns may be used. There may be various methods of rotating a phase of a sequence used for one or more RB groups within one interlace with different patterns. Different cyclic shifts may be applied to the respective sequences mapped to one or more RB groups within one interlace between the UEs. A plurality of UEs may generate different scrambling sequences from each other, and may apply the corresponding scrambling sequences to one or more RB groups within one interlace.

As an example of applying different cyclic shifts to the respective sequences mapped to one or more RB groups within one interlace between the UEs, an example in which the number of RBs occupied by one interlace is 5 will be described. Different patterns are applied to five RBs from each other. Different UEs are allocated to five patterns from each other. A first UE may use a CS pattern of {0, 1, 2, 3, 4} in which the cyclic shift (CS) interval is shifted by 1 space, a second UE may use a CS pattern of {0, 2, 4, 6, 8} in which the CS interval is shifted by 2 spaces, and a third UE may use a CS pattern of {0, 3, 6, 9, 12} in which the CS interval is shifted by 3 spaces. However, if different RBs are configured as the same pattern within one interlace, the peak-to-average power ratio (PAPR)/cubic metric (CM) characteristic may deteriorate in an interlaced structure in which the intervals between RBs and RB groups are constant. That is, since the same phase is repeatedly allocated to each RB and each RB group, a PAPR/CM value may be increased, thereby reducing transmission coverage. Therefore, different CS values may be fundamentally allocated to different RBs within one interlace.

If the PUCCH and the PUSCH have an interlace structure, the PRACH may also have an interlace structure for frequency division multiplexing (FDM) with a PUCCH or PUSCH. In particular, in the case of PRACH transmission, it may be highly necessary in order for a plurality of UEs to simultaneously transmit the PRACHs. Accordingly, embodiments related to PUCCH transmission described above may also be applied to PRACH transmission.

Although the method and system of the present invention have been described in connection with specific embodiments, some or all of components or operations thereof may be implemented using a computing system having a general-purpose hardware architecture.

The description of the present invention described above is only exemplary, and it will be understood by those skilled in the art to which the present invention pertains that various modifications and changes can be made without changing the technical or essential features of the present invention. Therefore, it should be construed that the embodiments described above are illustrative and not restrictive in all respects. For example, each component described as a single type may be implemented in a distributed manner, and similarly, components described as being distributed may also be implemented in a combined form.

The scope of the present invention is indicated by the attached claims rather than the detailed description, and it should be construed that all changes or modifications derived from the meaning and scope of the claims and their equivalents are included in the scope of the present invention.

The invention claimed is:

1. A base station in a wireless communication system, the base station comprising:
a processor configured to:
transmit a synchronization signal and PBCH (physical broadcast channel) block (SSB) in SSB transmission candidate locations in a discovery reference signal (DRS) transmission window in an unlicensed band,
terminate a transmission of the SSB before at least one orthogonal frequency division multiplexing (OFDM) symbol from a boundary between a slot in which the transmission of SSB is performed and a slot subsequent to the slot in which the transmission of the SSB is performed,
wherein the DRS transmission window is a time interval in which the base station is able to transmit the SSB,
wherein each of the SSB transmission candidate locations indicates a time point at which the base station is able to start transmitting the SSB within the DRS transmission window,
wherein the maximum number of SSBs capable of being transmitted by the base station in a first DRS transmission window is limited, and
wherein a subcarrier spacing used for the transmission of the SSB is 15 kHz or 30 kHz.

2. The base station of claim 1, wherein duration of the DRS transmission window has a fixed value, and wherein the DRS transmission window is configured for a user equipment so as to repeat in a specific periodicity.

3. The base station of claim 1, wherein the processor is configured to perform channel access in units of n candidate locations, where "n" is a positive integer.

4. The base station of claim 3, wherein "n" is 1.

5. A user equipment in a wireless communication system, the user equipment comprising:
a processor configured to:
receive a synchronization signal and PBCH (physical broadcast channel) block (SSB) in SSB transmission candidate locations in a discovery reference signal (DRS) transmission window in an unlicensed band,
wherein a reception of the SSB is performed before at least one orthogonal frequency division multiplexing (OFDM) symbol from a boundary between a slot in which the reception of the SSB is performed and a slot subsequent to the slot in which the reception of the SSB is performed,
wherein the DRS transmission window is a time interval in which a base station is able to transmit the SSB,
wherein each of the SSB transmission candidate locations indicates a time point at which the user equipment is able to start to receive the SSB within the DRS transmission window, and
wherein a subcarrier spacing used for the transmission of the SSB is 15 kHz or 30 kHz.

6. The user equipment of claim 5, wherein duration of the DRS transmission window has a fixed length, and wherein the DRS transmission window is configured for the user equipment so as to repeat in a specific periodicity.

* * * * *